(12) United States Patent
Nielsen et al.

(10) Patent No.: US 8,620,616 B2
(45) Date of Patent: Dec. 31, 2013

(54) METHODS AND APPARATUS FOR ASSESSING MARKING OPERATIONS BASED ON ACCELERATION INFORMATION

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 145 days.

(21) Appl. No.: 12/855,977

(22) Filed: Aug. 13, 2010

(65) Prior Publication Data

US 2011/0060549 A1 Mar. 10, 2011

Related U.S. Application Data

(60) Provisional application No. 61/235,519, filed on Aug. 20, 2009, provisional application No. 61/291,017, filed on Dec. 30, 2009.

(30) Foreign Application Priority Data

Aug. 12, 2010 (CA) ........................................ 2710189

(51) Int. Cl.
*G01P 15/00* (2006.01)
(52) U.S. Cl.
USPC ............................................................. 702/141
(58) Field of Classification Search
USPC ......... 702/5, 68, 81, 141, 142, 150, 151, 152, 702/153, 154, 178; 340/551, 686.1
See application file for complete search history.

(56) References Cited

U.S. PATENT DOCUMENTS

| | | | |
|---|---|---|---|
| 3,871,557 A | 3/1975 | Smrt |
| 3,972,038 A | 7/1976 | Fletcher et al. |
| 3,974,491 A | 8/1976 | Sipe |
| 3,988,922 A | 11/1976 | Clark et al. |
| 4,258,320 A | 3/1981 | Schonstedt |
| 4,387,340 A | 6/1983 | Peterman |
| 4,388,592 A | 6/1983 | Schonstedt |
| 4,520,317 A | 5/1985 | Peterman |
| 4,536,710 A | 8/1985 | Dunham |
| 4,539,522 A | 9/1985 | Schonstedt |

(Continued)

FOREIGN PATENT DOCUMENTS

| | | |
|---|---|---|
| CA | 2623761 | 10/2008 |
| CA | 2623466 | 6/2011 |

(Continued)

OTHER PUBLICATIONS

Sergiusz Luczak, Increasing Accuracy of Tilt Measurements, Engineering Mechanics, vol. 14, 2007, p. 143-154.*

(Continued)

*Primary Examiner* — Sujoy Kundu
*Assistant Examiner* — Harun Chowdhury

(57) ABSTRACT

Marking devices of the type used for marking a presence or an absence of underground facilities and including motion detectors such as accelerometers are described. Methods of collecting and analyzing motion information indicative of the motion of a marking device are also described. The motion information may be used for various purposes, including documenting performance of a marking operation and/or performance of a particular technician, pattern determination and comparison, as well as quality control assessment.

54 Claims, 22 Drawing Sheets

(56) References Cited

U.S. PATENT DOCUMENTS

| | | |
|---|---|---|
| 4,590,425 A | 5/1986 | Schonstedt |
| 4,623,282 A | 11/1986 | Allen |
| 4,639,674 A | 1/1987 | Rippingale |
| 4,712,094 A | 12/1987 | Bolson, Sr. |
| 4,747,207 A | 5/1988 | Schonstedt et al. |
| 4,803,773 A | 2/1989 | Schonstedt |
| 4,818,944 A | 4/1989 | Rippingale |
| 4,839,623 A | 6/1989 | Schonstedt et al. |
| 4,839,624 A | 6/1989 | Schonstedt |
| 4,873,533 A | 10/1989 | Oike |
| 4,899,293 A | 2/1990 | Dawson et al. |
| 4,989,151 A | 1/1991 | Nuimura |
| 5,001,430 A | 3/1991 | Peterman et al. |
| 5,006,806 A | 4/1991 | Rippingale et al. |
| 5,014,008 A | 5/1991 | Flowerdew |
| 5,017,873 A | 5/1991 | Rippingale et al. |
| 5,025,150 A | 6/1991 | Oldham et al. |
| 5,043,666 A | 8/1991 | Tavernetti et al. |
| 5,045,368 A | 9/1991 | Cosman et al. |
| 5,065,098 A | 11/1991 | Salsman et al. |
| 5,093,622 A | 3/1992 | Balkman |
| 5,097,211 A | 3/1992 | Schonstedt |
| 5,114,517 A | 5/1992 | Rippingale et al. |
| 5,122,750 A | 6/1992 | Rippingale et al. |
| 5,136,245 A | 8/1992 | Schonstedt |
| 5,138,761 A | 8/1992 | Schonstedt |
| 5,150,295 A | 9/1992 | Mattingly |
| 5,173,139 A | 12/1992 | Rippingale et al. |
| 5,206,065 A | 4/1993 | Rippingale et al. |
| 5,214,757 A | 5/1993 | Mauney et al. |
| 5,231,355 A | 7/1993 | Rider et al. |
| 5,239,290 A | 8/1993 | Schonstedt |
| 5,260,659 A | 11/1993 | Flowerdew et al. |
| 5,264,795 A | 11/1993 | Rider |
| 5,299,300 A | 3/1994 | Femal |
| 5,329,464 A | 7/1994 | Sumic et al. |
| 5,361,029 A | 11/1994 | Rider |
| 5,365,163 A | 11/1994 | Satterwhite et al. |
| 5,373,298 A | 12/1994 | Karouby |
| 5,379,045 A | 1/1995 | Gilbert et al. |
| 5,381,338 A | 1/1995 | Wysocki |
| 5,389,149 A | 2/1995 | Carey et al. |
| 5,414,462 A | 5/1995 | Veatch |
| 5,430,379 A | 7/1995 | Parkinson et al. |
| 5,444,364 A | 8/1995 | Satterwhite et al. |
| 5,467,271 A | 11/1995 | Abel et al. |
| 5,471,143 A | 11/1995 | Doany |
| 5,486,067 A | 1/1996 | Huynh |
| 5,490,646 A | 2/1996 | Shaw |
| 5,517,419 A | 5/1996 | Lanckton |
| 5,519,329 A | 5/1996 | Satterwhite |
| 5,529,433 A | 6/1996 | Huynh |
| 5,530,357 A | 6/1996 | Cosman et al. |
| 5,543,931 A | 8/1996 | Lee et al. |
| 5,553,407 A | 9/1996 | Stump |
| 5,568,162 A | 10/1996 | Samsel et al. |
| 5,576,973 A | 11/1996 | Haddy |
| 5,621,325 A | 4/1997 | Draper et al. |
| 5,629,626 A | 5/1997 | Russell et al. |
| 5,644,237 A | 7/1997 | Eslambolchi et al. |
| 5,659,985 A | 8/1997 | Stump |
| 5,673,050 A | 9/1997 | Moussally et al. |
| 5,689,415 A | 11/1997 | Calotychos et al. |
| 5,699,244 A | 12/1997 | Clark, Jr. |
| 5,704,142 A | 1/1998 | Stump |
| 5,739,785 A | 4/1998 | Allison et al. |
| 5,751,289 A | 5/1998 | Myers |
| 5,751,450 A | 5/1998 | Robinson |
| 5,764,127 A | 6/1998 | Hore et al. |
| 5,769,370 A | 6/1998 | Ashjaee |
| 5,815,411 A | 9/1998 | Ellenby |
| 5,819,859 A | 10/1998 | Stump et al. |
| 5,828,219 A | 10/1998 | Hanlon et al. |
| 5,848,373 A | 12/1998 | Delorme et al. |
| 5,916,300 A | 6/1999 | Kirk et al. |
| 5,917,325 A | 6/1999 | Smith |
| 5,918,565 A | 7/1999 | Casas |
| 5,920,194 A | 7/1999 | Lewis et al. |
| 5,955,667 A | 9/1999 | Fyfe |
| 5,987,380 A | 11/1999 | Backman |
| 6,026,135 A | 2/2000 | McFee et al. |
| 6,031,454 A | 2/2000 | Lovejoy et al. |
| 6,032,530 A | 3/2000 | Hock |
| 6,037,010 A | 3/2000 | Kahmann et al. |
| 6,053,260 A | 4/2000 | Boon |
| 6,061,632 A | 5/2000 | Dreier |
| 6,064,940 A | 5/2000 | Rodgers |
| 6,074,693 A | 6/2000 | Manning |
| 6,075,481 A | 6/2000 | Eslambolchi |
| 6,095,081 A | 8/2000 | Gochenour |
| 6,101,087 A | 8/2000 | Sutton |
| 6,107,801 A | 8/2000 | Hopwood |
| 6,119,376 A | 9/2000 | Stump |
| 6,127,827 A | 10/2000 | Lewis |
| 6,130,539 A | 10/2000 | Polak |
| 6,138,906 A | 10/2000 | DeMayo |
| 6,140,819 A | 10/2000 | Peterman et al. |
| 6,169,958 B1 | 1/2001 | Nagasamy et al. |
| 6,188,392 B1 | 2/2001 | O'Connor et al. |
| 6,188,777 B1 | 2/2001 | Darrell et al. |
| 6,206,282 B1 | 3/2001 | Hayes, Sr. et al. |
| 6,234,218 B1 | 5/2001 | Boers |
| 6,240,360 B1 | 5/2001 | Phelan |
| 6,268,731 B1 | 7/2001 | Hopwood et al. |
| 6,282,477 B1 | 8/2001 | Gudat et al. |
| 6,285,911 B1 | 9/2001 | Watts et al. |
| 6,292,108 B1 | 9/2001 | Straser et al. |
| 6,294,022 B1 | 9/2001 | Eslambolchi et al. |
| 6,297,736 B1 | 10/2001 | Lewis et al. |
| 6,299,934 B1 | 10/2001 | Manning |
| 6,308,565 B1 | 10/2001 | French et al. |
| 6,320,518 B2 | 11/2001 | Saeki et al. |
| RE37,574 E | 3/2002 | Rawlins |
| 6,356,082 B1 | 3/2002 | Alkire et al. |
| 6,363,320 B1 | 3/2002 | Chou |
| 6,375,038 B1 | 4/2002 | Daansen et al. |
| 6,378,220 B1 | 4/2002 | Baioff et al. |
| 6,388,629 B1 | 5/2002 | Albats et al. |
| 6,390,336 B1 | 5/2002 | Orozco |
| 6,401,051 B1 | 6/2002 | Merriam |
| 6,407,550 B1 | 6/2002 | Parakulam et al. |
| 6,411,094 B1 | 6/2002 | Gard et al. |
| 6,426,872 B1 | 7/2002 | Sutton |
| 6,437,708 B1 | 8/2002 | Brouwer |
| 6,438,239 B1 | 8/2002 | Kuechen |
| 6,459,266 B1 | 10/2002 | Fling |
| 6,476,708 B1 | 11/2002 | Johnson |
| 6,477,588 B1 | 11/2002 | Yerazunis |
| 6,490,524 B1 | 12/2002 | White et al. |
| 6,493,650 B1 | 12/2002 | Rodgers |
| 6,512,478 B1 | 1/2003 | Chien |
| 6,526,400 B1 | 2/2003 | Takata |
| 6,549,011 B2 | 4/2003 | Flatt |
| 6,552,548 B1 | 4/2003 | Lewis et al. |
| 6,585,133 B1 | 7/2003 | Brouwer |
| 6,600,420 B2 | 7/2003 | Goff et al. |
| 6,617,856 B1 | 9/2003 | Royle et al. |
| 6,633,163 B2 | 10/2003 | Fling |
| 6,650,293 B1 | 11/2003 | Eslambolchi |
| 6,650,798 B2 | 11/2003 | Russell et al. |
| 6,658,148 B1 | 12/2003 | Fung |
| 6,674,276 B2 | 1/2004 | Morgan et al. |
| 6,700,526 B2 | 3/2004 | Witten |
| 6,710,741 B2 | 3/2004 | Tucker |
| 6,717,392 B2 | 4/2004 | Pearson |
| 6,723,375 B2 | 4/2004 | Zeck et al. |
| 6,728,662 B2 | 4/2004 | Frost et al. |
| 6,751,552 B1 | 6/2004 | Minelli |
| 6,751,553 B2 | 6/2004 | Young |
| 6,751,554 B1 | 6/2004 | Asher et al. |
| 6,777,923 B2 | 8/2004 | Pearson |
| 6,778,128 B2 | 8/2004 | Tucker et al. |
| 6,798,379 B2 | 9/2004 | Tucker et al. |
| 6,799,116 B2 | 9/2004 | Robbins |

(56) References Cited

U.S. PATENT DOCUMENTS

| | | |
|---|---|---|
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,795 B1 | 12/2004 | Johnson et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,853,986 B1 | 2/2005 | Wagner |
| 6,865,484 B2 | 3/2005 | Miyasaka et al. |
| 6,895,356 B2 | 5/2005 | Brimhall |
| 6,898,525 B1 | 5/2005 | Minelli |
| 6,898,550 B1 | 5/2005 | Blackadar et al. |
| 6,904,361 B1 | 6/2005 | Tallman et al. |
| 6,941,890 B1 | 9/2005 | Cristo et al. |
| 6,947,028 B2 | 9/2005 | Shkolnikov |
| 6,954,071 B2 | 10/2005 | Flatt et al. |
| 6,956,524 B2 | 10/2005 | Tucker et al. |
| 6,956,564 B1 | 10/2005 | Williams |
| 6,958,690 B1 | 10/2005 | Asher et al. |
| 6,968,296 B2 | 11/2005 | Royle |
| 6,972,698 B2 | 12/2005 | Deguchi |
| 6,975,942 B2 | 12/2005 | Young et al. |
| 6,977,508 B2 | 12/2005 | Pearson et al. |
| 6,992,584 B2 | 1/2006 | Dooley et al. |
| 6,993,088 B2 | 1/2006 | Fling et al. |
| 6,999,021 B2 | 2/2006 | Taylor, Jr. |
| 7,003,138 B2 | 2/2006 | Wilson |
| 7,009,399 B2 | 3/2006 | Olsson et al. |
| 7,009,519 B2 | 3/2006 | Leonard et al. |
| 7,038,454 B2 | 5/2006 | Gard et al. |
| 7,042,358 B2 | 5/2006 | Moore |
| 7,048,320 B2 | 5/2006 | Rubel |
| 7,053,789 B2 | 5/2006 | Fling et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,091,872 B1 | 8/2006 | Bigelow |
| 7,113,124 B2 | 9/2006 | Waite |
| 7,116,244 B2 | 10/2006 | Fling et al. |
| 7,120,564 B2 | 10/2006 | Pacey |
| 7,142,196 B1 | 11/2006 | Connor |
| 7,216,034 B2 | 5/2007 | Vitikainen |
| 7,235,980 B2 | 6/2007 | Pearson et al. |
| 7,285,958 B2 | 10/2007 | Overby et al. |
| 7,304,480 B1 | 12/2007 | Pearson |
| 7,310,584 B2 | 12/2007 | Royle |
| 7,319,387 B2 | 1/2008 | Wilson et al. |
| 7,331,340 B2 | 2/2008 | Barney |
| 7,336,078 B1 | 2/2008 | Merewether et al. |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,358,738 B2 | 4/2008 | Overby et al. |
| 7,372,247 B1 | 5/2008 | Giusti et al. |
| 7,372,276 B2 | 5/2008 | Mulcahey |
| 7,396,177 B2 | 7/2008 | Lapstun et al. |
| 7,396,178 B2 | 7/2008 | Lapstun et al. |
| 7,400,976 B2 | 7/2008 | Young et al. |
| 7,403,012 B2 | 7/2008 | Worsley et al. |
| 7,413,363 B2 | 8/2008 | Lapstun et al. |
| 7,443,154 B1 | 10/2008 | Merewether et al. |
| 7,451,721 B1 | 11/2008 | Garza et al. |
| 7,482,973 B2 | 1/2009 | Tucker et al. |
| 7,500,583 B1 | 3/2009 | Cox |
| 7,532,127 B2 * | 5/2009 | Holman et al. ............ 340/686.1 |
| 7,636,901 B2 | 12/2009 | Munson |
| 7,640,105 B2 | 12/2009 | Nielsen et al. |
| 7,664,530 B2 | 2/2010 | Skelton |
| 7,733,077 B1 | 6/2010 | Merewether et al. |
| 7,773,095 B1 | 8/2010 | Badrak et al. |
| 7,834,801 B2 | 11/2010 | Waite et al. |
| 7,834,806 B2 | 11/2010 | Tucker et al. |
| 7,889,124 B2 | 2/2011 | Islam et al. |
| 7,889,888 B2 | 2/2011 | Deardorr |
| 7,929,981 B2 | 4/2011 | Sangberg |
| 7,978,129 B2 | 7/2011 | Sawyer et al. |
| 7,986,246 B2 | 7/2011 | Angelis et al. |
| 8,060,304 B2 | 11/2011 | Nielsen et al. |
| 8,081,112 B2 | 12/2011 | Tucker et al. |
| 8,106,660 B1 | 1/2012 | Merewether et al. |
| 8,118,192 B2 | 2/2012 | Daughtery |
| 8,144,245 B2 | 3/2012 | Vik |
| 8,264,409 B2 | 9/2012 | Miller |
| 8,311,765 B2 | 11/2012 | Nielsen et al. |
| 2001/0029996 A1 | 10/2001 | Robinson |
| 2002/0035432 A1 | 3/2002 | Kubica et al. |
| 2002/0052755 A1 | 5/2002 | Whatley |
| 2002/0053608 A1 * | 5/2002 | Zeck et al. .................... 239/150 |
| 2002/0103625 A1 | 8/2002 | Card et al. |
| 2002/0115472 A1 | 8/2002 | Andress |
| 2002/0122000 A1 | 9/2002 | Bradley et al. |
| 2002/0130806 A1 | 9/2002 | Taylor et al. |
| 2002/0130906 A1 | 9/2002 | Miyaki |
| 2003/0012411 A1 | 1/2003 | Sjostrom |
| 2003/0080897 A1 | 5/2003 | Tranchina |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184300 A1 | 10/2003 | Bigelow |
| 2003/0196585 A1 | 10/2003 | McDonald et al. |
| 2004/0006425 A1 | 1/2004 | Wood |
| 2004/0051368 A1 | 3/2004 | Caputo |
| 2004/0057795 A1 | 3/2004 | Mayfield et al. |
| 2004/0070535 A1 | 4/2004 | Olsson et al. |
| 2004/0124988 A1 | 7/2004 | Leonard et al. |
| 2004/0168358 A1 | 9/2004 | Stump |
| 2004/0203909 A1 | 10/2004 | Koster |
| 2004/0210370 A1 | 10/2004 | Gudat |
| 2004/0220731 A1 | 11/2004 | Tucker et al. |
| 2004/0225444 A1 | 11/2004 | Young et al. |
| 2005/0023367 A1 | 2/2005 | Reighard |
| 2005/0033513 A1 | 2/2005 | Gasbarro |
| 2005/0034074 A1 | 2/2005 | Munson |
| 2005/0038825 A1 | 2/2005 | Tarabzouni |
| 2005/0040222 A1 | 2/2005 | Robinson |
| 2005/0054457 A1 * | 3/2005 | Eyestone et al. ............ 473/221 |
| 2005/0055142 A1 | 3/2005 | Mcmurtry et al. |
| 2005/0057745 A1 | 3/2005 | Bontje |
| 2005/0150399 A1 | 7/2005 | Wiley |
| 2005/0156600 A1 | 7/2005 | Olsson |
| 2005/0192727 A1 | 9/2005 | Shostak et al. |
| 2005/0206562 A1 | 9/2005 | Willson et al. |
| 2005/0232475 A1 | 10/2005 | Floeder |
| 2005/0278371 A1 | 12/2005 | Funk et al. |
| 2006/0026020 A1 | 2/2006 | Waite et al. |
| 2006/0055584 A1 | 3/2006 | Waite et al. |
| 2006/0077095 A1 | 4/2006 | Tucker et al. |
| 2006/0084516 A1 | 4/2006 | Eyestone |
| 2006/0085133 A1 | 4/2006 | Young |
| 2006/0085396 A1 | 4/2006 | Evans |
| 2006/0109131 A1 | 5/2006 | Sen et al. |
| 2006/0161349 A1 | 7/2006 | Cross |
| 2006/0169776 A1 | 8/2006 | Hornbaker |
| 2006/0220955 A1 | 10/2006 | Hamilton |
| 2006/0244454 A1 | 11/2006 | Gard |
| 2006/0254820 A1 | 11/2006 | Cole et al. |
| 2006/0262963 A1 | 11/2006 | Navulur |
| 2006/0276198 A1 | 12/2006 | Michelon et al. |
| 2006/0276985 A1 | 12/2006 | Xu |
| 2006/0282191 A1 | 12/2006 | Gotfried |
| 2006/0282280 A1 | 12/2006 | Stotz et al. |
| 2006/0285913 A1 | 12/2006 | Koptis |
| 2006/0287900 A1 | 12/2006 | Fiore et al. |
| 2006/0289679 A1 | 12/2006 | Johnson et al. |
| 2007/0013379 A1 | 1/2007 | Staples et al. |
| 2007/0018632 A1 | 1/2007 | Royle |
| 2007/0031042 A1 | 2/2007 | Simental |
| 2007/0040558 A1 | 2/2007 | Overby et al. |
| 2007/0100496 A1 | 5/2007 | Forell |
| 2007/0143676 A1 | 6/2007 | Chen |

(56) References Cited

U.S. PATENT DOCUMENTS

| | | |
|---|---|---|
| 2007/0219722 A1 | 9/2007 | Sawyer, Jr. |
| 2007/0223803 A1 | 9/2007 | Shindo |
| 2007/0268110 A1 | 11/2007 | Little |
| 2007/0286021 A1 | 12/2007 | Hoenmans et al. |
| 2007/0288195 A1 | 12/2007 | Waite et al. |
| 2008/0010009 A1 | 1/2008 | Miyoshi |
| 2008/0013940 A1 | 1/2008 | Jung |
| 2008/0125942 A1 | 5/2008 | Tucker et al. |
| 2008/0180322 A1 | 7/2008 | Islam |
| 2008/0204322 A1 | 8/2008 | Oswald et al. |
| 2008/0208415 A1 | 8/2008 | Vik |
| 2008/0228294 A1 | 9/2008 | Nielsen et al. |
| 2008/0255795 A1 | 10/2008 | Shkolnikov |
| 2008/0310721 A1 | 12/2008 | Yang |
| 2009/0004410 A1 | 1/2009 | Thomson et al. |
| 2009/0013928 A1 | 1/2009 | Nielsen et al. |
| 2009/0063258 A1 | 3/2009 | Mueller et al. |
| 2009/0085568 A1 | 4/2009 | Cole |
| 2009/0109081 A1 | 4/2009 | Ryerson |
| 2009/0121933 A1 | 5/2009 | Tucker et al. |
| 2009/0171616 A1 | 7/2009 | Zhang et al. |
| 2009/0185858 A1 | 7/2009 | Malit |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |

(56) References Cited

U.S. PATENT DOCUMENTS

| | | | |
|---|---|---|---|
| 2012/0065924 A1 | 3/2012 | Nielsen et al. | |
| 2012/0065944 A1 | 3/2012 | Nielsen et al. | |
| 2012/0066137 A1 | 3/2012 | Nielsen et al. | |
| 2012/0066273 A1 | 3/2012 | Nielsen et al. | |
| 2012/0066506 A1 | 3/2012 | Nielsen et al. | |
| 2012/0069178 A1 | 3/2012 | Nielsen et al. | |
| 2012/0072035 A1 | 3/2012 | Nielsen et al. | |
| 2012/0110019 A1 | 5/2012 | Nielsen et al. | |
| 2012/0113244 A1 | 5/2012 | Nielsen et al. | |
| 2012/0274476 A1 | 11/2012 | Nielsen et al. | |
| 2012/0328162 A1 | 12/2012 | Nielsen et al. | |
| 2012/0330849 A1 | 12/2012 | Nielsen et al. | |
| 2013/0002854 A1 | 1/2013 | Nielsen et al. | |
| 2013/0006718 A1 | 1/2013 | Nielsen et al. | |
| 2013/0044918 A1 | 2/2013 | Nielsen et al. | |
| 2013/0085670 A1 | 4/2013 | Nielsen et al. | |

FOREIGN PATENT DOCUMENTS

| | | |
|---|---|---|
| CH | 695087 A5 | 12/2005 |
| EP | 0636393 | 2/1995 |
| EP | 1521331 | 4/2005 |
| EP | 1852365 | 11/2007 |
| EP | 1974638 | 10/2008 |
| GB | 2266863 | 11/1993 |
| JP | 7256169 | 10/1994 |
| JP | 7128061 | 5/1995 |
| JP | 8285601 | 11/1996 |
| JP | 10060865 | 3/1998 |
| JP | 2000501666 | 2/2000 |
| JP | 2002079167 | 3/2002 |
| WO | WO9112119 | 8/1991 |
| WO | WO9424584 | 10/1994 |
| WO | WO9516827 | 6/1995 |
| WO | WO9629572 | 9/1996 |
| WO | WO9854600 | 12/1998 |
| WO | WO9854601 | 12/1998 |
| WO | WO9900679 | 1/1999 |
| WO | WO0194016 | 12/2001 |
| WO | WO0228541 | 4/2002 |
| WO | WO2004100044 | 11/2004 |
| WO | WO2004102242 | 11/2004 |
| WO | WO2005052627 | 6/2005 |
| WO | WO2006015310 | 2/2006 |
| WO | WO2006136776 | 12/2006 |
| WO | WO2006136777 | 12/2006 |
| WO | WO2007067898 | 6/2007 |

OTHER PUBLICATIONS

Office Action dated Apr. 17, 2012 from U.S. Appl. No. 12/607,843.
Notice of Allowance dated May 2, 2012 from U.S. Appl. No. 12/429,929.
Office Action dated Mar. 29, 2012 from GB Application No. 1107052.1.
Office Action dated Apr. 12, 2012 from Canadian Application No. 2,691,707.
Office Action dated Apr. 25, 2012 from U.S. Appl. No. 12/363,046.
Office Action dated Apr. 13, 2012 from Australian Application No. 2008236526.
U.S. Appl. No. 12/429,947, filed Apr. 24, 2009, Nielsen et al.
U.S. Appl. No. 12/571,411, filed Sep. 30, 2009, Nielsen et al.
U.S. Appl. No. 12/571,408, filed Sep. 30, 2009, Nielsen et al.
U.S. Appl. No. 12/571,401, filed Sep. 30, 2009, Nielsen et al.
U.S. Appl. No. 12/701,496, filed Feb. 5, 2010, Nielsen et al.
U.S. Appl. No. 12/701,468, filed Feb. 5, 2010, Nielsen et al.
U.S. Appl. No. 12/703,958, filed Feb. 11, 2010, Nielsen et al.
U.S. Appl. No. 12/797,169, filed Jun. 9, 2010, Nielsen et al.
U.S. Appl. No. 12/797,202, filed Jun. 9, 2010, Nielsen et al.
U.S. Appl. No. 12/797,211, filed Jun. 9, 2010, Nielsen et al.
U.S. Appl. No. 12/797,227, filed Jun. 9, 2010, Nielsen et al.
U.S. Appl. No. 12/797,243, filed Jun. 9, 2010, Nielsen et al.
U.S. Appl. No. 12/797,262, filed Jun. 9, 2010, Nielsen et al.
U.S. Appl. No. 12/764,164, filed Apr. 21, 2010, Nielsen et al.
U.S. Appl. No. 12/859,394, filed Aug. 19, 2010, Nielsen et al.
U.S. Appl. No. 12/786,929, filed May 25, 2010, Nielsen et al.
U.S. Appl. No. 12/854,370, filed Aug. 11, 2010, Nielsen et al.
U.S. Appl. No. 13/232,790, filed Sep. 14, 2011, Nielsen et al.
Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.
Bernold, L.. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild02lPDF/b02059.pdf>. p. 4, col. 2, para 2.
Carey, B., "Tracking Shoes," Chicago Tribune Online Edition, Jan. 29, 2007, pp. 1-3, http://www.chicagotribune.com/services/site/premium/access-registered.intercept.
CGA, Common Ground Alliance, Best Practices, Version 1.0, Apr. 2003, 93 pages.
CGA, Common Ground, Study of One-Call Systems and Damage Prevention Best Practices, Aug. 1999, 262 pages.
ESRI Corporate Introduction, http://www.esri.com/library/brochures/pdfs/corporate-intro.pdf, printed on Dec. 9, 2009 (original publication date unknown).
European Search Report, Application No. 08743671.3, Nov. 16, 2011.
European Search Report, Application No. 08743673.9, Feb. 28, 2011.
Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2010/000389, Jun. 2, 2010.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.
International Search Report and Written Opinion, Application No. PCT/US2008/55796, Oct. 14, 2008.
International Search Report and Written Opinion, Application No. PCT/US2008/55798, Jul. 28, 2008.
International Search Report and Written Opinion, Application No. PCT/US2009/000859, Apr. 14, 2009.
International Search Report and Written Opinion, Application No. PCT/US2009/003957, Mar. 21, 2011.
International Search Report and Written Opinion, Application No. PCT/US2009/005299, Dec. 22, 2009.
International Search Report and Written Opinion, Application No. PCT/US2009/005348, Mar. 2, 2010.
International Search Report and Written Opinion, Application No. PCT/US2009/005359, Feb. 8, 2010.
International Search Report and Written Opinion, Application No. PCT/US2010/036029, Sep. 7, 2010.
International Search Report and Written Opinion, Application No. PCT/US11/51616, dated Jan. 31, 2012.
International Search Report and Written Opinion, Application No. PCT/US2011/047807, Dec. 6, 2011.
Jung, H.G., Structure Analysis Based Parking Slot Marking Recognition for Semi-automatic Parking System, Springer-Verlag Berlin Heidelberg 2006, 10 pages.
MALA Application Note—Using MALA GPR systems with GPS equipment, Printed Matter No. 2894, 5 pages, www.malags.se, printed Apr. 9, 2010 (original publication date unknown).
MALA Application Note—Visualizing GPR data in Google Earth using MALA GPS Mapper, Printed Matter No. 2896, 3 pages, www.malags.se, printed Apr. 9, 2010 (original publication date unknown).

(56) References Cited

OTHER PUBLICATIONS

MALA GPS Mapper—Processing, 1 page, http://www.malags.se/Downloads/Software/processing/MALA-GPS-Mapper.aspx, printed on Apr. 9, 2010 (original publication date unknown).
MALA GPS Mapper—Product Releases, Sep. 19, 2007, 1 page, http://www.malags.se/News-and-Events/Product-Releases/MALA-GPS-Mapper.aspx, printed Apr. 9, 2010.
MALA Object Mapper™—Processing, 1 page, http://www.malags.se/Downloads/Software/Processing/Object-Mapper.aspx, printed Apr. 9, 2010 (original publication date unknown).
New Mexico's Recommended Marking Guidelines for Underground Utilities, May 2006, 8 pages.
Notice of Allowance dated Jan. 24, 2012 from U.S. Appl. No. 12/363,951.
Notice of Allowance dated Mar. 9, 2012 from U.S. Appl. No. 12/236,688.
Notice of Allowance dated Aug. 25, 2011 from U.S. Appl. No. 11/696,606.
Notice of Allowance dated Nov. 6, 2009 from U.S. Appl. No. 11/685,602.
Notice of Allowance dated Apr. 28, 2011 from U.S. Appl. No. 29/356,631.
Notice of Allowance dated Jan. 25, 2012 from Canadian Application No. 2,710,189.
Notice of Allowance dated Nov. 12, 2010 from U.S. Appl. No. 29/356,634.
Notice of Allowance dated Nov. 12, 2010 from U.S. Appl. No. 29/356,633.
Notice of Allowance dated Nov. 12, 2010 from U.S. Appl. No. 29/356,635..
Notice of Allowance dated Nov. 28, 2011 from Canadian Application No. 2,710,269.
Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 20, 2012 from U.S. Appl. No. 12/764,164.
Office Action dated May 24, 2011 from U.S. Appl. No. 12/363,951.
Office Action dated Jun. 16, 2010 from Canadian Application No. 2,691,707.
Office Action dated Sep. 26, 2011 from Canadian Application No. 2,739,119.
Office Action dated Sep. 26, 2011 from Canadian Application No. 2,739,320.
Office Action dated Oct. 4, 2011 from U.S. Appl. No. 12/364,359.
Office Action dated Oct. 20, 2011 from U.S. Appl. No. 12/639,041.
Office Action dated Oct. 24, 2011 from U.S. Appl. No. 12/236,688.
Office Action dated Nov. 9, 2011 from U.S. Appl. No. 12/429,929.
Office Action dated Nov. 15, 2011 from Canadian Application No. 2,691,707.
Office Action dated Nov. 18, 2009 from Canadian Application No. 2,623,466, filed Mar. 4, 2008.
Office Action dated Nov. 23, 2009 from Canadian Application No. 2,623,761, filed Mar. 4, 2008.
Office Action dated Dec. 30, 2011 from U.S. Appl. No. 12/701,447.
Office Action dated Apr. 28, 2009 from U.S. Appl. No. 11/685,602.
Office Action dated Jul. 20, 2010 from U.S. Appl. No. 11/696,606.
Office Action dated Sep. 17, 2009 from U.S. Appl. No. 11/685,602.
Office Action dated Jul. 11, 2011 from Canadian Application No. 2713282.
Office Action dated Jun. 28, 2011 from Canadian Application No. 2710269.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 2623761.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Trimble Navigation Limited, "H-Star Technology Explained," pp. 1-9, 2005, www.trimble.com.
Virginia Pilot Project, Incorporating GPS Technology to Enhance One-Call Damage Prevention, Phase I—Electronic White Lining Project Report, Nov. 2007, 50 pages.
Virginia Underground utility marking standard, Mar. 2004, 20 pages.
Office Action dated Apr. 10, 2012 from U.S. Appl. No. 12/854,370.
Notice of Allowance dated Jul. 12, 2012 from U.S. Appl. No. 12/539,497.
Notice of Allowance dated Aug. 1, 2012 from U.S. Appl. No. 12/364,339.
Office Action dated May 1, 2012 from Australian Application No. 2009300362.
Office Action dated May 15, 2012 from U.S. Appl. No. 12/797,243.
Office Action dated May 17, 2012 from U.S. Appl. No. 12/364,369.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 13, 2012 from U.S. Appl. No. 12/639,373.
Office Action dated Jun. 18, 2012 from U.S. Appl. No. 12/701,468.
Office Action dated Jun. 18, 2012 from U.S. Appl. No. 12/701,496.
Office Action dated Jul. 2, 2012 from U.S. Appl. No. 12/797,262.
Office Action dated Jul. 12, 2012 from U.S. Appl. No. 12/571,411.
Office Action dated Jul. 26, 2012 from U.S. Appl. No. 12/639,041.
Office Action dated Jul. 27, 2012 from European Application No. 08743671.3.
Office Action dated Aug. 15, 2012 from Australian Application No. 2010214104.
Office Action dated Aug. 29, 2012 from U.S. Appl. No. 12/701,447.
Notice of Allowance dated Oct. 1, 2012 from U.S. Appl. No. 12/607,843.
Notice of Allowance dated Oct. 17, 2012 from U.S. Appl. No. 12/236,688.
Notice of Allowance dated Oct. 25, 2012 from U.S. Appl. No. 12/639,373.
Notice of Allowance dated Nov. 7, 2012 from U.S. Appl. No. 12/639,041.
Notice of Allowance dated Dec. 12, 2012 from U.S. Appl. No. 12/703,958.
Notice of Allowance dated Dec. 21, 2012 from U.S. Appl. No. 12/364,339.
Office Action dated Oct. 2, 2012 from Japanese Application No. 2010-502170.
Office Action dated Oct. 15, 2012 from U.S. Appl. No. 12/797,227.
Office Action dated Oct. 19, 2012 from U.S. Appl. No. 12/797,243.
Office Action dated Nov. 14, 2012 from Canadian Application No. 2,750,908.
Office Action dated Nov. 20, 2012 from U.S. Appl. No. 12/701,468.
Office Action dated Nov. 21, 2012 from U.S. Appl. No. 12/701,496.
Office Action dated Dec. 5, 2012 from U.S. Appl. No. 12/797,262.
Office Action dated Dec. 18, 2012 from U.S. Appl. No. 12/786,929.
Office Action dated Dec. 20, 2012 from U.S. Appl. No. 12/571,408.
Olsson, Office Action dated Sep. 13, 2012 from U.S. Appl. No. 12/827,993.
Notice of Allowance dated Jan. 8, 2013 from U.S. Appl. No. 12/797,243.
Notice of Allowance dated Jan. 22, 2013 from U.S. Appl. No. 12/703,958.
Notice of Allowance dated Feb. 1, 2013 from U.S. Appl. No. 12/797,202.
Notice of Allowance dated Feb. 13, 2013 from U.S. Appl. No. 12/701,447.

(56) References Cited

OTHER PUBLICATIONS

Notice of Allowance dated Feb. 20, 2013 from U.S. Appl. No. 12/364,369.
Notice of Allowance from U.S. Appl. No. 12/622,768 dated Jan. 24, 2013.
Office Action dated Jan. 9, 2013 from U.S. Appl. No. 12/571,411.
Office Action dated Dec. 28, 2012 from U.S. Appl. No. 12/364,359.
Office Action received Jan. 18, 2013 from Japanese Application No. 2009-553688.
U.S. Appl. No. 13/644,226, filed Oct. 3, 2012, Nielsen et al.
U.S. Appl. No. 13/751,862, filed Jan. 28, 2013, Nielsen et al.
U.S. Appl. No. 13/795,337, filed Mar. 12, 2013, Nielsen et al.
U.S. Appl. No. 13/797,229, filed Mar. 12, 2013, Nielsen et al.
U.S. Appl. No. 13/834,382, filed Mar. 15, 2013, Nielsen et al.
U.S. Appl. No. 13/846,120, filed Mar. 18, 2013, Nielsen et al.
U.S. Appl. No. 13/867,521, filed Apr. 22, 2013, Nielsen et al.
3M Dynatel, Brochure, 2006, 1-4.
3M Dynatel, Locating and Marking System, Brochure, 2007, 1-16.
Corrected Notice of Allowability dated May 10, 2013 from U.S. Appl. No. 12/797,227.
Corrected Notice of Allowability dated May 13, 2013 from U.S. Appl. No. 12/429,929.
Corrected Notice of Allowability dated May 14, 2013 from U.S. Appl. No. 12/797,202.
Corrected Notice of Allowability from U.S. Appl. No. 12/364,369 dated Apr. 15, 2013.
Corrected Notice of Allowability from U.S. Appl. No. 12/622,768 dated Apr. 3, 2013.
Corrected Notice of Allowability from U.S. Appl. No. 12/703,958 dated Mar. 7, 2013.
Corrected Notice of Allowability from U.S. Appl. No. 12/703,958 dated Apr. 18, 2013.
Corrected Notice of Allowability from U.S. Appl. No. 12/797,202 dated Apr. 4, 2013.
Corrected Notice of Allowability from U.S. Appl. No. 12/797,227 dated Apr. 17, 2013.
Notice of Allowance dated Mar. 28, 2013 from U.S. Appl. No. 12/797,227.
Notice of Allowance dated Apr. 25, 2013 from U.S. Appl. No. 12/364,359.
Notice of Allowance dated May 10, 2013 from U.S. Appl. No. 12/797,243.
Notice of Allowance dated Sep. 5, 2012 from U.S. Appl. No. 12/854,370.
Notice of Allowance dated Mar. 12, 2013 from U.S. Appl. No. 12/429,929.
Office Action dated Feb. 26, 2013 from Canadian Application No. 2,738,968.
Office Action dated Mar. 13, 2013 from Chinese Application No. 201080045879.1.
Office Action dated Mar. 20, 2013 from U.S. Appl. No. 12/764,164.
Office Action dated Mar. 25, 2013 from U.S. Appl. No. 12/797,211.
Office Action dated Mar. 28, 2013 from U.S. Appl. No. 12/571,408.
Office Action dated Apr. 26, 2013 from U.S. Appl. No. 12/859,394.
Office Action dated May 10, 2013 from U.S. Appl. No. 12/786,929.
Office Action dated Sep. 4, 2012 from U.S. Appl. No. 12/622,768.
Office Action dated Sep. 21, 2012 from U.S. Appl. No. 12/797,202.
Office Action dated Sep. 25, 2012 from Australian Application No. 2010214053.
Nielsen et al., co-pending U.S. Publication No. 2013-0085670, published Apr. 4, 2013.

\* cited by examiner

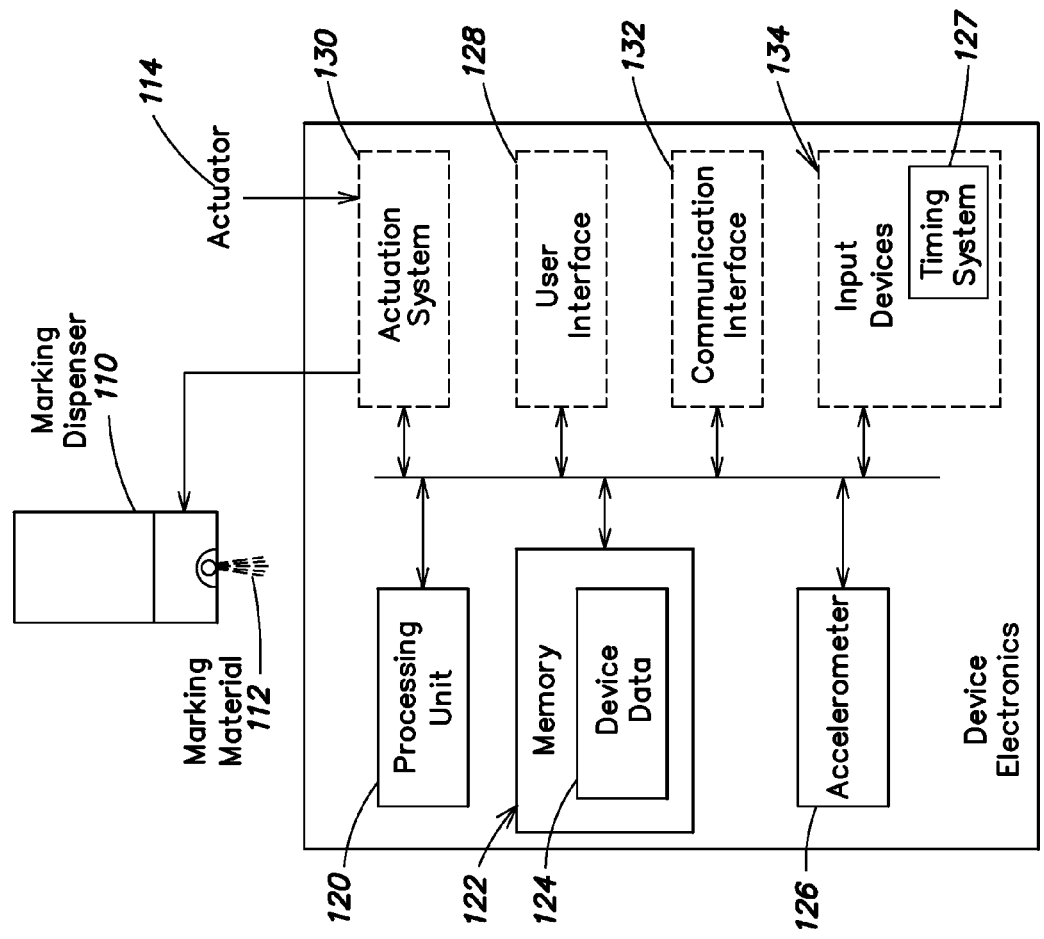
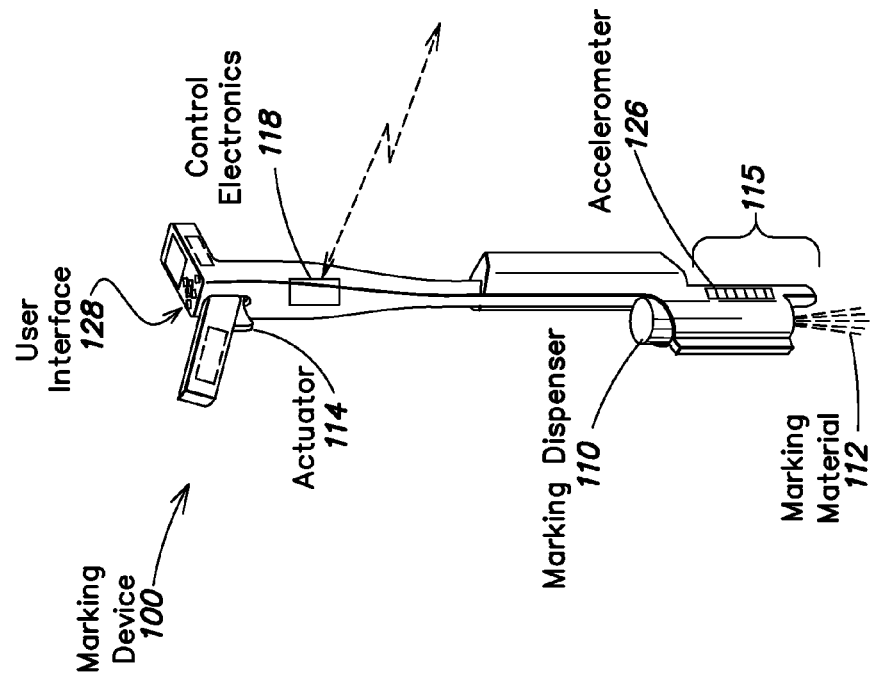
FIG. 4

METHODS AND APPARATUS FOR ASSESSING MARKING OPERATIONS BASED ON ACCELERATION INFORMATION

CROSS-REFERENCE TO RELATED APPLICATION

The present application claims a priority benefit, under 35 U.S.C. §119(a), to Canadian Application Serial No. 2710189, entitled "Methods and Apparatus for Assessing Marking Operations Based on Acceleration Information," filed Aug. 12, 2010.

The present application claims a priority benefit, under 35 U.S.C. §119(e), to U.S. Provisional Application Ser. No. 61/235,519, entitled "Marking Device With Accelerometer and Local Data Storage," filed Aug. 20, 2009.

The present application also claims a priority benefit, under 35 U.S.C. §119(e), to U.S. Provisional Application Ser. No. 61/291,017, entitled "Locating equipment communicatively coupled to or equipped with a mobile/portable device," filed Dec. 30, 2009.

Each of the foregoing applications is hereby incorporated herein by reference in its entirety.

BACKGROUND

Field service operations may be any operation in which companies dispatch technicians and/or other staff to perform certain activities, for example, installations, services and/or repairs. Field service operations may exist in various industries, examples of which include, but are limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 110 providing an excavation notice to a one-call center 120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection of "polygon maps" which indicate, within a given geographic area over which the one-call center has jurisdiction, generally where underground facilities may be found relative to some geographic reference frame or coordinate system.

Once facilities implicated by the locate request are identified by a one-call center, the one-call center generates a "locate request ticket" (also known as a "locate ticket," or simply a "ticket"). The locate request ticket essentially constitutes an instruction to inspect a work site and typically identifies the work site of the proposed excavation or design and includes a description of the dig area. The ticket typically lists all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner may contract with a locate service provider to receive locate request tickets and perform a locate and marking operation in response to received tickets on their behalf.

Upon receiving the locate ticket, a locate service provider or a facility owner (hereafter referred to as a "ticket recipient") may dispatch a locate technician 145 or 150 to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). An underground facility locate device is used to detect electromagnetic fields that are generated by a "test" signal provided along a length of a target facility to be identified. Locate devices typically include both a signal transmitter to provide the test signal (e.g., which is applied by the locate technician to a tracer wire disposed along a length of a facility), and a signal receiver which is generally a hand-held apparatus carried by the locate technician as the technician walks around the dig area to search for underground facilities. The signal receiver indicates a presence of a facility when it detects electromagnetic fields arising from the test signal. Conversely, the absence of a signal detected by the receiver of the locate device generally indicates the absence of the target facility.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 2A and 2B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 2A and 2B, the mechanical actuation system of the marking device 50 includes an actuator or mechanical trigger 42 proximate to the handle 38 that is actuated/triggered by the technician (e.g, via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 2A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 2B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 2A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

Applicants have recognized and appreciated that uncertainties which may be attendant to locate and marking operations may be significantly reduced by collecting various information particularly relating to the marking operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location of where an underground facility was detected via a locate device during a locate operation.

More specifically, Applicants have recognized and appreciated that conventional techniques for using a locate device to detect underground facilities are sometimes tentative and typically iterative in nature, and use of locate devices with GPS capabilities may result in redundant, spurious and/or incomplete geographic location data collected by such devices. For example, during a typical locate operation, a technician attempting to locate an underground facility with a locate device often needs to sweep an appreciable area around a suspected underground facility, and make multiple passes with the locate device over the underground facility to obtain meaningful detection signals. Furthermore, the technician often needs to rely significantly on visual observations of the area, including relevant landmarks such as facility connections to buildings, transformer boxes, maintenance/public access points, curbs, sidewalks, roadways, etc., to effectively deduce a sensible path of an underground facility to be located. The foregoing is particularly true if at some point during the locate operation the technician loses a signal from an underground facility in the process of being detected (e.g., due to a broken transmitter circuit path from a damaged tracer wire, and loss of the transmitter test signal). In view of the foregoing, it may be readily appreciated that collecting and logging geographic location information throughout this process may result in excessive and/or imprecise data, or in some instances incomplete relevant data (e.g., in the case of signal loss/broken tracer wire), from which it may be difficult to cull the data that is truly complete and representative of where the underground facility ultimately was detected.

Furthermore, Applicants have recognized and appreciated that the location at which an underground facility ultimately is detected during a locate operation is not always where the technician physically marks the ground, pavement or other surface during a marking operation; in fact, technician imprecision or negligence, as well as various ground conditions and/or different operating conditions amongst different locate devices, may in some instances result in significant discrepancies between detected location and physical locate marks. Accordingly, having documentation (e.g., an electronic record) of where physical locate marks were actually dispensed (i.e., what an excavator encounters when arriving to a work site) is notably more relevant to the assessment of liability in the event of damage and/or injury than where an underground facility was detected prior to marking.

Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information. Applicants have recognized and appreciated that collecting information relating to both geographic location and color of dispensed marking material provides for automated correlation of geographic information for a locate mark to facility type (e.g., red=electric power lines and cables; blue=potable water; orange=telecommunication lines; yellow=gas, oil, steam); in contrast, in conventional locate devices equipped with GPS capabilities as discussed above, there is no apparent automated provision for readily linking GPS information for a detected facility to the type of facility detected. Applicants have further appreciated that building a more comprehensive electronic record of information relating to marking operations further facilitates ensuring the accuracy of such operations. Moreover, Applicants have appreciated that collecting data related to the motion of the marking device during a marking operation may provide various benefits.

In view of the foregoing, various inventive embodiments disclosed herein relate generally to a marking device that includes a motion detector (e.g., an accelerometer) and local data storage. The motion data (e.g., accelerometer data) may be representative of movement of the marking device and may be stored during marking operations. The stored motion data (e.g., accelerometer data) may be analyzed to determine the quality of the marking operation.

In sum, one embodiment of the present invention is directed to a marking device to mark a presence or an absence of an underground facility. The marking device comprises: a hand-held body; an actuator mechanically coupled to the hand-held body and configured to actuate a marking material dispenser to dispense marking material to mark the presence or the absence of the underground facility; and a motion detector mechanically coupled to the hand-held body and configured to sense movement of the marking device.

Another embodiment is directed to a marking device to dispense paint to mark a presence or an absence of an underground facility. The marking device comprises: a hand-held elongated body having a first end comprising a handle and a second end opposite the first end; a paint canister holder affixed to the second end of the hand-held elongated body and configured to hold a paint canister; an actuator disposed on the hand-held elongated body proximate the handle and configured to actuate the paint canister to dispense the paint when operated by a user; a three-axis accelerometer coupled to the hand-held elongated body and disposed proximate the second end of the hand-held elongated body; a timing system coupled to the hand-held elongated body and configured to monitor time; a memory; and a processor coupled to the memory and the accelerometer. The processor is configured to, upon operation of the actuator, initiate at least one of the following: (a) storage of acceleration data from the accelerometer together with timestamp information from the timing system into the memory of the marking device; and/or (b) flagging of data packets including acceleration data from the three-axis accelerometer.

Another embodiment is directed to a method of operating a marking device having a marking material dispenser configured to dispense a marking material to mark the presence or absence of an underground facility, and at least one accelerometer. The method comprises: A) dispensing marking material from the marking material dispenser in a pattern or symbol; and B) collecting acceleration data associated with A) using the at least one accelerometer of the marking device.

Another embodiment is directed to an apparatus for assessing use of a marking device to mark a presence or an absence of at least one underground facility with a marking material. The apparatus comprises: at least one input/output (I/O) interface; at least one memory storing processor-executable instructions; and a processor coupled to the memory and the at least one I/O interface, wherein upon execution of the processor-executable instructions by the processor, the processor: A) receives, via the at least one I/O interface, acceleration information representative of acceleration of the marking device during the use of the marking device; B) analyzes the acceleration information to determine at least one of: (i) a number of distinct acceleration data segments associated with formation of a marking pattern; (ii) a duration of acceleration data segments associated with formation of the marking pattern; (iii) a periodicity of acceleration data segments associated with formation of the marking pattern; (iv) whether one or more acceleration values constituting the acceleration information fall outside of predetermined tolerances for use of the marking device; and (v) a trend of values constituting the acceleration information; and C) stores in the at least one memory, and/or transmits via the at least one I/O interface, at least one indication relating to an assessment of use of the marking device based at least in part on B). Another embodiment is directed to a system comprising the apparatus described immediately above, in combination with the marking device, wherein the marking device is communicatively coupled to the apparatus via the at least one I/O interface, and wherein the marking device comprises: a hand-held body; an actuator mechanically coupled to the hand-held body and configured to actuate a marking material dispenser to dispense the marking material to mark the presence or the absence of the at least one underground facility; and a motion detector mechanically coupled to the hand-held body and configured to sense movement of the marking device, wherein the motion detector provides at least some of the acceleration information received in A).

Another embodiment is directed to a method, executed in a computer comprising at least one hardware processor, at least one tangible storage medium, and at least one input/output (I/O) interface, for assessing use of a marking device to mark a presence or an absence of at least one underground facility with a marking material. The method comprises: A) receiving, via the at least one I/O interface, acceleration information representative of acceleration of the marking device during the use of the marking device; B) analyzing the acceleration information to determine at least one of: (i) a number of distinct acceleration data segments associated with formation of a marking pattern; (ii) a duration of acceleration data segments associated with formation of the marking pattern; (iii) a periodicity of acceleration data segments associated with formation of the marking pattern; (iv) whether one or more acceleration values constituting the acceleration information fall outside of predetermined tolerances for use of the marking device; and (v) a trend of values constituting the acceleration information; and C) storing in the at least one memory, and/or transmitting via the at least one I/O interface, at least one indication relating to an assessment of use of the marking device based at least in part on B).

Another embodiment is directed to at least one computer-readable storage medium encoded with instructions that, when executed by a processor in a computer comprising at least one input/output (I/O) interface, perform a method for assessing use of a marking device to mark a presence or an absence of at least one underground facility with a marking material, the method comprising: A) receiving, via the at least one I/O interface, acceleration information representative of acceleration of the marking device during the use of the marking device; and B) analyzing the acceleration information to determine at least one of: (i) a number of distinct acceleration data segments associated with formation of a marking pattern; (ii) a duration of acceleration data segments associated with formation of the marking pattern; (iii) a periodicity of acceleration data segments associated with formation of the marking pattern; (iv) whether one or more acceleration values constituting the acceleration information fall outside of predetermined tolerances for use of the marking device; and (v) a trend of values constituting the acceleration information.

Another embodiment is directed to a marking device to mark a presence or an absence of an underground facility. The marking device comprises: an actuator configured to actuate a marking material dispenser to dispense marking material to mark the presence or the absence of the underground facility; an accelerometer configured to sense acceleration of the marking device; and a processor coupled to the accelerometer and configured to, upon operation of the actuator, flag data packets including acceleration data from the accelerometer.

Another embodiment is directed to a method of operating a marking device having a marking material dispenser configured to dispense a marking material to mark the presence or absence of an underground facility, and at least one accelerometer. The method comprises: A) sensing acceleration of the marking device using the at least one accelerometer of the marking device; B) forming data packets comprising acceleration data resulting from (A); and C) flagging at least one of the data packets formed in B) in response to actuation of an actuator of the marking device.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, data related to motion of the marking device, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. patents and applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;"

U.S. publication no. 2010-0085054 A1, published Apr. 8, 2010, filed Sep. 30, 2009, and entitled, "Systems and Methods for Generating Electronic Records of Locate And Marking Operations;" and U.S. non-provisional application Ser. No. 12/703,958, filed Feb. 11, 2010, entitled "Marking Apparatus Having Enhanced Features for Underground Facility Marking Operations, and Associated Methods and Systems."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

The present disclosure, both as to its organization and manner of operation, together with further objectives and advantages, may be best understood by reference to the following description, taken in connection with the accompanying drawings as set forth below.

FIG. 4 illustrates a perspective view of a marking device that includes an accelerometer and local data storage, and also illustrates a functional block diagram of the electronics thereof, according to the present disclosure.

DETAILED DESCRIPTION

Figure 1:
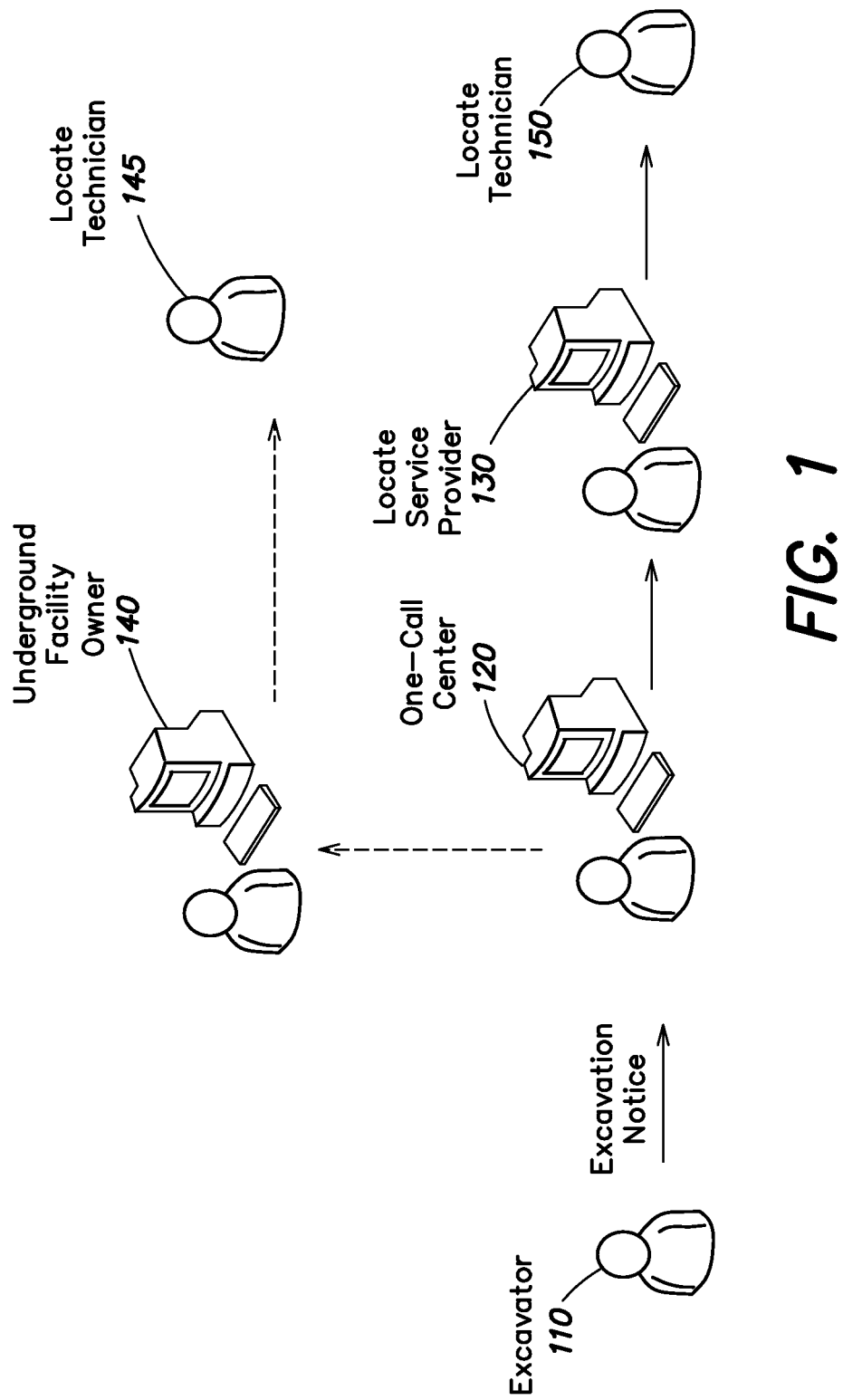
FIG. 1 is a schematic diagram that illustrates a process for initiation of a locate operation.

Applicants have appreciated that in at least some instances it may desirable to document or monitor performance of a marking operation. One characteristic of interest in the performance of a marking operation may be the motion of the marking device, since motion of the marking device may be used to determine, among other things, whether the marking operation was performed at all, the manner in which the marking operation was performed (e.g., quickly, slowly, smoothly, within standard operating procedures or not within standard operating procedures, etc.), characteristics of the particular technician performing the marking operation, historical trends with respect to performance of marking operations, accuracy of the marking device itself, and the location of marking material (e.g., paint) dispensed by the marking device. Thus, in at least some instances it may be desirable to document or monitor motion of the marking device during performance of a marking operation.

Various types of motion of a marking device may be of interest in any given scenario, and thus various devices (e.g., motion detectors) may be used for detecting the motion of interest. In some instances, linear motion may be of interest (e.g., motion of the marking device parallel to the ground under which facilities are located). In some instances, rotational (or "angular") motion may be of interest (e.g., rotation of the tip of the marking device around a pivot point when the marking device is swung by a technician). Various types of sensors/detectors may be used to detect these types of motion.

One type of motion detector is an accelerometer, which measures acceleration. Acceleration information by itself provides an indication of linear motion (e.g., along one, two, or three axes of interest). Acceleration information may also be used to assess rotational motion, as will be discussed further below. Furthermore, acceleration data may be converted into velocity data and/or position data by suitable integration, which data may also be used to assess linear and/or rotational motion of the marking device. Thus, according to various aspects of the present invention, acceleration data indicative of the acceleration of a marking device is collected during performance of a marking operation. According to some aspects, a marking device includes one or more accelerometers for collecting acceleration data.

Another type of motion detector is an inertial motion unit (IMU), which typically includes multiple accelerometers and gyroscopes (e.g., three accelerometers and three gyroscopes such that there is one accelerometer and gyroscope for each of three orthogonal axes). Information provided from those devices may be used to determine various characteristics of the motion of the marking device, such as velocity, orientation and gravitational forces. Thus, it should be appreciated that acceleration information provided by an accelerometer may be used in combination with other types of information collected by other devices to enable useful assessment of the motion of a marking device. Other types of motion detectors are also possible for detecting various characteristics of motion of interest of a marking device during a marking operation.

The type, number, configuration, and operation of motion detectors (e.g., accelerometers) used to monitor motion of a marking device, and the manner of analyzing the corresponding motion data (e.g., acceleration data), may be chosen in dependence on the purpose for which the data is being collected, as various possibilities exist and the various aspects described herein are not limited in these respects. Various purposes for which motion data may be collected are now described together with non-limiting examples of the type, number, configuration, and operation of motion detectors which may be used to satisfy those purposes. It should be appreciated, however, that data regarding the motion of a marking device may be collected for purposes other than those described below, and therefore that the following examples are provided for purposes of illustration and are not limiting. It should also be appreciated that the various concepts introduced above and discussed in greater detail below may be implemented in any of numerous ways, as the disclosed concepts are not limited to any particular manner of implementation.

Figure 3:
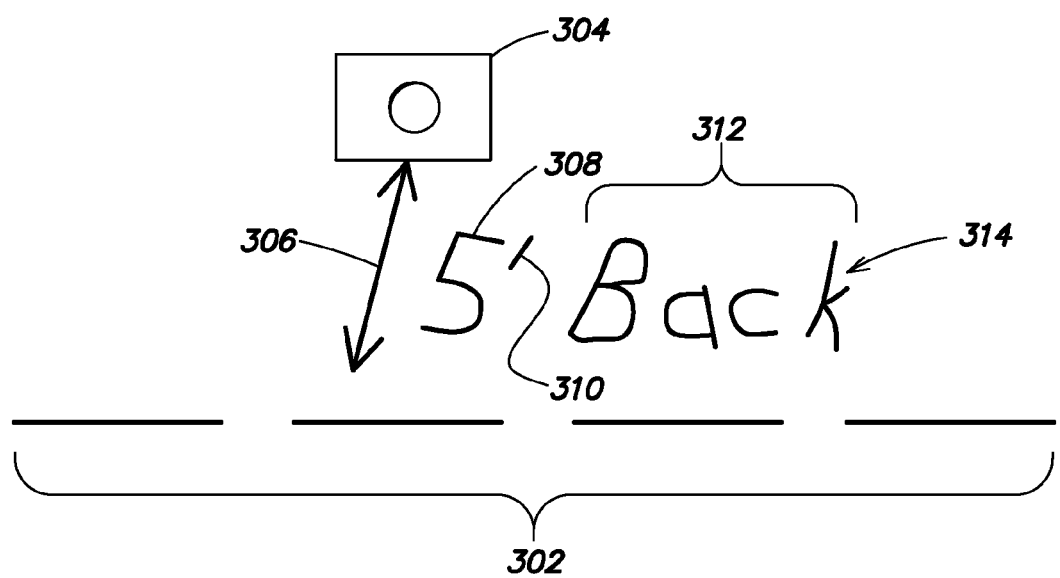
FIG. 3 illustrates a non-limiting example of the types of marks which may be made during a marking operation.

One aspect of the performance of a marking operation for which it may be desirable to collect data relates to the formation of locate marks made during the operation. For example, the marking technician may paint dot patterns or lines patterns to mark the presence or absence of an underground facility. The marking technician may form symbols, numbers, and/or letters/words during performance of the marking operation. FIG. 3 provides a top view (i.e., a bird's eye view) of a non-limiting example of the types of locate marks that are commonly made on the ground or other surface during marking operations, although other kinds are also possible. Such marks may be made with any suitable type of marking material, including paint (e.g., from a spray paint can), chalk, dye and powder, among other possibilities.

The collection of marks illustrated in the non-limiting example of FIG. 3 may be formed in a situation in which a detected underground facility is located a certain distance from an easily identifiable landmark. In such situations, a marking technician may identify the location of the facility and may also include an indication (e.g., "directions") of where the facility is relative to the easily identifiable landmark, to aid others in finding the facility in the future. Thus, in the non-limiting example of FIG. 3, the locate marks include a lines pattern 302 (so called because it includes multiple lines) which indicates the location of an underground facility. A landmark (e.g., a telephone pole) 304 is located nearby to the underground facility. Thus, the marks also include an arrow 306, which is one example of a symbol that may be formed during the marking operation, pointing from the landmark to the lines pattern, as well as the text "5' Back" (in the form of a number "5" 308, an apostrophe 310 (another example of a symbol), and the word 312 including letters 314) indicating that the facility is located five feet from the landmark in the direction of the arrow. Again, other locate marks may be formed in other scenarios, as those illustrated are merely examples. For instance, other symbols may include squares, triangles, and circles, among others. Different numbers, patterns (e.g., dotting patterns in addition to or instead of lines patterns), and words may also be marked.

It may be desirable to have a record of these types of markings or any other type of marking(s) made during the marking operation, including information such as the existence of such marks, the locations of the marks, and the quality of the marks (e.g., whether the marks are made with uniform width, uniform height, whether they are smooth, etc.). Because forming any of these types of marks typically involves moving the marking device, data indicative of the motion of the marking device during the marking operation may be used to determine the above-listed attributes (i.e., location, quality, etc.) of locate marks made during the marking operation.

According to one aspect of the present invention, data indicative of the acceleration of the marking material dispenser of a marking device is collected, for example so that such information may be used to assess locate marks made during the marking operation. When forming a locate mark by dispensing marking material, the marking material dispenser is typically located near the ultimate location at which the marking material is deposited. In particular, it is typical for the marking material dispenser to be within approximately a foot of the surface on which the marking material is being dispensed (and in some embodiments typically between six to eight inches from the surface), and often the marking material dispenser is held approximately vertically above the point(s) on the surface at which the marking material is to be dispensed (though it should be appreciated that this is not always the situation, and the various aspects described herein are not limited to situations in which a marking device is used in this manner). Thus, to form a particular mark the marking material dispenser is typically moved in a manner that simulates (or is otherwise indicative of) the resulting mark. As a non-limiting example, to paint an "S" on the ground the marking material dispenser may be moved in an "S" while the marking material (e.g., paint) is being dispensed. Thus, by monitoring the acceleration of the marking material dispenser during dispensing of marking material, information is provided about the resulting marks and their formation.

According to one embodiment of the above-described aspect, an accelerometer may be configured to monitor acceleration of the marking material dispenser of a marking device, for example by mechanically coupling the accelerometer to a portion of the marking device near the marking material dispenser. It may be preferable in some instances to directly couple an accelerometer to the marking material dispenser of a marking device, since such positioning may provide highly accurate measurements of the acceleration of the marking material dispenser. However, depending on the type of marking material dispenser used, doing so may not be practical. As an example, one type of marking material dispenser is a paint canister, with the marking material being paint. Because the paint canister will become empty at some point, and because different colors of paint may be used for different marking operation jobs or different parts of a marking operation, the paint canister may be removed from the marking device. Thus, in those embodiments in which the accelerometer is coupled directly to the paint canister, it would also be removed when the paint canister is removed. Accordingly, in another embodiment an accelerometer may be mechanically coupled to a portion of the marking device near, but not necessarily fixedly attached to, the marking material dispenser. In this manner, the accelerometer may still collect acceleration data indicative of the acceleration of the marking material dispenser, but the accelerometer will not be removed by removing/replacing the marking material dispenser itself. FIG. 4 illustrates a marking device including an accelerometer according to this non-limiting embodiment.

Referring to FIG. 4, a perspective view of a marking device 100 that includes an accelerometer 126 is presented. FIG. 4 also shows a functional block diagram of the electronics thereof. Marking device 100 has a marking dispenser 110 installed therein for dispensing marking material 112 and includes an actuator 114, which may be an electrical/mechanical actuator for activating the marking material dispensing action of marking dispenser 110. According to one non-limiting embodiment, the marking dispenser 110 may be a paint canister, and the marking material 112 may therefore be paint (e.g., spray paint), though not all embodiments are limited in this respect. As shown, the actuator 114 may comprise a trigger, such that actuation of the actuator 114 may involve squeezing, depressing, or otherwise manipulating the trigger. However, it should be appreciated that various types of actuators are possible (e.g., pushbutton, knob-actuator, etc.) and that the actuator 114 is merely a non-limiting example.

As shown, the accelerometer 126 may be positioned on (e.g., mechanically coupled to, for example by screws, adhesive, plastic molding, or in any other suitable manner) the marking device 100, therefore forming a component of the marking device 100, and in close proximity to the marking dispenser 110. However, the accelerometer 126 may be distinct from the marking dispenser 110 such that removing the marking dispenser 110 from the marking device 100 does not also remove the accelerometer from the marking device. In the non-limiting example of FIG. 4, the marking dispenser 110 is disposed near one end (i.e., the tip 115 in this case) of the marking device and thus the accelerometer is also disposed near the same end. In this way, accelerometer 126 may be used to specifically indicate the motion of the tip of marking device 100 while marking material 112 is being dispensed. The motion of the tip of marking device 100 while marking material 112 is being dispensed during locate operations is hereafter referred to as "marking motion". Accelerometer 126 may, therefore, be used to indicate the marking motion of any user (not shown) of marking device 100

The accelerometer 126 may be a single axis, dual axis, or three axis accelerometer, as the embodiment of FIG. 4 is not limited in this respect. Similarly, the accelerometer may be any suitable type of accelerometer, including any commercially available accelerometer device (e.g., an ADXL 330KCPZ-RL three axis accelerometer available from Analog Devices of Norwood, Mass.). Thus, the accelerometer 126 may detect acceleration along one or more axes (e.g., three orthogonal axes). The accelerometer 126 may produce an output signal in terms of g force or any other suitable unit. In one embodiment, the output of each axis may be a frequency (e.g., in Hz). For example, the accelerometer may be a 3-axis accelerometer that outputs a signal ranging from 0.5 Hz-550 Hz for the z-axis, from 0.5 Hz-1600 Hz for the x-axis, and from 0.5 Hz-1600 Hz for the y-axis. In some exemplary implementations, the accelerometer may output acceleration data, whereas in other implementations the accelerometer may output velocity data along each axis of detection (e.g., each of the three axes of a three axis accelerometer), as well as the orientation of the accelerometer. Examples of the type and form of data that may be provided by the accelerometer, and the types of analyses that may be performed using such data, are described below.

The marking device 100 further includes device electronics 118, although not all embodiments of marking devices including one or more accelerometer(s) are limited in this respect. The device electronics 118 may manage the overall operations of marking device 100, and thus may have any suitable components for achieving this function. In one embodiment, as shown, device electronics 118 may include, for example, a processing unit 120 and a quantity of local memory 122 (i.e., local storage) that may be used to store any device data 124 (e.g., acceleration data from the accelerometer 126 or data used by the accelerometer, as well as data from any other input devices). In some embodiments, the processing unit may control or direct storage of the device data in the local memory, for example by polling devices (e.g., the accelerometer 126) and directing the data to the local memory. The accelerometer 126 may be considered part of the device electronics 118, or alternatively may be considered distinct from the device electronics 118, as the illustrated embodiment is not limited in this respect.

Processing unit 120 may be any standard controller or microprocessor device that is capable of executing program instructions, and in one non-limiting embodiment may be an Atom™ processor available from Intel Corporation of Santa Clara, Calif. Memory 122 may be any type of data storage for storing any information that is processed locally at marking device 100.

During locate operations the information from accelerometer 126 (hereafter called accelerometer data) may be stored in device data 124 of the local memory 122. In this example, processing unit 120 may be programmed to continuously acquire and store the accelerometer data at programmed intervals, such as every 100 milliseconds. However, other time intervals are also possible, and may in some embodiments be chosen to coincide with a sample rate of the accelerometer (e.g., in the kHz range, MHz range or higher). Timestamp information (e.g., date and time) from processing unit 120 may be incorporated into each record of accelerometer data in device data 124. At a later time, device data 124, which may include the accelerometer data, may be offloaded from the local memory 122 of marking device 100 to an external computing device for processing. In one example, the device data 124 of one or more locate operations may be offloaded daily or weekly in bulk from the local memory 122 of marking device 100 to an external computing device (not shown) for processing. One way to implement this embodiment is to provide local memory 122 in the form of a removable memory device, such as, but not limited to, a Universal Serial Bus (USB) flash drive memory device, which is installed in a USB port (not shown) of marking device 100.

In another embodiment of the present disclosure, device electronics 118 of marking device 100 may further include a user interface 128, an actuation system 130 that is fed by actuator 114, a communication interface 132, and any other input devices 134.

User interface 128 of marking device 100 may be formed of any mechanism or combination of mechanisms by which the user (e.g., a locate technician) may operate the marking device and by which information that is processed by the marking device may be presented to the user. For example, user interface 128 may include, but is not limited to, a display, a ruggedized touch panel, one or more manual pushbuttons, one or more toggle switches, a keypad, an audio speaker, an audible buzzer or alert mechanism, a microphone, and any combinations thereof.

Actuation system 130 of marking device 100 may be mechanical and/or electrical in nature and may be coupled to and triggered by a mechanical and/or electrical actuator mechanism, such as actuator 114. In some embodiments, the actuation system 130 may be coupled to an actuator of marking dispenser 110 such that combined action of the actuator and the actuation mechanism causes marking material 112 to be dispensed. "Actuation" means starting or causing any device (e.g., marking device 100), program, system, and/or any combination thereof to work, operate, and/or function. Actuations of marking device 100 may be performed for any purpose, such as, but not limited to, for dispensing marking material and for capturing any information of any component of marking device 100 (e.g., the accelerometer) irrespective of whether marking material is dispensed.

When actuation system 130 is present in marking device 100, rather than capturing accelerometer data continuously, processing unit 120 may be programmed to monitor actuation system 130 and acquire and store the accelerometer data only during actuations of marking device 100. However, other schemes for collection of acceleration data, including continuously and periodically are also possible. Furthermore, in those embodiments in which accelerometer data is collected upon actuation of the actuator, the actuation may trigger collection of a single acceleration data value, a pre-determined number of acceleration data values (e.g., 5 values, 10 values, 20 values, etc.), continuous capture of acceleration data while the actuator is actuated, or periodic data capture throughout the duration of the actuation, among other possibilities.

Communication interface 132 may be any wired and/or wireless communication interface for connecting to a network (not shown) or external device (e.g., a server, a computer, etc.) and by which information (e.g., acceleration data, instructions, etc.) may be exchanged with (i.e., transmitted to and/or received from) other computing devices that may be separate from marking device 100. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

When communication interface 132 is present in marking device 100, there exists the option of storing the accelerometer data in device data 124 of local memory 122 and offloading the information periodically, as described above. However, there further exists the option of transmitting device data 124 to the external computing device in real time and/or in non-real time. For example, in some embodiments, the accelerometer data may be directly communicated off the marking device 100 via communication interface 132, without storing it on the marking device. For example, in some embodiments the marking device 100 may not include a local storage, so that the accelerometer data may be directly communicated off of the marking device via the communication interface 132.

Marking device 100 may further comprise additional input devices. Examples of other input devices 134 may include, but are not limited to, one or more of the following types of devices: a timing system 127 which may be any suitable timekeeping system (e.g., a clock, oscillator, etc.) for monitoring passage of time and which, in some embodiments, may provide a timestamp to the processing unit, a location tracking system, a marking material detection mechanism, a temperature sensor, a humidity sensor, a light sensor, a compass, an inclinometer, an image capture device, an audio recorder, and the like.

When other input devices 134 are present in marking device 100, readings from those other input devices 134 (hereafter called input device data) may be captured along with the accelerometer data in order to supplement the accelerometer data with any other useful information about locate operations.

It should be appreciated that in at least one embodiment of the present invention, many of the components illustrated in FIG. 4 may be optional. For example, a simple marking device may be provided according to one embodiment, including only an accelerometer and a processing unit, or an accelerometer and a processing unit and local storage. Alternatively, in one embodiment, a marking device may include only an accelerometer and a communication interface suitable to communicate the acceleration data to an external device. The other input devices and electronics illustrated in FIG. 4 may be optional in such embodiments.

Figure 5A:
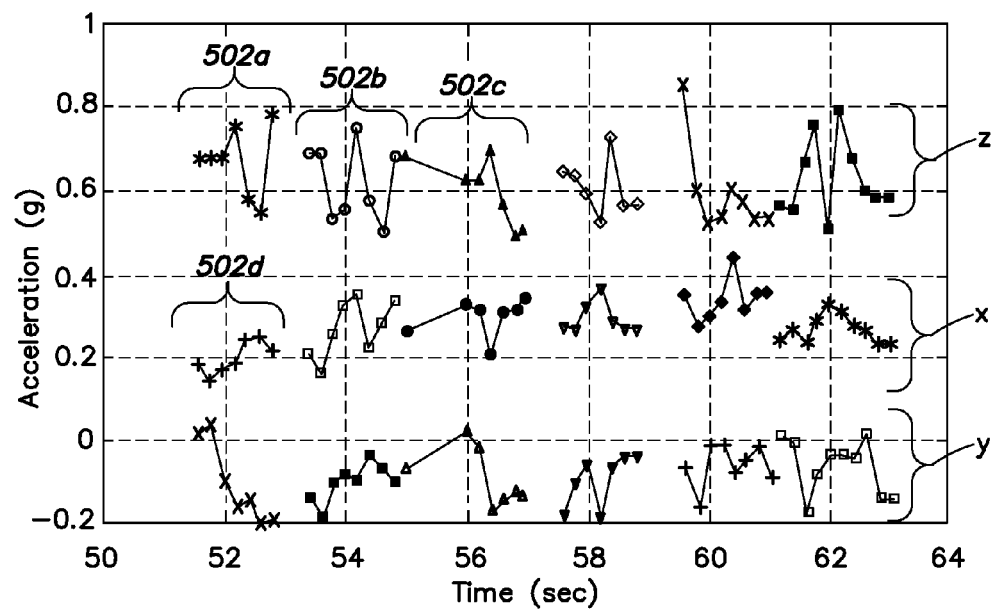
FIGS. 5A-5C illustrate acceleration data which may be collected in connection with forming marking patterns of the types illustrated in FIGS. 6A-6C, respectively.
Figure 5B:
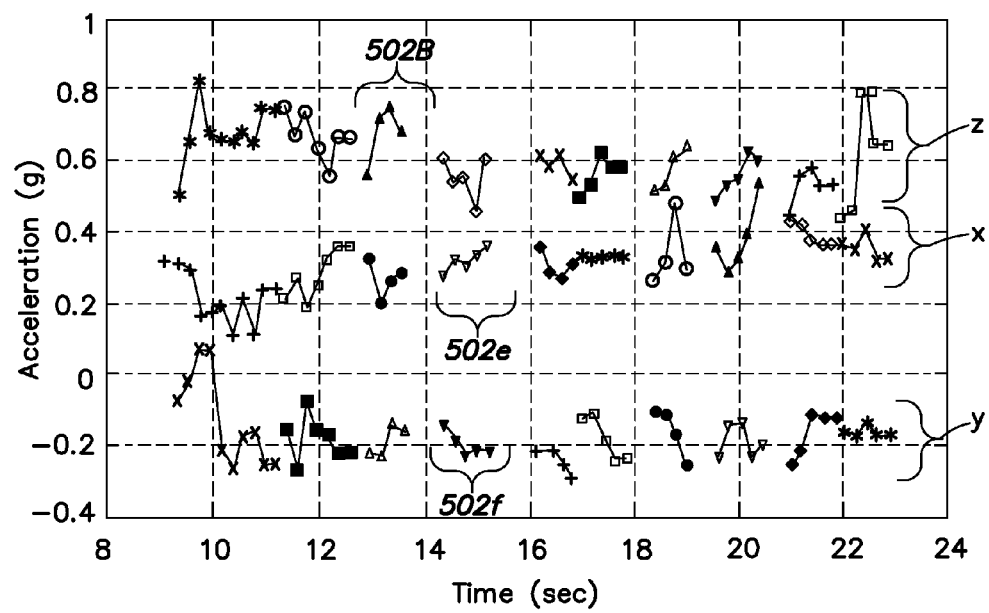
Figure 5C:
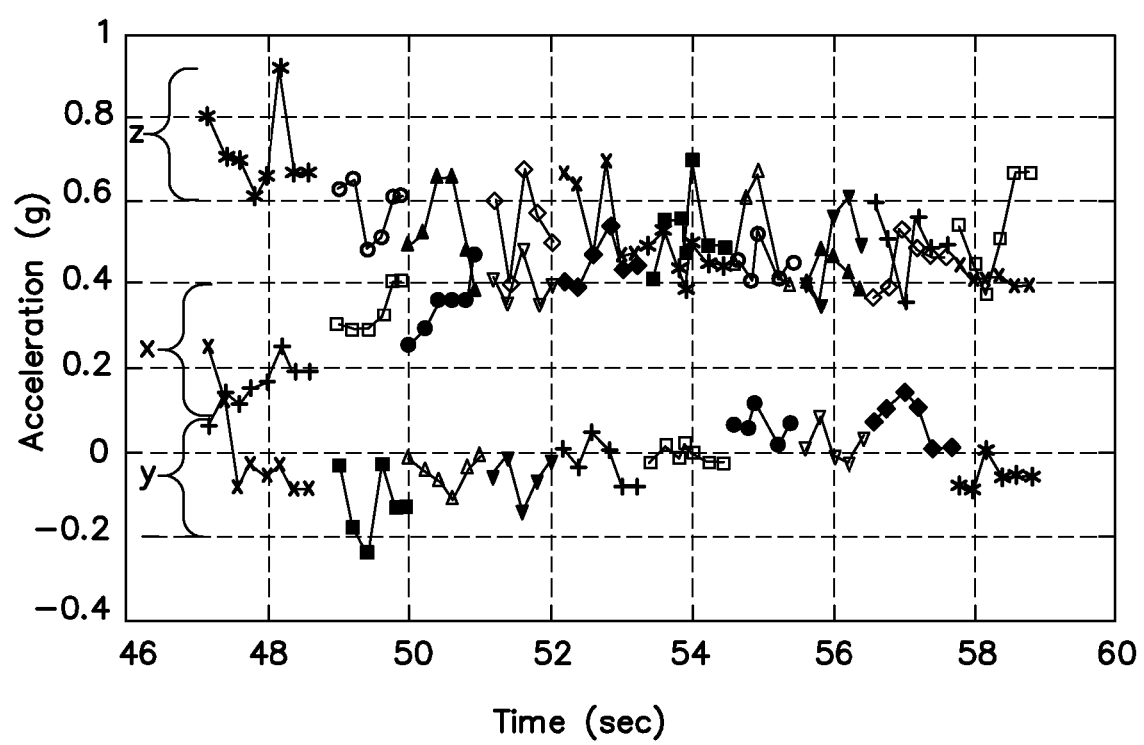

As mentioned, the type and form of data output by an accelerometer of a marking device, such as accelerometer 126 in FIG. 4, may take any of various possibilities, and the various aspects described herein relating to marking devices including accelerometers are not limited in this respect. FIGS. 5A-5C illustrate examples of acceleration data which may be collected during performance of a marking operation using a marking device of the type illustrated in FIG. 4 to form locate patterns of the three types shown in the corresponding FIGS. 6A-6C, i.e., the data of FIG. 5A corresponds to a pattern of the type illustrated in FIG. 6A, the data in FIG. 5B corresponds to a pattern of the type illustrated in FIG. 6B, and the data in FIG. 5C corresponds to a pattern of the type illustrated in FIG. 6C. For purposes of this non-limiting example, it is assumed that FIG. 6A represents a high quality marking pattern while 6C represents a low quality marking pattern.

Each of FIGS. 5A-5C includes acceleration data for x, y, and z axes, as may be collected by use of a three axis accelerometer. The y-axis of each graph represents the magnitude of acceleration in units of g, while the x-axis illustrates time in seconds. With respect to this non-limiting example, the acceleration data is assumed to be collected during actuation of the actuator of the marking device, rather than continuously during operation of the marking device. Thus, the acceleration data for each axis includes multiple distinct segments (e.g., segments 502a-502d) corresponding to the multiple actuations used to create the patterns of FIGS. 6A-6C, though it should be noted that the number of distinct data segments in FIGS. 5A-5C does not exactly match the number of distinct marks in the respective FIGS. 6A-6C since the illustrated marks are merely examples of the types of marks corresponding to the data of FIGS. 5A-5C and not the actual marks to which FIGS. 5A-5C correspond.

Figure 7A:
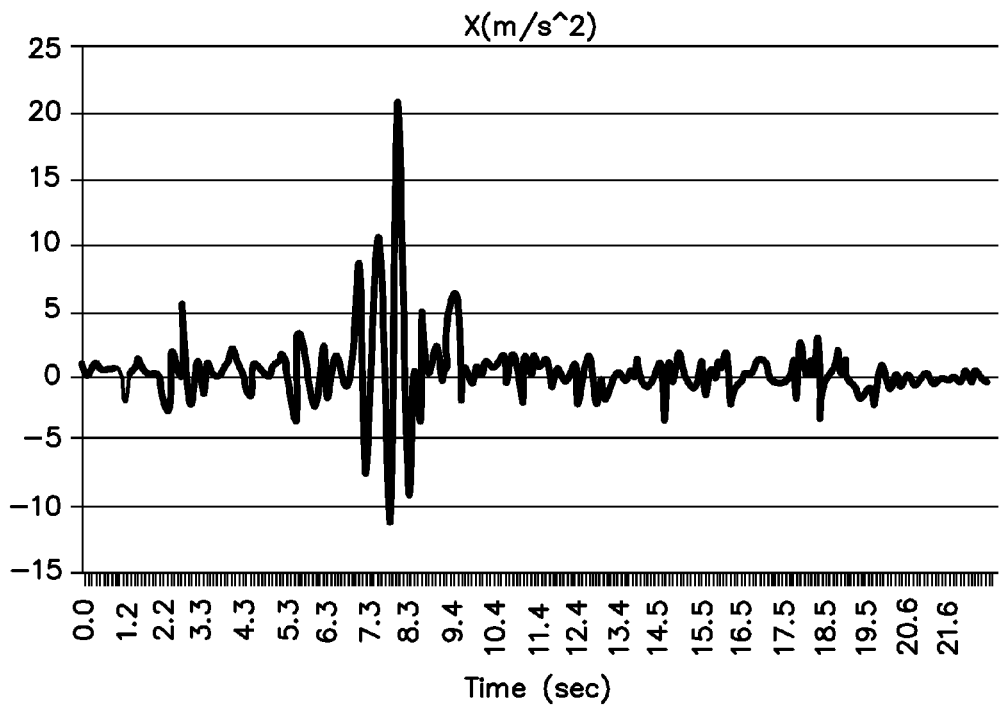
FIGS. 7A-7C illustrate acceleration data for the x, y, and z axes, respectively, of an accelerometer as collected during improper use of a marking device.
Figure 7B:
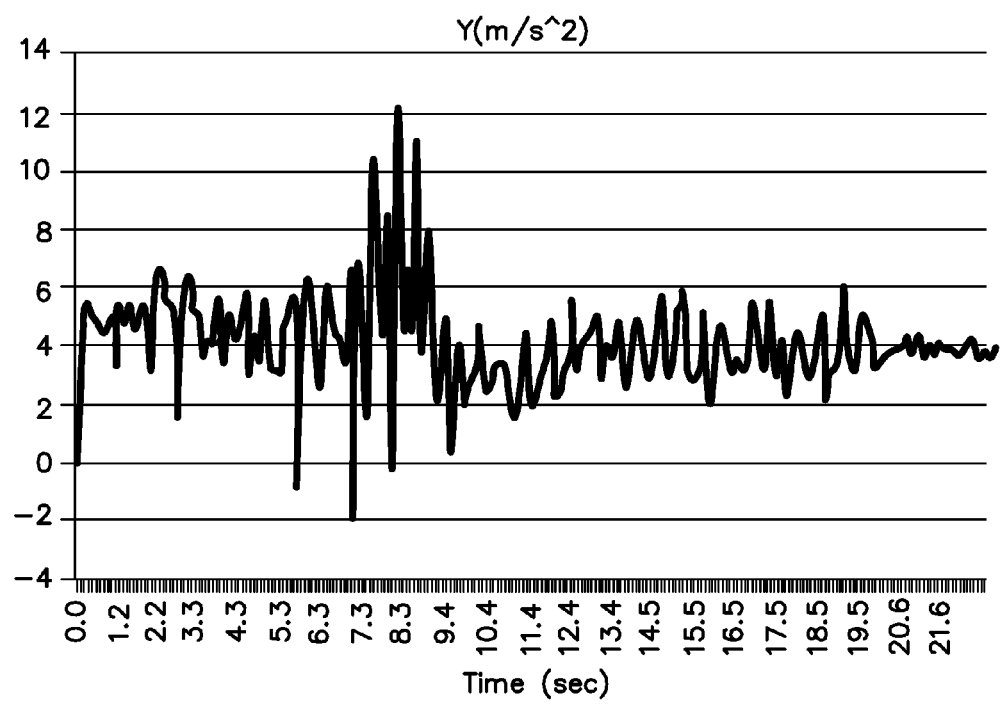
Figure 7C:
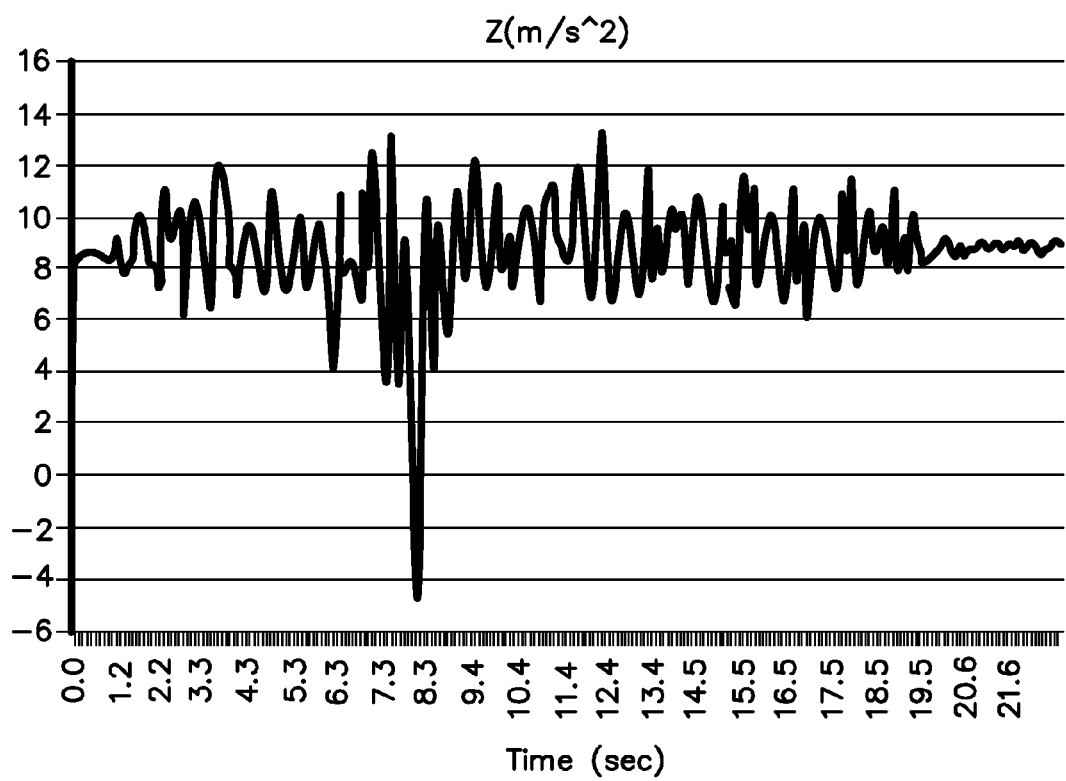

It should be noted that various data point collections may be referred to as "segments" herein. For example, the segments 502a-502d are "segmented" in that they are separated from surrounding data points by periods in which no data was collected (i.e., when the actuator was not actuated in the examples of those figures). However, as described elsewhere herein, in some embodiments data may be collected continuously or otherwise collected at times not limited to when the actuator is actuated. FIGS. 7A-7C, described further below, illustrate examples. As shown therein continuous data collection may be characterized by substantially zero value or substantially constant, but non-zero, value data with pockets (or "periods") of deviation corresponding to changes in acceleration. Those periods of deviation may also be referred to as "segments" herein as they may be sufficiently isolated from neighboring pockets of non-zero or non-constant value data as be effectively distinct.

Figure 6A:
Figure 6B:
Figure 6C:
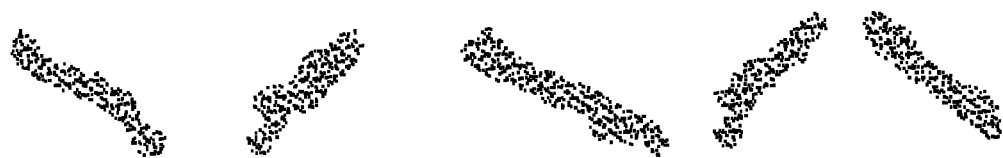

Various aspects of the quality of the marks illustrated in FIGS. 6A-6C may be determined from the data illustrated in FIGS. 5A-5C. For example, the magnitude of the acceleration values, the trend (if any) of the acceleration values, the periodicity of the distinct data segments, and the duration of the distinct data segments, among other features of the data, may all provide an indication as to the quality of the marks formed. Examples are now given.

Referring to FIGS. 5A-5C, the magnitude of the illustrated acceleration values may provide an indication of the quality of marks formed. For example, in some situations there may be pre-determined acceptable acceleration tolerances within which the acceleration data should fall if the marking device is being used properly by the marking technician to form a locate mark. As a non-limiting example, it may be determined that the marking device should never be accelerated at more than, for example, 2.0 g in some embodiments, or 10 m/s$^2$ in other embodiments, or any other suitable value when forming a mark since it may be that no aspect of performing a marking operation should require such accelerations. This may represent one aspect of a standard operating procedure with which marking technicians may be expected to comply in some embodiments. Marks formed when accelerating the marking device at more than, for example, 2.0 g, 10 m/s$^2$, or some other predetermined value may be inaccurate, and use of the marking device in such a manner may be dangerous and/or possibly destructive of the marking device itself. Thus, in such a situation, it may be seen from the data in FIGS. 5A-5C that the marks were all formed within acceptable tolerances, i.e., no acceleration value exceeded 2.0 g. Therefore, it may be concluded, for example, that the marks formed were likely accurate. As a counterexample, the acceleration data illustrated in FIGS. 7A-7C for the x, y, and z axes, respectively, may represent data collected when, for example, the marking technician is using the marking device to fend off an attacking dog, which may represent one form of improper use of the marking device. As seen from those figures, the acceleration values may exceed acceptable tolerances (e.g., 10 m/s$^2$), indicating that something occurred during the marking operation that was out of the ordinary, outside standard operating procedures, and which may require further investigation.

Another feature of the acceleration data illustrated in FIGS. 5A-5C which may provide an indication of the quality of marks performed during the marking operation is the trend of the data. For example, referring to FIG. 5A, it can be seen that the acceleration values for each axis remain approximately constant throughout formation of the lines pattern (i.e., the acceleration values for the z axis are centered slightly above 0.6 g, the acceleration values for the x axis are centered at approximately 0.3 g, and the acceleration values for the y axis are centered at approximately −0.1 g.). Such consistency of values may indicate, for example, that a line being formed is straight since moving in a straight line may generally result in substantially consistent acceleration along each of the detected axes. By contrast, referring to FIG. 5C, which corresponds to the formation of low quality marks as shown in FIG. 6C, and in particular to a lines pattern that is not substantially straight, it can be seen that the acceleration values along various ones of the axes tend not to be consistent, but rather tend to increase or decrease in value during formation of the pattern. For instance, referring to FIG. 5C, the z-axis data trends downward (i.e., from being centered initially around 0.7 g to being centered around 0.5 g toward the end of the illustrated time) and the x-axis data trends upward (i.e., from being centered around approximately 0.3 g at the start of the data collection to being centered around 0.5 g toward the end of the illustrated time). The illustrated trends in FIG. 5C correspond, in this non-limiting example, to lower quality marks than those formed in FIG. 6A, and thus the trending values may provide an indication of the quality.

FIGS. 7A-7C provide another illustration of how the trend of the acceleration data may provide an indication of the quality of any mark being formed. As mentioned, the figure illustrates data which may represent, for example, a scenario in which a marking technician improperly uses the marking device to fend off an attacking dog. The sudden, erratic burst of activity indicated by the acceleration data along all three axes as well as the magnitude of the acceleration data indicate that the marking device was not wielded in a controlled manner, and thus that the quality of any resulting marks is likely low.

The duration of the acceleration data segments illustrated in FIGS. 5A-5C may also provide an indication of the quality of marks formed, as well as the type of mark formed. The data of FIG. 5A corresponds to formation of a high quality lines pattern of the type illustrated in FIG. 6A. The data in FIG. 5B corresponds to the formation of the pattern shown in FIG. 6B, which may resemble a reasonably accurate dotting pattern or a poor lines pattern (e.g., because the marks are too short to represent lines). Some of the distinct acceleration data segments for each of the three axes (i.e., the x, y, and z axes) in FIG. 5A are longer than the data segments in FIG. 5B. Thus, the data in FIG. 5A indicates that longer marks were formed than those indicated by the data of FIG. 5B, and thus indicates that different types of marks (i.e., lines pattern v. dotting pattern) were formed. Similarly, to the extent that the data is intended to correspond to formation of a particular type of mark (e.g., if the data of both FIGS. 5A and 5B is meant to correspond to formation a lines pattern), the quality of the mark may be determined from the duration of the acceleration data segments. As an example, the data segments 502e-502g may be too short for lines of a lines pattern and therefore, if those data segments relate to a technician's formation of a lines pattern, indicate that the lines pattern is of poor quality.

The periodicity of the distinct acceleration data segments illustrated in FIGS. 5A-5C for each axis may also be indicative of the quality of the marks formed. For example, a more consistent periodicity may indicate that the marking technician consistently spaced marks within a pattern (e.g., consistently spaced lines of a lines pattern or consistently spaced dots of a dotting pattern), which may represent a higher quality pattern than if the marks are inconsistently spaced. Thus, analysis of the periodicity may provide an indication of the quality of the marks made.

It should be reiterated that the form of acceleration data illustrated in FIGS. 5A-5C and 7A-7C is not limiting. For example, while the data in FIGS. 5A-5C exhibits distinct segments corresponding to actuation of the actuator, acceleration data collected by an accelerometer of a marking device is not limited in this respect. For example, as previously mentioned, acceleration data may be collected continuously or periodically in some embodiments (e.g., as in FIGS. 7A-7C), irrespective of whether the actuator is actuated. In such situations, distinct "periods" or "segments" of non-zero or non-constant value acceleration (which may also be referred to as "periods of activity") may still occur and be identifiable. The number, timing, and periodicity of such periods of activity within a larger acceleration data set may be used similarly to the data segments described above to provide similar types of information relating to the quality and types of marks formed.

As previously mentioned, acceleration data may also be converted to velocity data by suitable integration. Doing so may be facilitated by correlating the collected acceleration data to time in any suitable manner, for example by applying a timestamp to the collected acceleration data. Such a timestamp may be provided by, for example, the processor of the marking device or in any other suitable manner. Furthermore, integrating acceleration data from an accelerometer to obtain velocity data may be facilitated by knowing the initial velocity of the marking device at the beginning of the period over which the integration is to take place. In some embodiments, this may be facilitated by starting the marking device from zero velocity (i.e., a dead stop). Furthermore, the integration may be facilitated by focusing on a single axis (e.g., x-axis acceleration) in those situations in which data from more than one axis is collected.

Figure 8A:
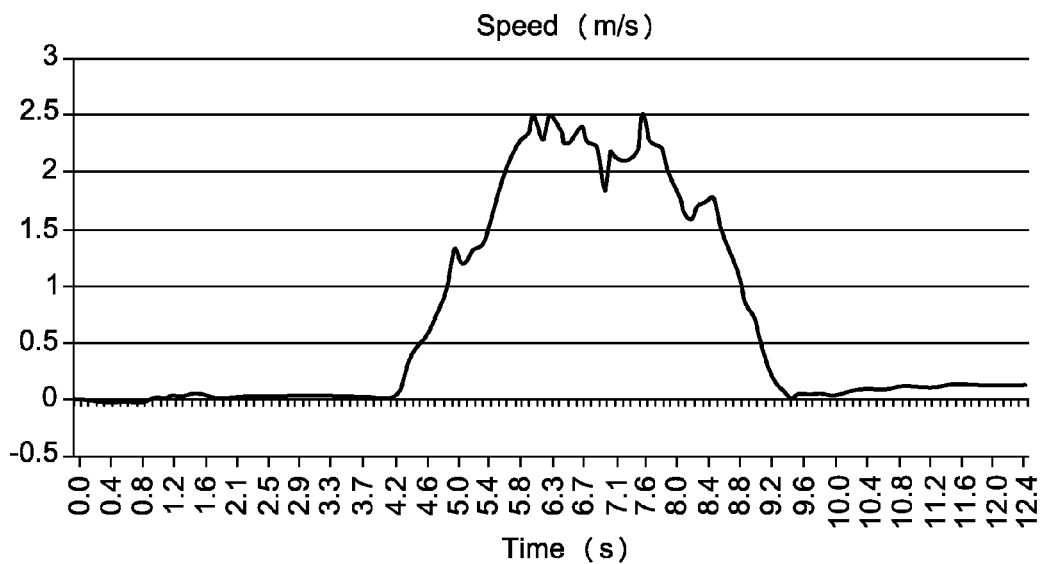
FIGS. 8A and 8B illustrate velocity data of the type that may be associated with fast (FIG. 8A) and slower (FIG. 8B) marking practices.
Figure 8B:
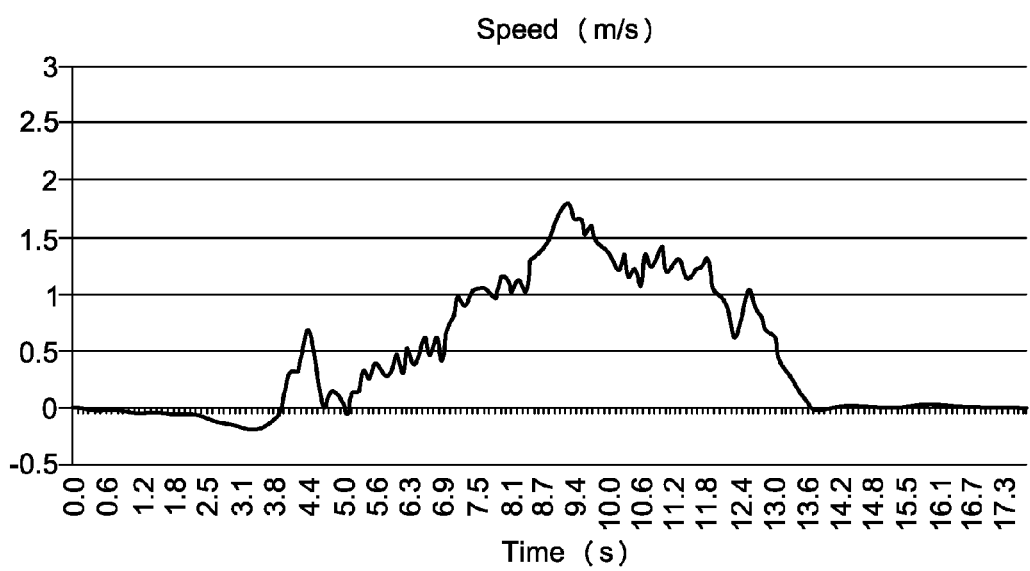

The same characteristics of velocity data as those of acceleration data (e.g., number of distinct data segments, magnitudes and trends of data, periodicity, periods of activity, etc.) may be used to assess the quality of marks formed during a marking operation and/or the quality of performance of a marking operation in general. As a non-limiting example, FIGS. 8A-8B illustrate plots of velocity data as a function of time, which data may be developed from acceleration data (e.g., integrated from acceleration data) collected by an accelerometer of a marking device (e.g., accelerometer 126 of marking device 100). As shown, the magnitudes of the velocity illustrated in FIG. 8A are greater than those of FIG. 8B. For purposes of explanation, it will be assumed that the accuracy of marking deteriorates when a mark is formed at greater than two meters/second. In that case, the data of FIG. 8A would indicate that any mark formed while the illustrated velocity data was collected would likely be inaccurate, since the velocity values exceed two meters/second for much of the period of activity illustrated. By contrast, a mark formed during collection of the velocity data of FIG. 8B may be more likely to be accurate since it was formed at a slower pace. Thus, the magnitude of velocity data derived from acceleration data may be used to assess quality of marking operations.

As also mentioned previously, acceleration data collected by an accelerometer of a marking device may be converted to positional data by suitable integration. As with the previously described integration to obtain velocity data, such integration to achieve positional data may be facilitated by starting the marking device motion from zero velocity (i.e., a dead stop) and focusing on one axis of motion. Positional data may be useful for a variety of reasons. For example, in some situations it may be desirable to know the location (e.g., geolocation) of any marking material dispensed by a marking device and therefore the location of the resulting locate marks.

According to some embodiments, the location of any dispensed marking material may be approximated by the location of virtually any point on the marking device itself (e.g., by acquiring geo-location information from a location tracking system coupled to the marking device). However, as previously described, in forming any given mark the marking material dispenser may be moved in a pattern that corresponds to the pattern of the resulting mark. Thus, tracking the position of the marking material dispenser or a portion of the marking device near the marking material dispenser (e.g., as in the configuration of marking device 100 of FIG. 4) may facilitate determination of the resulting mark/pattern and its location. Accordingly, in some embodiments, it may be preferable to track the location of the tip of the marking device, for example when the marking material dispenser is located near the tip of the marking device. Considering the marking device of FIG. 4 as a non-limiting example, this may be accomplished by integrating the acceleration data provided by accelerometer 126 to obtain position data representing the distance traveled by the tip 115 of the marking device while dispensing marking material. In some instances, it may be sufficient to determine the distance traveled in only two directions (along the x and y axes when the x and y axes form an xy plane parallel to the ground or other surface on which the marking material is being dispensed). In other scenarios, it may be desirable to know distances traveled in three axes. Thus, the type and configuration of accelerometer (e.g., single axis v. three axis) may be selected depending on whether positional data along one, two, or three axes is desired.

In view of the foregoing, in one exemplary embodiment, the accuracy of the dispensing location of marking material may be improved by selecting a point on the marking device sufficiently close to the point from which marking material is dispensed. For example, in some implementations the marking material may be dispensed near the tip of the marking device (e.g., as in FIG. 4), such that determination of the location of the tip of the marking device may provide a sufficiently accurate approximation of the location of the dispensed marking material, and therefore a determination of the resulting marking pattern (e.g., dots, lines, symbols (e.g., arrows), numbering, lettering, etc.). In addition, determining the motion of the tip of the marking device may allow for assessment of technician manipulation of the marking device, which may be used for quality control, training purposes, and standard setting, among other things. Thus, according to another aspect of the present invention, methods and apparatus are provided for determining the location of the tip of a marking device. However, it should be appreciated that the tip of the marking device is a non-limiting example of a specific point of a marking device for which it may be desirable to know the location, as, for example, other portions of the marking device may be closer to the point from which marking material may be dispensed depending on the configuration of the marking device. The methods and apparatus described herein may be applied equally well to the determination of any point of interest on the marking device.

Figure 9:
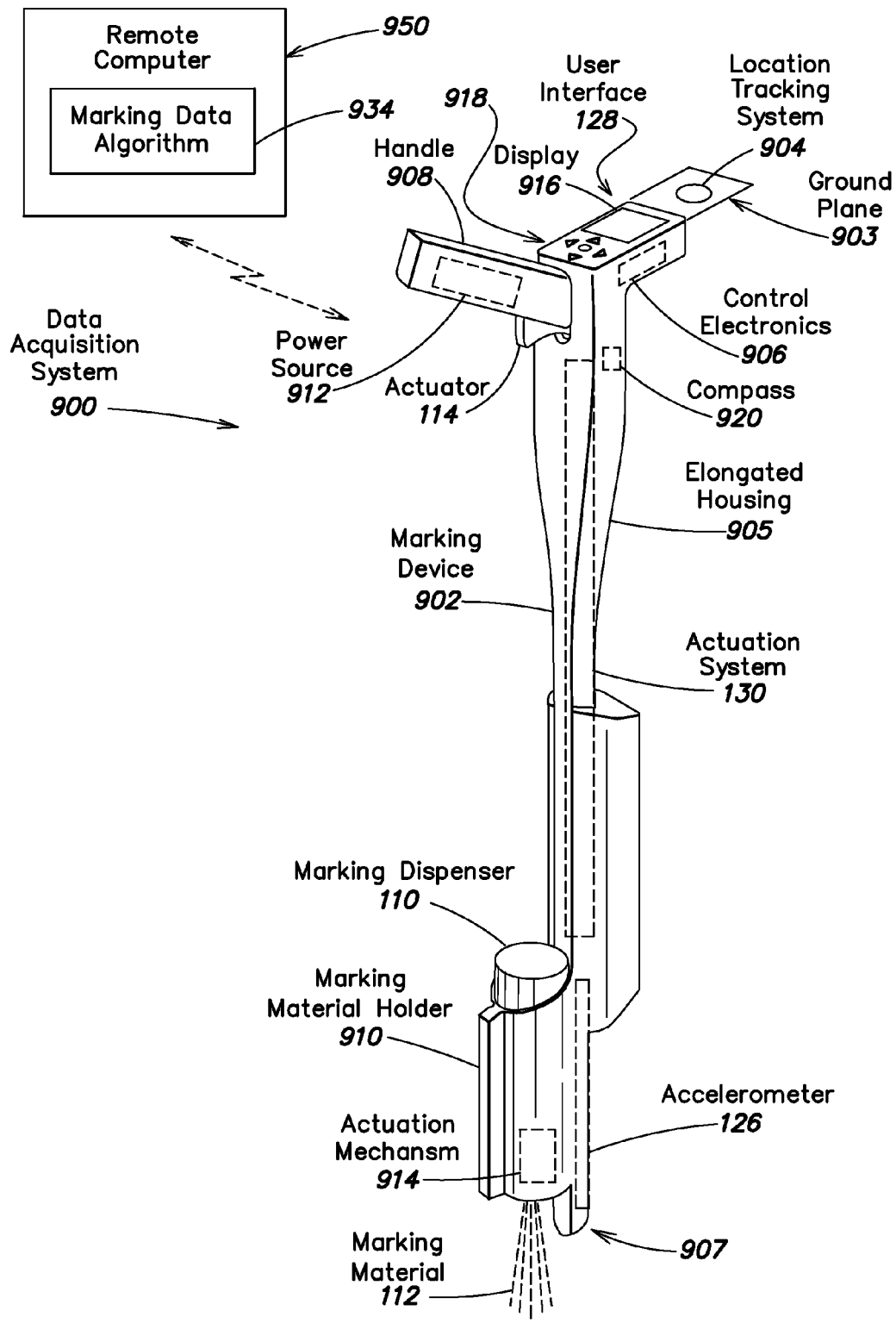
FIG. 9 illustrates a perspective view of a data acquisition system including a marking device having both an accelerometer and a location tracking system.

The location (e.g., geo-location) of a marking device may be provided by a location tracking system, which in some embodiments may be part of the marking device. A non-limiting example is illustrated in FIG. 9, which is a perspective view of a marking device 902 including, among other things, a location tracking system 904. The marking device 902 is illustrated in combination with a remote computer 950, together forming a data acquisition system 900. The remote computer 950 may include and execute a marking data algorithm 934 which may, in some embodiments, process marking data (e.g., acceleration data, velocity data, location data, and/or any other types of data related to and/or collected during performance of a marking operation). The remote computer may be communicatively coupled to the marking device during a marking operation, for example via a communication interface (e.g., communication interface 132 of FIG. 4, but not illustrated in FIG. 9), or in any other suitable manner. In some embodiments, the remote computer 950 and marking device 902 may not communicate during a marking operation, but rather may communicate before or after performance of a marking operation, for example in scenarios in which the data collected by marking device 902 is downloaded to the remote computer at the end of a marking operation. Other operating schemes are also possible, as these are non-limiting examples.

Figure 2:
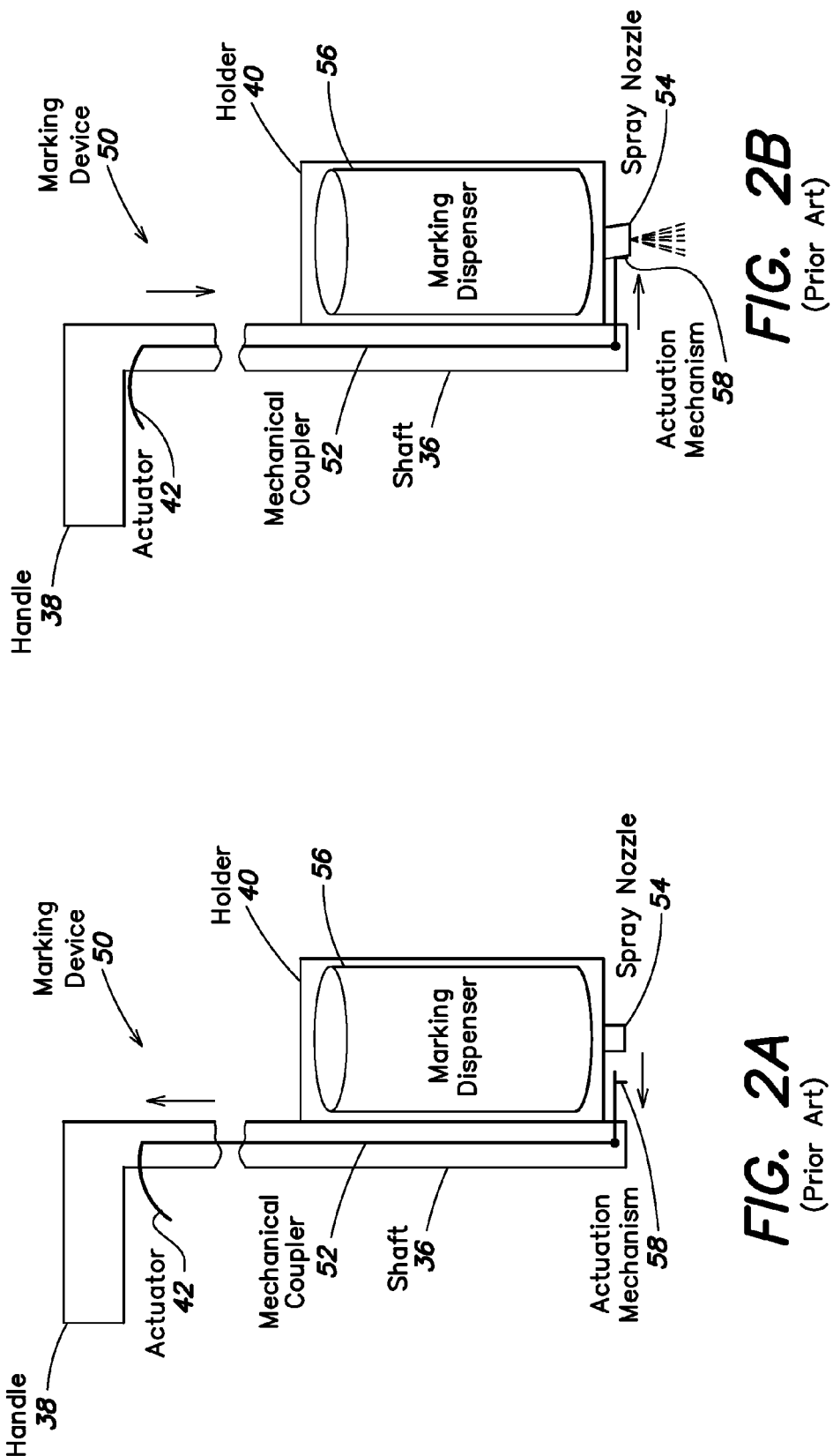
FIGS. 2A and 2B illustrate a conventional marking device with a mechanical actuation system to dispense paint as a marker.

In addition to the location tracking system 904, which will be described in further detail below, the marking device 902 includes several components either not included on the marking device 100 of FIG. 4 or not explicitly mentioned there, so that they are now described for completeness. Components already shown and described with respect to FIG. 4 are illustrated in FIG. 9 with the same reference numbers and are not explicitly described again now. As shown, the location tracking system is disposed on an optional ground plane 903 configured to form an electrical ground for the location tracking system. The marking device 902 also includes an elongated housing 905, with the handle 908 at one end (within which a power source 912 may be disposed for powering the electronics of the marking device, although not all embodiments are limited in this respect) and the tip 907 at an opposing end. The housing also forms a marking material holder 910 for holding the marking dispenser 110. the actuation system 130 is connected to an actuation mechanism 914 (e.g., of the type described in FIGS. 2A and 2B). The control electronics 906 may be substantially the same as device electronics 118 of FIG. 4, for example including a processor or processing unit and/or memory, among other possible electronics. The user interface 128 includes, in the non-limiting example of FIG. 9, a display 916, which may be any suitable display for visually displaying information to a technician. In addition, the user interface may include one or more buttons 918, knobs, switches, etc. for allowing user interaction with the marking device, and may also include a microphone and/or speaker for audio input from the technician and audio output to the technician. The marking device may optionally include a compass 920, which may be a digital compass in some embodiments providing direction relative to true North.

In this non-limiting embodiment, the location tracking system may be a GPS receiver, although other types of location tracking systems (e.g., triangulation systems, etc.) are also possible. The location tracking system may provide an output in any suitable form indicating the location of the marking device. Thus, by monitoring the data provided by the location tracking system, the location of any dispensed marking material may be determined, for example by assuming that the marking material is dispensed at approximately or substantially the same location as the location tracking system. The validity of such an assumption may depend on the position of the marking device at which the location tracking system is located relative to the position from which marking material is dispensed. For example, according to one embodiment the location tracking system may be located next to the marking material dispenser, such that assuming that the location of the dispensed marking material is that reported by the location tracking system may be valid.

Yet, in some embodiments, such as that shown in FIG. 9, the location tracking system may not be located in close proximity to the marking material dispenser (i.e., the point from the which the marking material is dispensed in the illustrated non-limiting embodiment). Such may be the situation when, for example, the location tracking system is a GPS receiver or other device whose operation may be improved by being placed near the top (or upper end) of the marking device. For example, GPS receivers may experience less interference and have a better view of GPS satellites when located as shown in FIG. 9. Even in such situations, the assumption that the location of any dispensed marking material is that of the location tracking system may be sufficient depending on the degree of accuracy sought in the determined location of the marking material and how the marking device is held while dispensing (e.g., holding the marking device vertically over the spot of dispensing may increase the accuracy of the assumption). However, in other situations it may be preferable to know the location of the tip of the marking device when the marking material dispenser is located there with greater accuracy than is afforded by having the location tracking system located as shown in FIG. 9.

Thus, according to one embodiment, methods and apparatus are provided for determining the location of a point of interest of a marking device when a location tracking system is located at a different point on the marking device. The accelerometer 126 and corresponding acceleration data may be useful in some such embodiments. For simplicity of explanation, the following examples will be discussed assuming that a location tracking system is located near the top (or upper end) of the marking device and that the point of interest of the marking device is the tip of the marking device. It should be appreciated that the described apparatus and techniques may apply equally well to other positions of the location tracking system and points of interest on the marking device.

Figure 10:
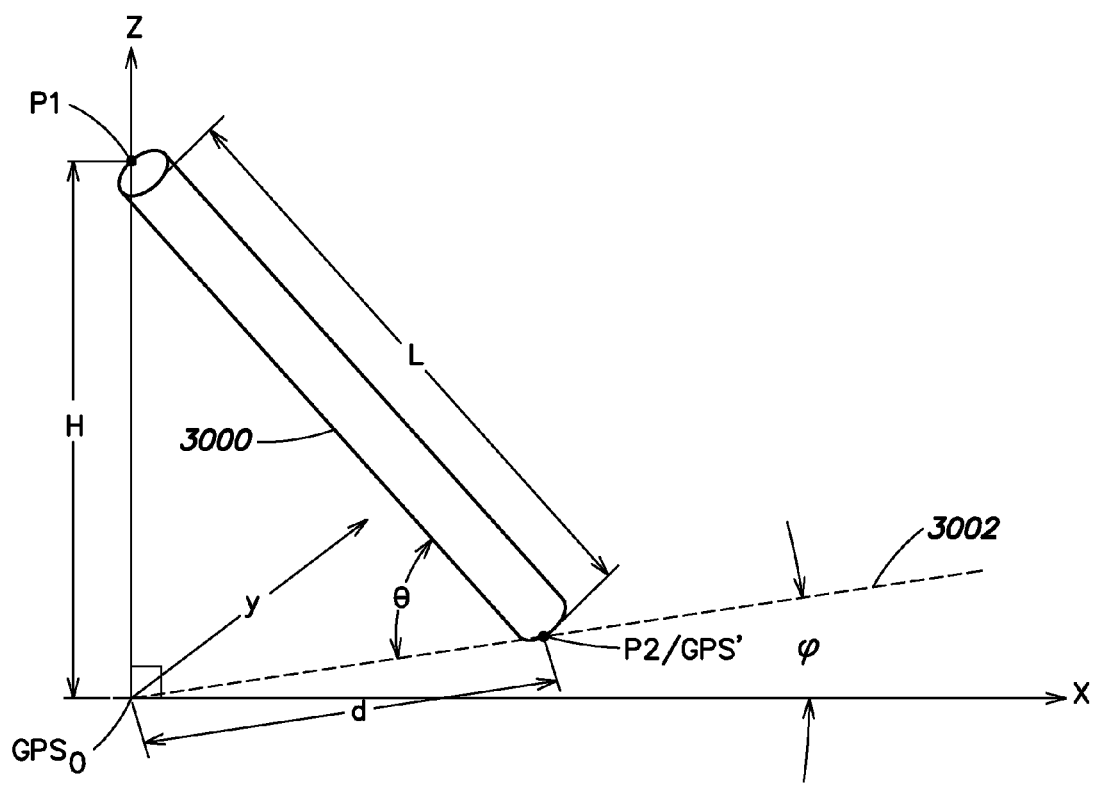
FIG. 10 is a schematic diagram illustrating a configuration for determining the difference in location between two points of a marking device.

To facilitate the following discussion, it is useful to first consider the physical configuration at issue for determining the location of the tip of the marking device when the location tracking system is located at or near the top of the marking device, as in FIG. 9. For this purpose, the marking device may be represented in simplified form as an elongated rod or stick. FIG. 10 illustrates a perspective view of such a simplified representation of a marking device, shown as marking device 3000.

In FIG. 10, the x-y plane represents the ground and the z-direction represents the vertical direction perpendicular to the ground. The point P1 may be the location of a location tracking system (e.g., a GPS receiver), and in some embodiments may correspond generally to the top of the marking device, for example near where the technician may hold the marking device if it is a handheld device. The point P2 represents the point of interest of the marking device, and in this non-limiting example corresponds generally to the tip of the marking device. The point P2 may be assumed to be at ground level, i.e., in the x-y plane (z=0) for purposes of simplicity, although in alternative embodiments this assumption may be avoided by directly measuring the height of the point P2 from the x-y plane. The shortest distance between P1 and P2 is given by L, which in some embodiments may correspond to the length of the marking device, although not all embodiments are limited in this respect. For example, if the marking device has a non-linear shape, the distance L may not correspond to the length of the marking device. The marking device 3000 may be projected onto the x-y plane (z=0) along the dashed line 3002, which therefore lies in the x-y plane. The distance between the points P1 and P2 in the x-y plane (i.e., along the dashed line 3002) is represented by d. The distance between the point P1 and ground is given by H (i.e., z=H). At any given time, the marking device may make an angle $\theta$ with respect to the x-y plane, i.e., with respect to ground in this non-limiting example. The projection of the marking device on the x-y plane, i.e., along the line 3002, may be at an angle $\phi$ in the x-y plane with respect to the x axis. In some embodiments, the x-axis may be defined to align with true North, although not all embodiments are limited in this respect.

According to one embodiment, a marking device, such as marking device 3000, may comprise a location tracking system at the point P1. The location tracking system may provide the geo-location of the point P1 with respect to the x-y plane, represented as $GPS_o$. The geo-location of P2 in the x-y plane may be represented by GPS'. As will be explained, GPS' may be determined based on a value of $GPS_o$ given by a location tracking system and determination of suitable combinations of L, d, H, $\theta$, and $\phi$, one or more of which may be determined with the aid of an accelerometer located at P2. The value of L may be known before the marking operation begins, for example since it may be set after manufacture of the marking device. The values of d, H, $\theta$, and $\phi$ may be directly sensed during operation of the marking device or may be calculated using suitable operational sensors of the marking device (e.g., inclinometers, accelerometers operating as inclinometers, compasses, proximity detectors (also referred to as "range finders"), etc.), as will be described below.

According to one embodiment, the geo-location of the tip of a marking device, such as marking device 3000 or the marking device 902, may be determined using the value of $GPS_o$ given by the location tracking system at P1 and accelerometer data from an accelerometer positioned at or sufficiently near the tip of the marking device (i.e., at point P2 in FIG. 10). In this embodiment, it is assumed that the value of L is known or determined in any suitable manner. The accelerometer in this non-limiting embodiment is a 3-axis accelerometer. By suitable analysis of the acceleration values for each axis, using known algorithms, the angle $\theta$ that the marking device 3000 makes with the ground may be determined (see, e.g., description at http://www.tilt-china.com/upload-PDF/How_to_use_an_accelerometer_as_an_i-nclinometer.pdf, viewed on Jan. 27, 2010 and prepared by Shanghai Vigor Technology Development Co.). Based on the known distance L and the determined angle $\theta$, the distance d between $GPS_o$ and GPS' in the x-y plane may be calculated (using the fact that the cosine of $\theta$ is equal to d/L).

Once the distance d is known, the value of GPS' may be derived from $GPS_o$ if the angle $\phi$ is known, since $\phi$ may provide the direction from $GPS_o$ to GPS' (again, in some embodiments the x-axis may be aligned with, or taken as, true North, such that $\phi$ may represent an angle with respect to true North). The value of $\phi$ may be determined in one of several manners. One manner for determining $\phi$ is from the readout of a compass of the marking device (e.g., a compass 920). If the location tracking system providing $GPS_o$ is a GPS receiver, then the value of $\phi$ may alternatively be taken from the heading information provided as part of the NMEA data stream provided by the GPS receiver. A third alternative for determining $\phi$ is to calculate a direction of motion based on multiple GPS points taken from the location tracking system. According to this third alternative, multiple GPS points taken at different times may be used to calculate a direction of motion by, for example, determining the direction indicated by a straight line connecting the multiple GPS points. Other methods for determining $\phi$ are also possible, as these are non-limiting examples. Once $\phi$ is known, the value of GPS' may then be determined from $GPS_o$, d and $\phi$. Once GPS' is determined, it may be used instead of $GPS_o$ (or in addition to $GPS_o$) as more accurate geo-location data of the point P2, which may be included, for example, in one or more event entries and/or electronic records.

According to an alternative embodiment, the value of GPS' may be determined from a measured value of $GPS_o$ using two 3-axis accelerometers on the marking device. One accelerometer may be located at the point P1 on the marking device, while the second may be located at the point P2. Using the techniques described in U.S. Patent Application Publication 2008/0255795, which is incorporated herein by reference in its entirety, the location of P2 relative to P1 may be determined.

As mentioned, in some instances it may be desirable to track the motion of a specific portion of a marking device, such as the tip of the marking device, for any one of the reasons previously described. In those embodiments in which the marking device includes a location tracking system providing a value of $GPS_o$ for a different point on the marking device than the point of interest, the tracking of the point of interest may be performed by determining GPS' (the location of the point of interest) for each value of $GPS_o$ as the marking device is moved using any of the above-described techniques.

However, in some instances, the value of $GPS_o$ provided by the location tracking system may not have sufficient accuracy to allow for a desired level of accuracy in tracking the motion at the desired point on the marking device (e.g., the point P2). For example, when performing a marking operation, a technician may make marking patterns that are relatively small compared to the resolution of the location tracking system. For example, the technician may make lines, arrows, write words, or make other patterns that have details smaller than the resolution of the location tracking system (e.g., smaller than approximately 30 inches in some embodiments). In such instances, using the above-described techniques for determining GPS' as the point P2 moves may not sufficiently capture the movement with a desired resolution. Thus, the techniques described below may be used.

According to one embodiment, the motion of the point P2 may be tracked by using any of the above-described techniques to get an initial value of GPS' and then using data from an accelerometer at the point P2 (e.g., accelerometer 126) to determine the distance traveled in the x and y directions. This technique is commonly referred to in the relevant arts as "dead reckoning." In this embodiment, the accelerometer may provide acceleration data for the x and y axes. That data may be integrated twice to determine the total distance traveled in the x and y directions, thus giving the position of P2 at any point in time relative to any initial GPS' value. Alternatively, the accelerometer may output velocity data for each axis, which may be integrated to determine the total distance traveled in the x and y directions. A specific example is now described with respect to FIG. 11.

Figure 11:
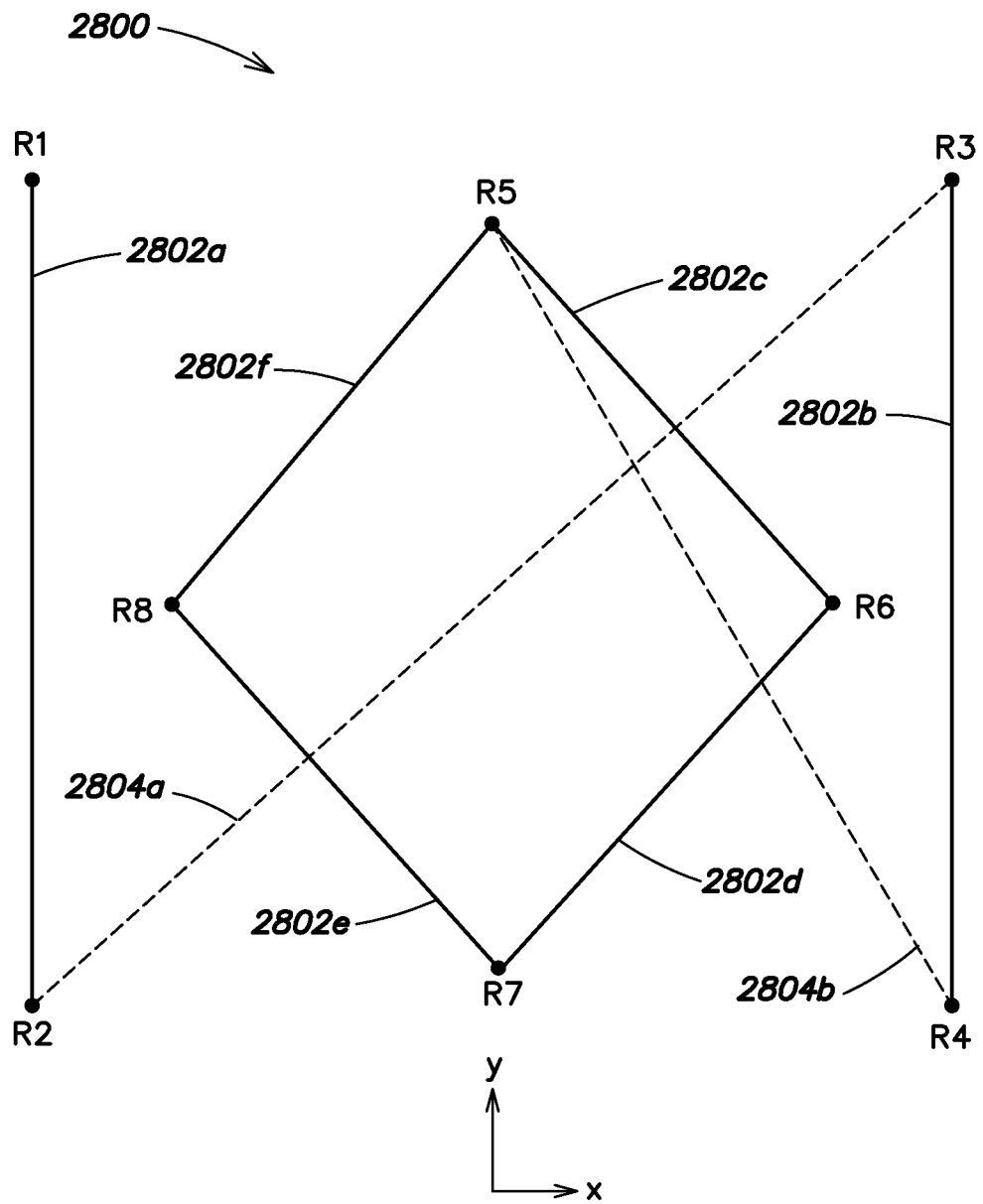
FIG. 11 illustrates a marking pattern that may be made by a technician using a marking device according to various of the embodiments described herein.

FIG. 11 illustrates a top view of a non-limiting example of a marking pattern 2800 that may be made by a technician using one of the marking devices described herein. The marking pattern 2800 comprises lines 2802a-2802f, which may be painted lines in those embodiments in which the marking material is paint. Those lines are represented in FIG. 11 as solid lines because they represent the marks of the marking pattern. Lines 2804a and 2804b, described below, are shown as dashed lines because, even though the marking device traversed those paths in forming the marking pattern 2800, the actuation system was not actuated and therefore no paint was dispensed.

The making of the marking pattern 2800 by a marking device may be determined as follows. First, the technician may begin the marking pattern at the point R1, at which time the technician actuates the actuation system to begin dispensing marking material. The location of point R1 may correspond to the initial location of the tip of the marking device and therefore may be determined from a value of $GPS_o$ of the top of the marking device and any of the above-described techniques for determining the location of the tip relative to the location of the top of the marking device.

The technician may then begin to move the marking device along the path indicated by line 2802a, ending at the point R2. The motion of the tip of the marking device along line 2802a may be determined from the output of an accelerometer at the tip of the marking device, providing an output signal for both the x and y directions. According to one embodiment, the output of the accelerometer is velocity data for both the x and y axes, and is output periodically, for example twice per second, although higher and lower data output rates are possible. The velocity values for each of the x and y axes may be multiplied by the time duration between samples of the accelerometer (e.g., one-half of a second in this non-limiting example) to get the distance traveled in the x and y directions from the initial point R1. Alternatively, the total velocity of the marking device may be multiplied by the time duration between samples of the accelerometer, and the direction of motion may be determined by comparing the velocity values for the x and y axes to each other, e.g., by taking the ratio of the velocity along the x-axis to the velocity along the y-axis. Either way, the distance travelled in the x and y directions may be determined.

In the non-limiting example of FIG. 11, the first line painted by the technician, i.e., line 2802a, may serve as a base line or reference line, from which the angle of subsequent motions may be referenced. Thus, in FIG. 11, the angle of the second motion of the technician, from points R2 to R3 along the path indicated by line 2804a may be determined by reference to the direction of line 2802a since the accelerometer output will indicate a change from the motion along the path of line 2802a. The distance and direction of the line 2804a may be determined as described above for line 2802a. Again, the line 2804a is shown as a dashed line, as the actuation system of the marking device is not activated while the marking device traverses the illustrated path.

The marking device is subsequently moved along line 2802b (from point R3 to R4) while dispensing marking material, then along line 2804b (from point R4 to R5) without dispensing marking material, then along line 2802c (from point R5 to R6) while dispensing marking material, along line 2802d (from point R6 to R7) while dispensing marking material, along line 2802e (from point R7 to R8) while dispensing marking material, and finally along line 2802f (from point R8 back to point R5) while dispensing marking material. The length and relative direction of each of the indicated lines may be determined as described above for line 2802a.

Thus, it should be appreciated that according to this non-limiting embodiment, a value of $GPS_o$ provided by a location tracking system is used only to determine the initial location of R1, after which the locations of points R2-R8 are determined using dead reckoning.

Also, it should be appreciated that while the relative orientation of each of the indicated lines is determined from the dead reckoning techniques described, the absolute, or actual, orientation is not determined from the accelerometer data since the actual orientation of line 2802a is not determined from the accelerometer data. Thus, according to one embodiment an additional step of determining an actual orientation of the line 2802a may be performed. According to one non-limiting embodiment, the actual orientation of line 2802a may be given by a heading provided by a compass of the marking device while the line 2802a is made. Other techniques may alternatively be used to determine the actual direction of the first motion of the marking pattern.

According to the above-described embodiment, the location of the tip of a marking device may be determined by determining an initial location using a location tracking system and subsequently using the dead reckoning techniques described. Because the error associated with dead reckoning may increase as the distance traversed increases, it may be desirable in some embodiments to "reset" the dead reckoning by determining a new initial location value using a location tracking system. For example, referring to the marking pattern 2800, in one embodiment the location of R1 may be determined from a value of $GPS_o$ given by a location tracking system and any of the techniques described for determining a value of GPS' for the given $GPS_o$. Subsequently, dead reckoning may be used to determine the paths of lines 2802a, 2804a, 2802b, and 2804b. According to one embodiment, the location of point R5 is not determined from dead reckoning, but rather may be determined by getting a value of $GPS_o$ at the point R5 and calculating a corresponding value of GPS'. Then, dead reckoning may be used to determine the locations of lines 2802c-2802f. In this manner, location errors that accumulate using dead reckoning may be minimized or eliminated.

Accordingly, it should be understood that a new initial location point serving as a starting point for the use of dead reckoning may be set at any suitable intervals during a marking operation. Suitable criteria for determining when to set a new initial location point for the use of dead reckoning include setting a new initial location point for the beginning of each new mark that a technician makes (e.g., each new line, symbol (e.g., arrow, square, circle, dash, etc.), letter, number, etc.), for each new marking pattern (e.g., a dotting pattern, a lines pattern, etc.), for each new marking job, or every time the dead reckoning data indicates a threshold total distance has been traveled (e.g., 5 meters, 10 meters, 50 meters, or any other threshold value). This list is not exhaustive, as other criteria may also be used to determine when to set a new initial location point for the use of dead reckoning. As but one more example, the quality of GPS data may be a factor in deciding when to set a new initial location point. For example, if the quality of GPS data from a GPS receiver used to set the initial location point is poor in a particular location (e.g., because the GPS receiver is under trees, a roof, or other cover), it may be decided not to set a new initial location point at that location but rather to continue using dead reckoning from a previously established initial location point. A new initial location point may be set when the quality of the GPS data improves, for example when the quality reaches a satisfactory threshold. Other schemes for determining when to set a new initial location point are also possible.

Figure 12:
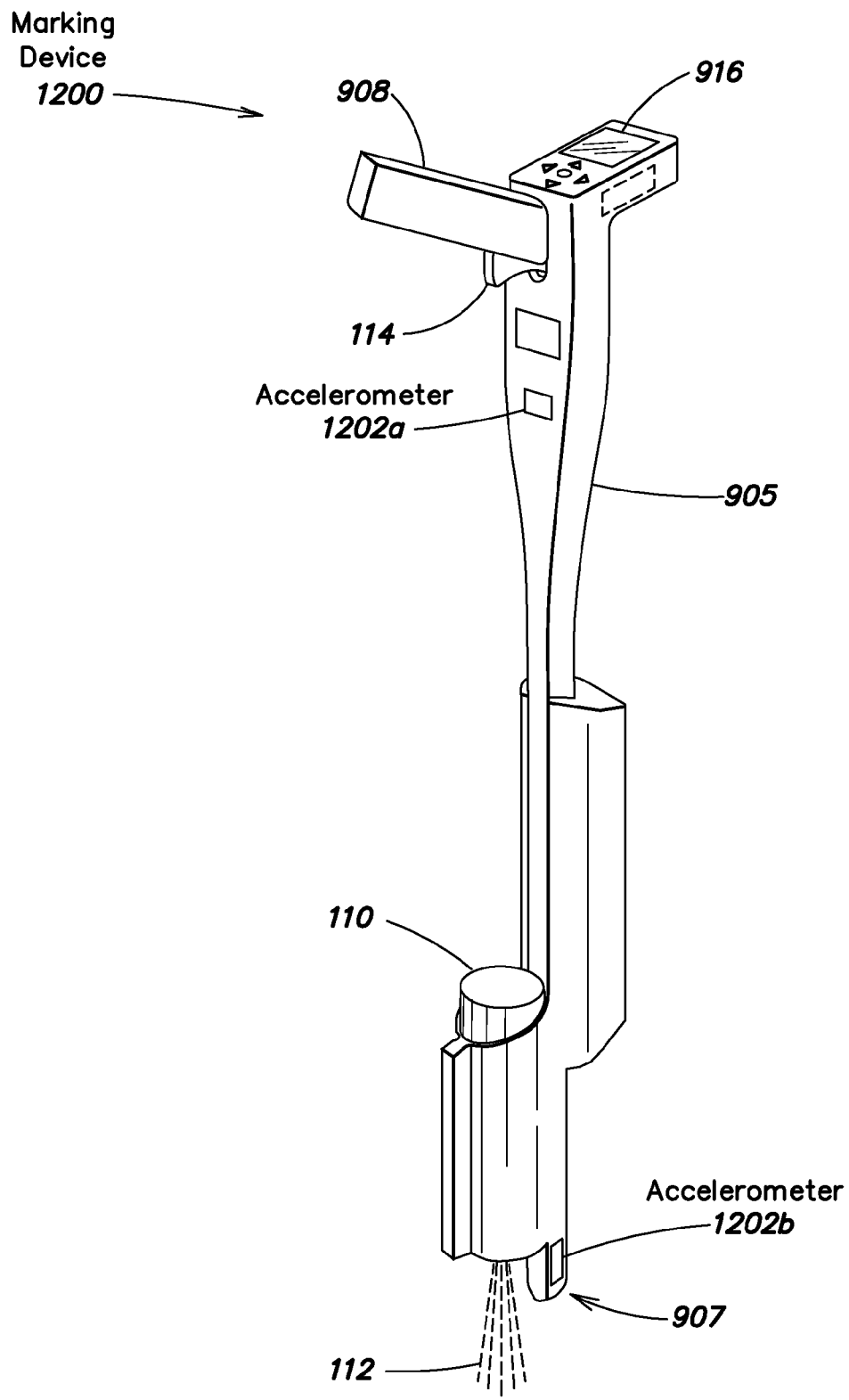
FIG. 12 is a perspective view of a marking device including multiple accelerometers, according to one non-limiting embodiment of the present invention.

Many of the aspects and examples described thus far have related to situations in which a single accelerometer may be sufficient. In some situations (some of which were previously described), it may be desirable for a marking device to have two or more accelerometers. For example, in some instances it may be desirable to detect rotational motion of the marking device and/or inclination of the marking device, which may be facilitated by collecting acceleration data related to the acceleration of two different points of the marking device (e.g., the tip of the marking device and the handle of the marking device, as a non-limiting example). Rotation of the marking device about a pivot point, such as the handle at which a user holds the marking device or about a vertical central axis of the marking device, may be useful in detecting, among other things, whether the marking device is being manipulated appropriately, irrespective of whether marking material is being dispensed. To detect acceleration data relating to multiple points (e.g., two or more) of the marking device, it may be desirable to include accelerometers located at or near the multiple points of interest of the marking device. Thus, according to one aspect of the present invention, a marking device includes two or more accelerometers positioned at different points of a marking device. FIG. 12 illustrates a non-limiting example.

As shown, the marking device 1200 includes an accelerometer 1202a located near the handle 908 of the marking device and a second accelerometer 1202b located near the tip 907 of the marking device, similar to that previously shown and described with respect to FIG. 4. Each of the accelerometers may be a single axis or multi-axis accelerometer, as the embodiment is not limited in this respect. In typical operation, the technician may rotate the marking device about the handle, for example when forming marks by dispensing marking material. Thus, the handle may effectively serve as a pivot point about which the marking device is rotated, and it may be desirable to document the rotation about the pivot. The configuration of accelerometers illustrated in FIG. 12 enables determination of such rotation. For example, rotation may be determined from acceleration data using the techniques described in U.S. Patent Application Publication 2008/0255795, which is hereby incorporated herein by reference in its entirety. Such an arrangement may also be used to determine the location of the tip of the marking device relative to the location of the top of the marking device, as explained above in connection with FIGS. 10 and 11. However, it should be appreciated that the particular configuration of FIG. 12 is not limiting, as, for example, the position of the accelerometers may be adjusted depending on what axis of rotation is of interest. Therefore, possible alternative configurations include, but are not limited to: (a) an accelerometer at the tip of the marking device and an accelerometer at the top of the marking device (e.g., near display 916); and (b) an accelerometer at the top of the marking device and an accelerometer on the handle of the marking device.

A marking device may be provided with two accelerometers to monitor whether the marking device is being held in a satisfactory manner during use. For example, it may be preferable for a marking device to be maintained at a substantially perpendicular angle relative to ground as a technician is painting, even when the technician is moving (e.g., swinging) the marking device. It should be appreciated that when operated in a such a manner, the top of the marking device and the tip of the marking device may exhibit similar acceleration characteristics (e.g., peaks in acceleration at the same time (e.g., at the same points of a swinging motion), minimum values of acceleration at the same time (e.g., at the same points of a swinging motion), etc.). By positioning an accelerometer toward the tip of the marking device and another toward the top of the marking device, the resulting acceleration data may be indicative of whether the technician is properly manipulating the marking device.

Another aspect of manipulation of a marking device which may be of interest in some scenarios is the inclination of the marking device, whether or not marking material is being dispensed. For example, there may be predetermined tolerances with respect to inclination of the marking device during dispensing of marking material and/or in general operation. Moreover, as explained above in connection with FIG. 10, it may be desirable to know the inclination of the marking device for purposes of determining the relative location of one point on the marking device compared to another point. According to one embodiment, a single accelerometer may be operated as an inclinometer as previously described, and thus the configuration of marking device 100 may be used. According to an alternative embodiment, acceleration data from multiple accelerometers may be used to derive inclination information, and thus the configuration of marking device 1200 may be used.

Many (though not all) of the examples discussed to this point relate to collection of acceleration data in connection with formation of locate marks during a marking operation. Various other purposes for collecting acceleration data are also possible, some non-limiting examples of which are now described.

Standard Operating Procedures and Operating Thresholds

It may be desirable in some scenarios to assess whether a marking device is being used in an appropriate manner, whether or not marking material is being dispensed. Appropriate marking practices may include specifications with respect to various features of marking device motion, such as acceleration of the marking device, velocity of the marking device, position of the marking device, inclination of the marking device, and rotation of the marking device, among others. For example, there may be standard operating procedures or other guidelines specifying limits within which acceleration values, velocity values, inclination values, etc. should fall if a marking operation is being properly performed. Operating within such limits may ensure accuracy of a marking operation, safety of personnel and/or safety of the marking device, among other things. As a non-limiting example, the magnitude of acceleration data may be indicative of whether the marking device is being swung, thrown, or dropped, among other things. For example, acceleration values from any accelerometer of the marking device above some threshold value for a sufficient duration (e.g., for one second or greater, or any other suitable duration) may be indicative of the marking device being thrown or dropped. If multiple accelerometers are on the marking device, the threshold values may differ for them. Any motion information which may be detected with respect to use of a marking device, and any information which may be derived from such motion information (e.g., inclination information) may be used to assess whether a marking device is being properly used, for example by complying with standard operating procedures.

Thus, according to one aspect of the present invention, motion information and/or information derived from motion information, may be compared to threshold values or ranges of values to assess whether a marking device is being used properly. Such comparison may be performed by any suitable means on the marking device or an external device. In one embodiment, the comparison may be performed by a processing unit of the marking device (e.g., processing unit 120). In one embodiment, the motion information may be acceleration information, although numerous other types of information are possible as well (e.g., velocity information, rotational information, or any other types of motion information described herein). Table 1 illustrates a non-limiting example of operating limits with respect to various quantities and within which it is expected a marking device should be used. It should be appreciated that other quantities and other values may apply in other situations, as this is merely an example.

TABLE 1

Example contents of operating limits table

| Quantity | Value |
| --- | --- |
| Maximum motion rate (acceleration) | 1.5 g |
| Maximum velocity | 2.0 meters/sec |
| Minimum spray angle (inclination) | −60 degrees |
| Maximum spray angle (inclination) | 60 degrees |

Collected motion data may be compared to operation limits such as those illustrated in Table 1. In some embodiments, such comparison may be performed by a marking data algorithm, such as marking data algorithm 934 of FIG. 9, though not all embodiments are limited in this respect. In some embodiments, the comparison may be performed on the marking device itself (e.g., by a processing unit of the marking device). If the motion data falls within the operating limits, it may be determined that the marking device is being used properly. If the motion data falls outside of the operating limits, it may be determined that the device is not being used properly or that further investigation is suggested.

Features of motion data and motion related data other than magnitude may also be compared to expected or acceptable values. Table 1 illustrates that the magnitude of values of certain types of motion and motion related quantities may be compared to expected or acceptable values. However, as shown previously with respect to some of the graphs included herein (e.g., FIGS. 5A-5C), data may also be analyzed with respect to features such as trends in the data values, number of data segments, periodicity of data segments, bursts of activity, etc. Any such features of motion data (e.g., any such features of acceleration data) may be compared to expected or acceptable features of such data to assess, among other things, whether the marking device is being operated as anticipated and/or in an acceptable manner. For example, the periodicity of acceleration data segments associated with formation of a mark may be compared to an expected or prescribed periodicity of acceleration data segments, as set forth in, for example, standard operating procedures. Thus, those aspects described herein as relating to comparison of motion data and/or motion related data to expected or acceptable data may involve comparison of any suitable features of the data described herein, and not simply the magnitude of the data.

Depending on the results of comparisons of motion data and/or motion related data to other data (e.g., standard operating procedures thresholds and ranges, etc.), various actions may be taken. If the result of a particular comparison indicates that the marking device is being used appropriately, no action may be taken. If a result indicates that a marking device is not being used appropriately, for example if collected acceleration data exceeds prescribed acceleration limits, action which may be taken includes, but is not limited to, any of the following: (a) generating an alert or other message to the technician or a third party; (b) logging an out-of-tolerance indication into an electronic record; and (c) disabling the marking device (e.g., the actuator of the marking device). Examples of each of these actions are now described for purposes of illustration, although it should be appreciated that variations are possible.

According to one embodiment, depending on the results of a comparison of some feature of collected motion data (e.g., acceleration data) to prescribed or pre-determined data, an alert or notification may be generated. In some exemplary implementations, the out-of-tolerance alert may be generated by the control electronics of the marking device, although not all implementations are limited in this respect. The alerts may take any suitable form, such as an audible alert (a chime, a ring tone, a verbal message or command (e.g., synthesized speech provided by a text-to-speech synthesizer of the marking device), etc., for example presented via a speaker of the marking device), a visual alert (e.g., a text display presented via display 916, an indicator light, etc.), a tactile alert (e.g., vibration of a tactile indicator, as described below), any combination of those options, or any other suitable type of notification. A non-limiting example of an audible or text alert which may be generated in response to detecting an out-of-tolerance condition with respect to velocity (e.g., as may be determined by integrating collected acceleration data) is: "You are moving the marking device too quickly. Please slow down. Please acknowledge." Similarly, acceleration data may be used to detect whether a marking operation is being performed smoothly or too erratically. If it is determined the operation is being performed too erratically (e.g., as indicated by inconsistent acceleration values) a corresponding audible or text alert may be "You are moving the marking device too erratically. Please smooth out the motion. Please acknowledge." In some instances, such as the two examples just given, a user may be requested to acknowledge an alert, and any user response (e.g., via the user interface) may then be recorded. Also, detection of such events/activity may offer the opportunity to coach and/or train the user to better perform the marking operation, for example by slowing down and smoothing out his/her marking motion.

Figure 13:
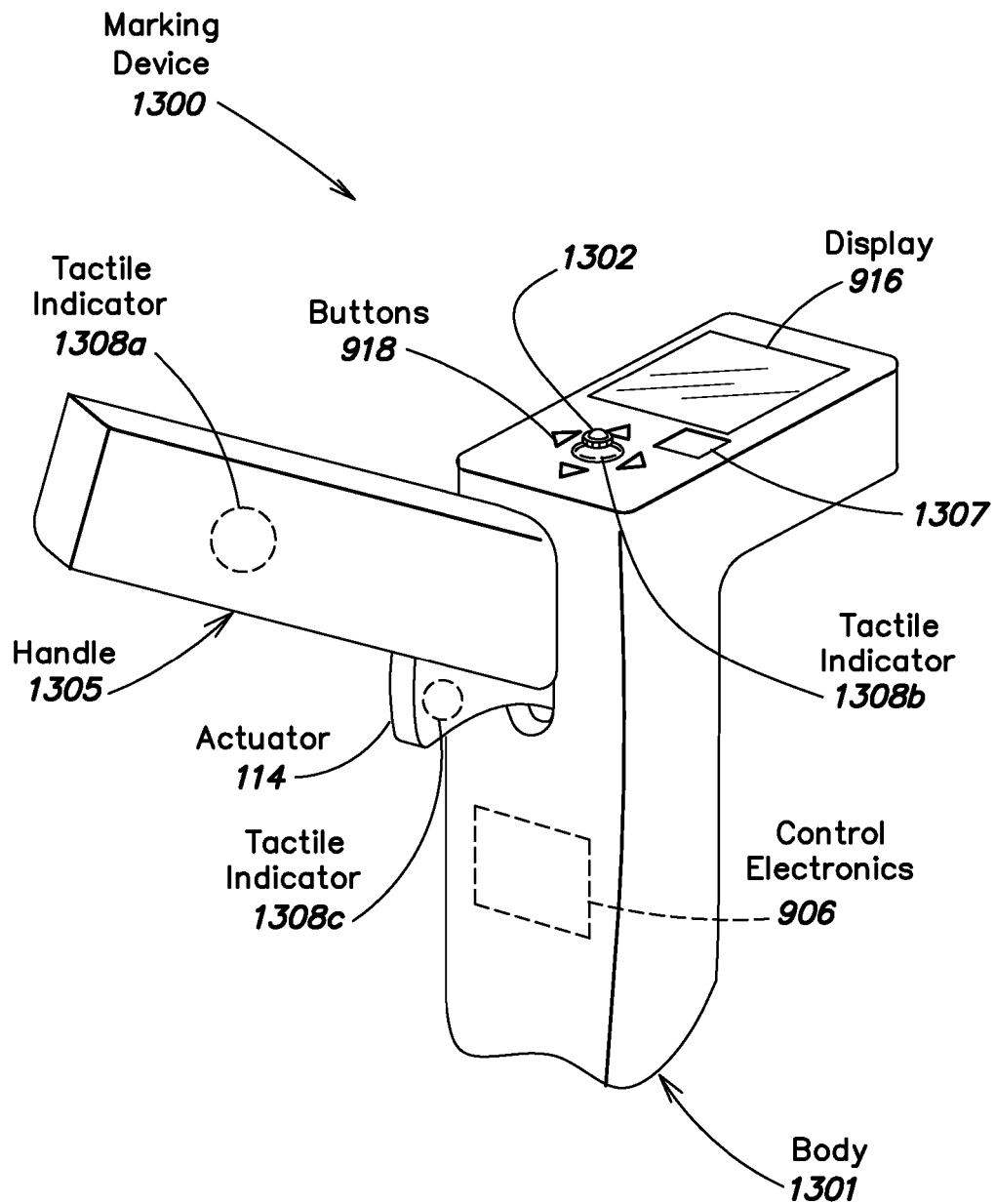
FIG. 13 illustrates a portion of a marking device including tactile indicators, a joystick, a display, and buttons according to one embodiment of the present invention.

According to some embodiments, such alerts may be provided to the marking technician via the user interface of a marking device. FIG. 13 illustrates a non-limiting example of a portion of a marking device 1300 including a suitable user interface, although variations are possible. As shown, the marking device includes a body 1301, a handle 1305, the display 916, a joystick 1302, a speaker 1307 and tactile indicators 1308a-1308c (indicated by dashed lines). Thus, any generated alerts may be provided to the user via one or more of the speaker, display, and tactile indicators, which may be any suitable type of tactile indicators, such as those commonly used in cellular telephones to provide the "vibrate" functionality.

In some embodiments, a motion detector, such as an accelerometer, may also be used to detect and/or verify whether a tactile alert is generated. A tactile alert, such as vibrating the marking device, may result in motion detectable by a motion detector of the marking device. As a non-limiting example, acceleration data from an accelerometer of the marking device may record motion associated with generation of a tactile alert, which data may be used to verify an alert was generated properly.

According to one embodiment in which an alert is generated in response to a comparison of motion data to pre-determined or prescribed data, the alert may be provided to a third party. For example, referring to FIG. 9, a third party operating the remote computer 950 may receive the alert via the remote the computer. The alert may be generated by the marking device (e.g., by control electronics 906) and transmitted to the remote computer (e.g., via a wireless connection) or may be generated at the remote computer 950 itself, which may perform the comparison in some embodiments.

As mentioned above, a second option for action which may be taken in response to a comparison of motion data and/or motion-related data to predetermined or prescribed data is to log an alert into an electronic record. For example, if the comparison indicates that the marking device is being used in an out-of-tolerance manner, an out-of-tolerance alert may be logged into an electronic record. The electronic record may take any suitable form and may be, for example, stored in memory of the marking device.

A third type of action which may be taken in response to a comparison of motion data and/or motion related data to pre-determined or prescribed data is to disable or otherwise control some component of the marking device. As one non-limiting example, the actuator and/or actuation system (if any) of the marking device may be disabled to prevent further dispensing of marking material if analysis of the motion data and/or motion related data indicates that the marking device is being used in a manner which is not conducive for forming marks, for instance because the accuracy of the marks would be comprised. In those embodiments in which the actuator is disabled, such disabling action may be controlled by, for example, the control electronics. Depending on the type of actuator and/or actuation system involved, the disabling action may involve electrical and/or mechanical action to prevent further dispensing of the marking material. The various embodiments in which the actuator is disabled are not limited to any particular manner of doing so.

Another use of acceleration data with respect to acceleration of a marking device and irrespective of whether marking material is being dispensed is for performing location tracking, for example using dead reckoning techniques. As previously described with respect to FIG. 11 in the context of dispensing marking material, acceleration and/or velocity data may be converted to position data by suitable integration to determine distance traversed by the marking device. The same methods (and devices) may be used to track motion of the marking device during a marking operation irrespective of whether marking material is being dispensed. Such information may be useful, for example, in determining where on a job site a marking technician is located and/or the marking technician's patterns of movement. Marking devices of the types previously described may provide such functionality.

Yet another use of motion data and/or motion-related data is to determine and/or assess patterns of operation, both when marking material is being dispensed from a marking device and when marking material is not being dispensed. Certain aspects of performing a marking operation (e.g., painting an arrow) may have patterns of motion corresponding therewith. Thus, collecting motion data may enable identifying such patterns. For example, by collecting acceleration data of multiple technicians painting arrows during a marking operation, it may be determined that the data follow certain patterns. Such patterns may then be used in future analysis of acceleration data to determine, among other things: (a) whether a technician is painting an arrow; and (b) if the technician is painting an arrow, whether he/she is doing so in a suitable manner (e.g., by identifying compliance with or deviation from historically acceptable patterns). Such patterns may be associated with various aspects of performance of a marking operation, as painting arrows is merely one non-limiting example. Also, analysis of current motion data against previously developed patterns may be performed in real time during a marking operation, after a marking operation is complete, or at any other suitable time.

Additionally or alternatively, information from one or more operational sensors may be used to detect patterns of operation of a particular technician. For instance, there may be multiple different ways in which an arrow may be suitably painted during a marking operation with each of the different ways being associated with a different pattern of motion data (e.g., acceleration data). In some such instances, a particular technician or group of technicians may traditionally exhibit one of the multiple possible patterns of motion, and thus motion data may be used to identify a technician or group of technicians, and/or assess whether a particular individual is complying with the traditionally exhibited patterns of operation. Such information may also be used to educate/train technicians, for example by training the technician to use an acceptable pattern of motion when performing a particular task.

In some instances, a particular pattern of motion, such as a particular pattern of acceleration or velocity, may be unique to a given technician. Thus, the pattern may effectively be a "signature" of the technician. As an example, a particular technician may have a unique motion when performing a marking operation task, such as painting an arrow on the ground, or may perform the operation at a characteristic speed. Determination (or development) and analysis of such signatures may be used to identify particular technicians based on collected motion data and/or to assess whether the technician is operating in his/her normal manner or whether he/she is deviating from his/her usual operation, which may suggest that the technician was doing something out of the ordinary, is rushing, ill, impaired, nervous, does not understand some aspect of the operation and which accordingly may cause generation of an alert/notification and/or alteration of the marking device (e.g., disabling of the marking device). Such information, therefore, may be used for quality control and/or for training purposes of technicians. Similarly, such operating information from multiple technicians may be used to develop standard operating guidelines or protocols.

Figure 14A:
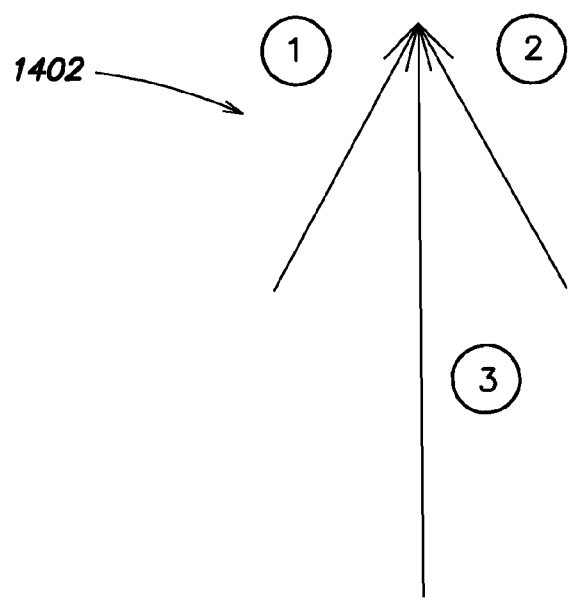
FIGS. 14A and 14B illustrate two different manners of forming an arrow during a marking operation.
Figure 14B:
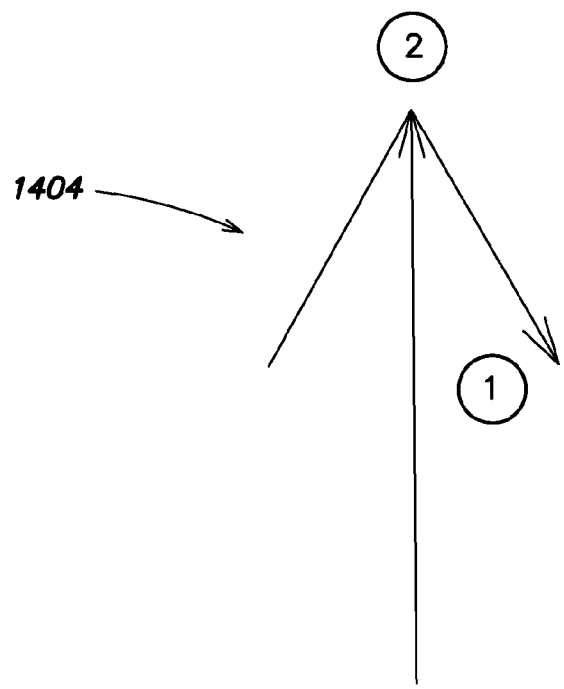
Figure 15A:
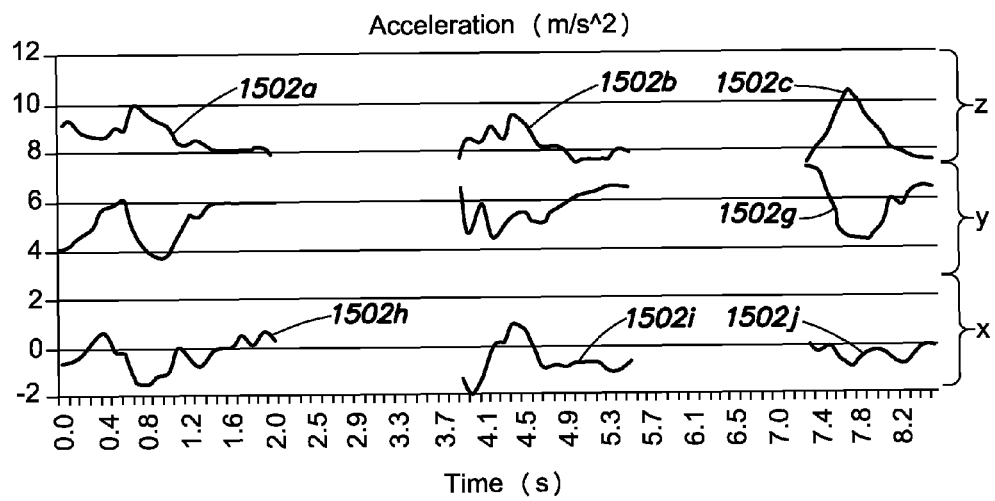
FIGS. 15A and 15B illustrate acceleration data collected during formation of arrows in the manners illustrated in FIGS. 14A and 14B, respectively.
Figure 15B:
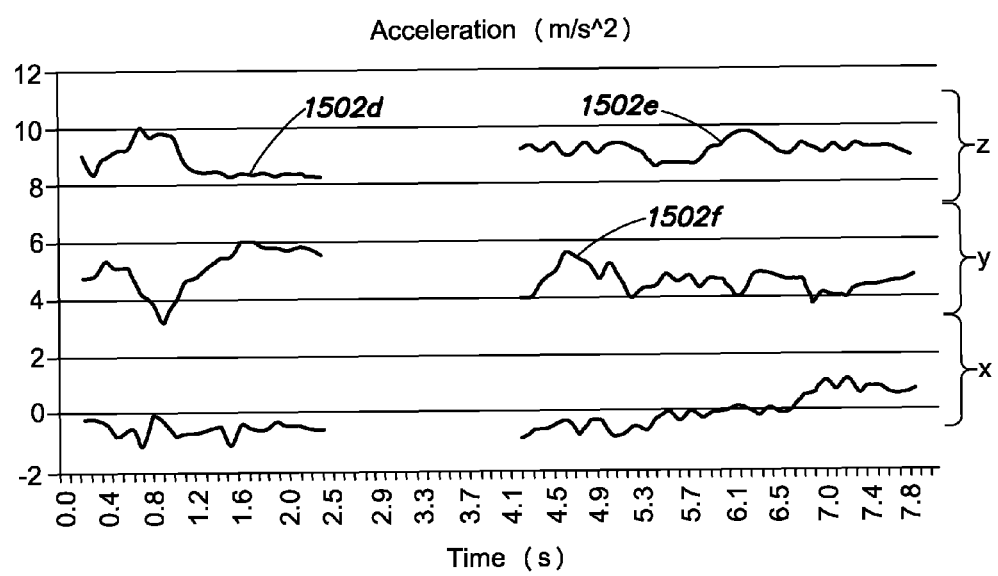

FIGS. 15A-15B provide non-limiting examples of acceleration data related to the formation of the marking symbols shown in FIGS. 14A and 14B, respectively, and which may be used to identify technicians and/or assess quality of formation of the marks. The arrow 1402 shown in FIG. 14A is assumed to be the same in terms of size and shape as the arrow 1404 shown in FIG. 14B for purposes of this example. However, the arrows differ in the manner in which they were made. The arrow 1402 was made with three distinct marking motions, labeled as segments 1-3 formed in that order. By contrast, the arrow 1404 in FIG. 14B was formed using only two segments, labeled as segments 1 and 2 in that figure and formed in that order in this non-limiting embodiment.

Referring to FIGS. 15A and 15B, which illustrate the acceleration data collected during formation of the marks illustrated in FIGS. 14A and 14B, respectively, it can be seen that the number of distinct acceleration data segments collected provides an indication of the manner in which the arrow is formed. As shown in FIG. 15A, the acceleration along each of the x, y, and z axes includes three distinct segments (e.g., 1502*a*-1502*c* for the z-axis). By contrast, as shown in FIG. 15B, the acceleration along the x, y, and z axes includes only two distinct data segments (e.g., 1502*d* and 1502*e* for the z-axis). Thus, if it is known that the data illustrated in FIGS. 15A and 15B corresponds to the formation of the same type of symbol (i.e., an arrow) then the number of data segments indicates that the symbols were formed in different manners.

Moreover, it can be seen from the actual acceleration values that formation of the arrow using three distinct segments involves characteristically different acceleration than does forming the arrow using two distinct segments. For example, it can be seen that substantially all of the data segments corresponding to formation of a single straight line (i.e., corresponding to formation of segments 1-3 in FIG. 14A and segment 1 in FIG. 14B) have one or more noticeable peaks in value. By contrast, as can be seen from FIG. 15B, the formation of segment 2 in FIG. 14B (which is not a straight line but rather changes direction) is not characterized by a distinct peak in acceleration value, but rather the acceleration values along the y and z axes (i.e., segments 1502e and 1502f) are more consistent.

Other trends of the acceleration data illustrated in FIGS. 15A and 15B may also provide an indication of how a particular mark is made. For example, it may be assumed that formation of the straight segments in FIGS. 14A and 14B (i.e., segments 1-3 in FIG. 14A and segment 1 in FIG. 14B) are made using a "swinging arm" motion in which the technician swings the marking device along his/her side from slightly behind his/her body to slightly in front of his/her body. For each of those segments of FIGS. 14A and 14B, it can be seen that the corresponding y and z-axis acceleration data pairs substantially mirror each other, with the z-axis acceleration decreasing while the y-axis acceleration increases, and vice versa. As a specific example, it can be seen that data segments 1502c and 1502g in FIG. 15A substantially minor each other. This may be understood as effect of gravity transferring from the y-axis to the z-axis and back again during formation of that data segment. Moreover, it can be seen that formation of the tail components of the arrows (i.e., segment 3 in FIG. 14A and segment 1 in FIG. 14B) do not involve a lot of acceleration along at least one of the three axes (i.e., the x-axis in FIGS. 15A and 15B). By contrast, formation of the arrowhead segments tends to show acceleration along all three axes. As a specific example, data segments 1502h and 1502i show greater acceleration activity (and correspond to formation of arrowheads) than does data segment 1502j (corresponding to formation of a tail of an arrow). Thus, these trends in the acceleration values and inter-relationship between the acceleration on different axes also provide an indication of the different manners in which the arrows were formed.

If it is assumed for the moment that the differences in style in forming the arrows 1402 and 1404 are attributable to different technicians, then the acceleration data of FIGS. 15A and 15B, in terms of the number of data segments, the values of the acceleration, and the trends of the data, may provide an indication of which technician formed which arrow.

While the examples of FIGS. 15A-15B related to acceleration data, it should be appreciated that the aspects described herein relating to the development and use of patterns of motion may be performed with other types of motion data and/or motion-related data. For example, velocity data, position data, and inclination data, among others, may all be used in the manner described above with respect to acceleration data.

To this point, several examples of processing motion data, such as acceleration data, collected by a marking device have been described. The location at which the data is processed may be either at the marking device itself or an external device. According to one embodiment, processing/analysis of motion data may be performed by one or more processors of the marking device, such as processing unit 120 of marking device 100. Alternatively, the collected motion data may be transmitted to an external device (e.g., remote computer 950 in FIG. 9) in real time, at pre-determined time intervals, or after completion of a marking operation. The data may be transmitted via a communication interface, such as communication interface 132, or in any other suitable manner. The external device may then perform any desired processing/analysis of the data, including but not limited to pattern recognition, threshold comparison, or any of the other types of processing/analysis described herein.

The timing at which motion data is collected or provided by a motion detector, stored in local memory of a marking device, or transmitted to an external device is not limiting of the various aspects described herein. For instance, a motion detector may output data or be polled by a processor continuously, periodically, and/or in response to an event or trigger (e.g., one or more actuations of the marking device), or in any other suitable manner. As mentioned previously, according to some embodiments motion data, such as acceleration data, may be taken in response to actuation of the actuator of the marking device. Such a scheme may be preferable, for example, when the purpose of collecting the acceleration data relates to assessment of marks formed. Since marks are formed by dispensing of marking material, which occurs when the actuator is actuated, the marking device may be configured such that the acceleration data detected by the accelerometer likewise is output when the actuator is actuated. The motion detector may alternatively output substantially continuous data streams indicative of the sensed operation. Furthermore, a motion detector may be activated, read discretely, and/or polled by the technician irrespective of whether the actuation system is actuated. Alternatively, a motion detector may be operated and/or polled periodically, with the resulting output data being logged and/or transmitted periodically. For example, the accelerometer(s) may output data at periodic intervals (e.g., at the sample rate of the accelerometer, which may be in the kHz range, MHz range, or higher). As an alternative, acceleration data may be substantially continuously collected during operation of the marking device, and the data collected during dispensing of the marking material may be differentiated from that detected at other times during the operation. For example, the acceleration data collected during dispensing of the marking material may be flagged/tagged, highlighted, or otherwise differentiated from data collected at other times. Thus, it should be appreciated that the operation of motion detectors, and reading and/or logging and/or transmitting of data from the motion detectors, is not limited to any particular manner or time, but rather that various suitable schemes are contemplated.

The motion data provided by a motion detector and/or formed during processing may take various forms. As shown with respect to FIGS. 5A-5C, the data may be analog data in some embodiments. Alternatively, the data may be digital data. In some embodiments, the raw motion detector data may be correlated with other data. For example, acceleration data output by an accelerometer may be correlated with timing data, such as a timestamp. The correlation may be performed by a processor of the marking device, a time tracking system of the marking device, or in any other suitable manner. Furthermore, various types of motion data may be correlated based on time. For example, acceleration data and rotational data may be correlated based on time.

According to one embodiment, motion data, such as acceleration data, may be formed into data packets, for example with time data and data collected by other sensors (if any) of the marking device. For instance, the processing unit of a marking device may receive motion data from a motion detector and form the data into data packets, as a non-limiting example. The data packets may then be output from the processing unit to, for example, the local memory of the marking device and/or to an external device.

Figure 16:
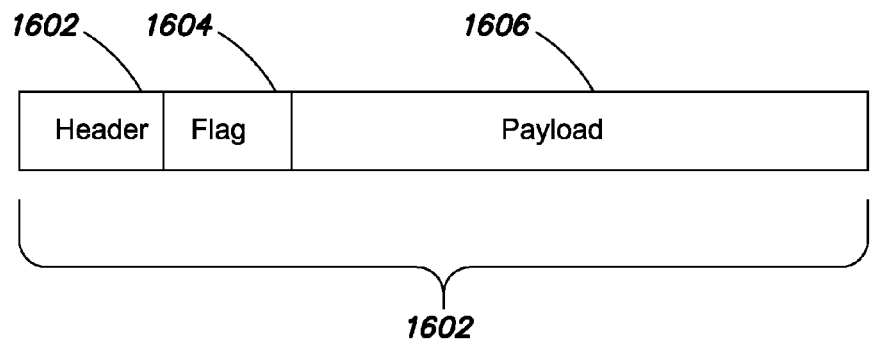
FIG. 16 illustrates a non-limiting example of a data packet which may be formed in accordance with embodiments of the present invention.

A non-limiting example of a data packet of the type that may be suitable for use with the marking devices described herein is shown in FIG. 16. As shown, the example of a data packet 1600 may include a header 1602, a flag field 1604, and a payload 1606, of any number of bits. The header may include, for example, identification information identifying a marking device, a job site, a marking technician, a company or any other identification information of interest. The header may additionally or alternatively include any required header information for conforming to a particular communication protocol implemented by the marking device. The payload may include acceleration data and timing data, among other things. The flag field may be set by actuation of the actuator. Thus, data packets generated during actuation of the actuator (which may, in at least some embodiments, correspond to dispensing of marking material) may be differentiated from data packets generated at other times during operation based on the status of the flag field, which in some embodiments may be a single bit field with a value of "1" when the actuator is actuated and a value of "0" when the actuator is not, though other forms of flag fields are also possible. In some embodiments, storage and/or processing of data packets may depend on the value(s) of the flag field. For example, in one embodiment only data packets having the flag field set (i.e., a value of "1") are stored locally and/or transmitted from the marking device. Other schemes are possible, however. Furthermore, other forms and contents of data packets are possible.

Figure 17:
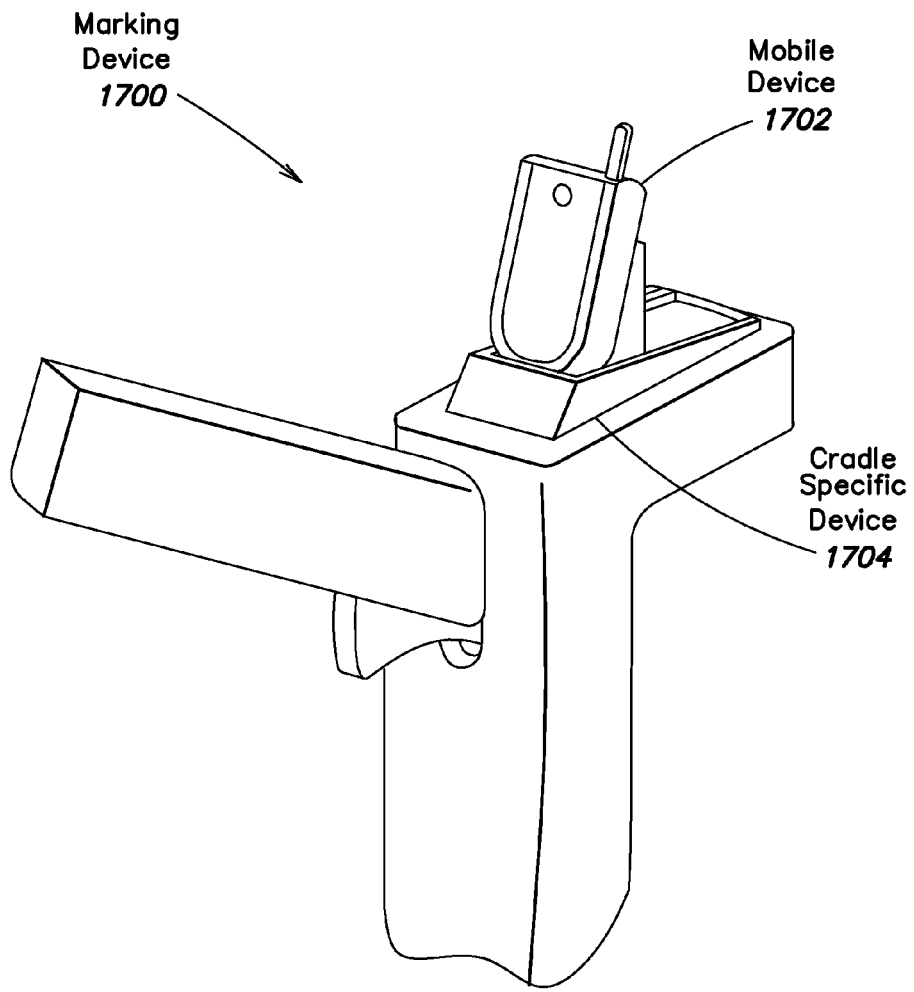
FIG. 17 illustrates a portion of a marking device including a mobile device that may include one or more motion detectors, according to a non-limiting embodiment of the present invention.

The accelerometers illustrated thus far may be implemented in various manners. One option is to implement the accelerometers as stand alone devices. An alternative option is to utilize accelerometers located within larger devices. As a non-limiting example, many cellular telephones, personal digital assistants, and other similar electronic devices include one or more accelerometers. Thus, such devices may be positioned at the illustrated locations of the accelerometers in FIGS. 4, 9, and 12 as non-limiting examples, such that the accelerometers within the devices may server as the previously described accelerometers. A further non-limiting example is illustrated in FIG. 17. As shown, the illustrated portion of the marking device 1700 includes a handle, an actuator, and a mobile device 1702 fitted in a device-specific cradle 1704. The mobile device may be, for example, a cellular telephone or a personal digital assistant and may include one or more accelerometers. The cradle may function to secure the mobile device to the marking device, and in some instances may also provide electrical connection between the mobile device and, for example, control electronics of the marking device. Data collected by the one or more accelerometers of the mobile device 1702 may be used just as if the mobile device was replaced with a stand alone accelerometer.

Figure 18:
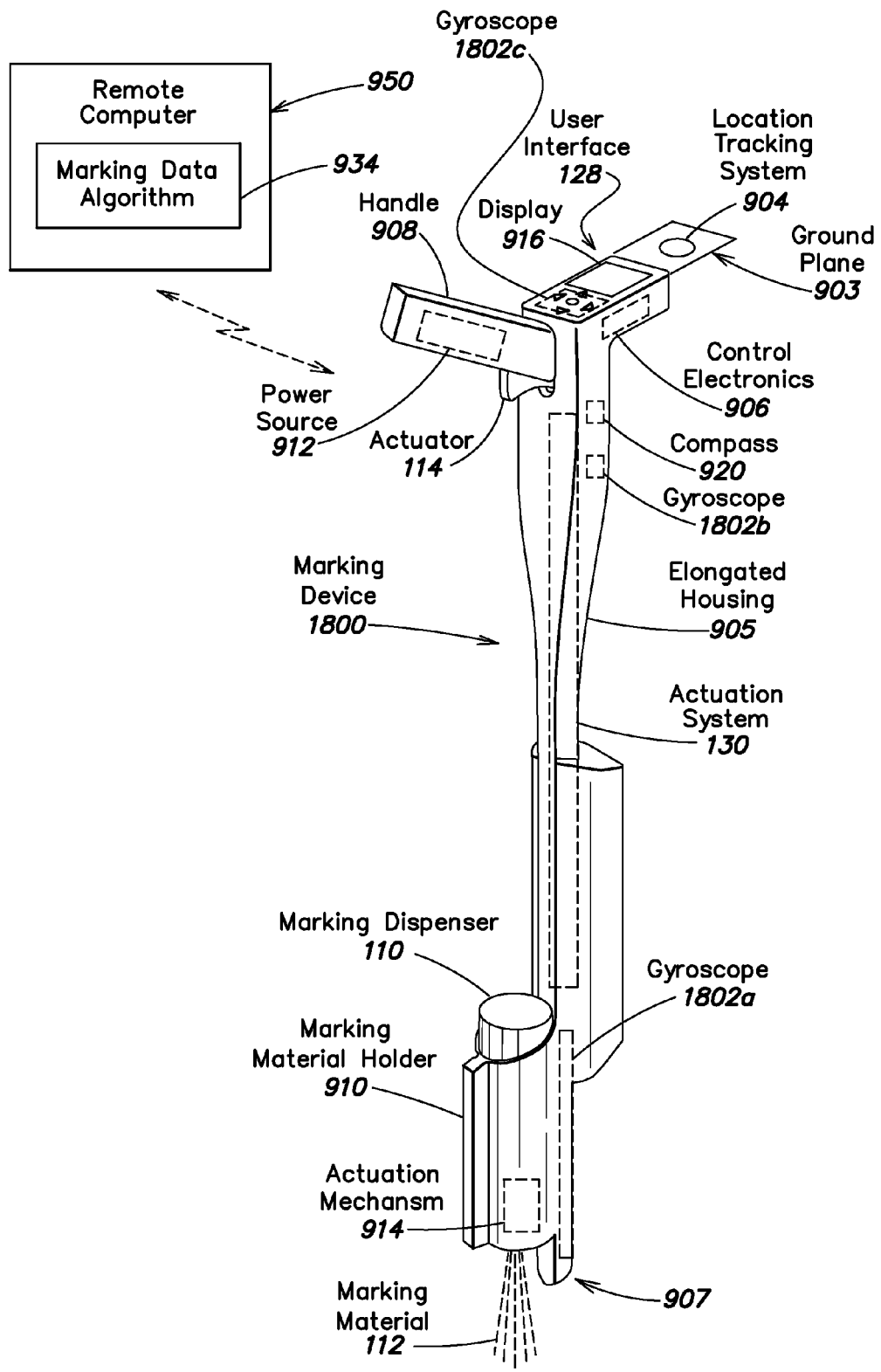
FIG. 18 illustrates a marking device including multiple gyroscopes configured to sense rotational motion of the marking device, according to a non-limiting embodiment of the present invention.

Gyroscopes represent another type of motion sensor, which may be used to sense rotational motion of a body. As previously mentioned, it may be desirable in some instance to sense rotational motion of a marking device. Thus, according to an aspect of the present invention, a marking device may include one or more gyroscopes. FIG. 18 illustrates a non-limiting example.

As shown, the marking device 1800 includes three gyroscopes 1802a-1802c. Each gyroscope may be configured to sense one of yaw, pitch, or roll of the marking device, all of which may be desirable to know. For example, analysis of acceleration data (e.g., from an accelerometer of the marking device) may be facilitated by also having yaw, pitch, or roll data, since some acceleration data may indicate multiple possible types of motion of the marking device. By also considering the corresponding yaw, pitch, and/or roll data, the acceleration data may be more clearly understood. For instance, the pitch data may provide an indication of what plane the marking device is in, and therefore may provide context for any other motion data (e.g., acceleration data) collected at the same time. As another example, pitch data may be useful in processing acceleration data collected at the same time in that it may facilitate subtracting out gravitational forces. Moreover, pitch data may be used as an indication of $\theta$ in the configuration of FIG. 10, previously described. Other uses for yaw, pitch, and roll data are also possible. The gyroscopes 1802a-1802c may be of any suitable type (e.g., an ADXRS610BBGZ-RL gyro sensor from Analog Devices of Norwood, Mass.), and may be configured in any suitable manner with respect to the marking device to measure the desired quantity.

Figure 19A:
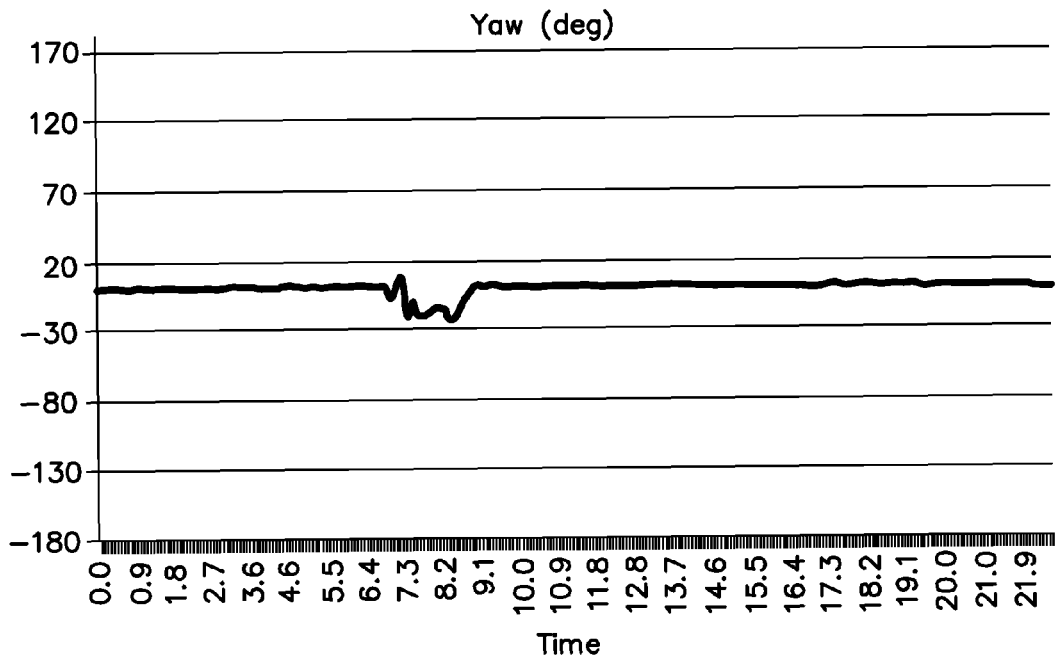
FIGS. 19A-19C illustrates graphs of data which may be provided by the gyroscopes of the marking device of FIG. 18.
Figure 19B:
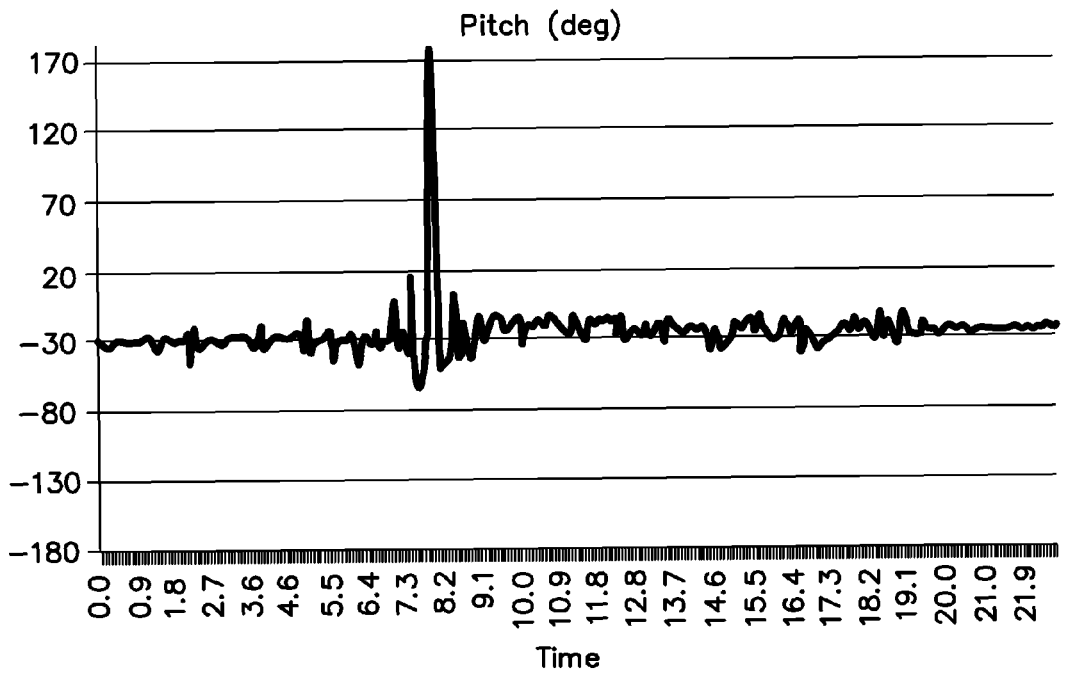
Figure 19C:
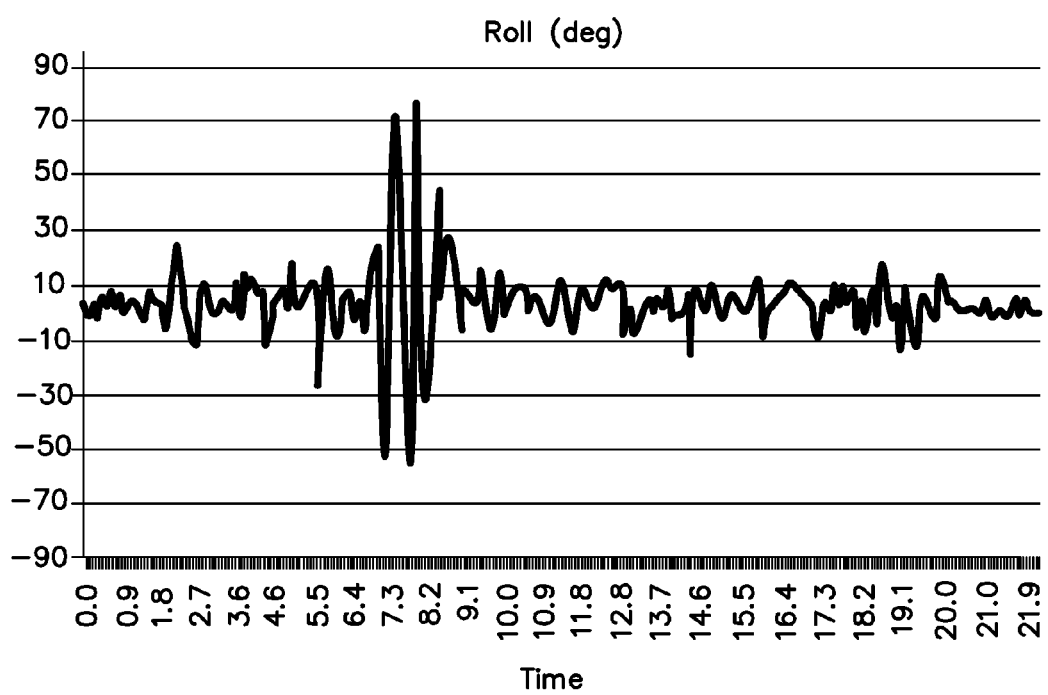

The gyroscopes may be operated in any suitable manner in terms of the timing of data and the form of the data, including any of those previously described with respect to the accelerometers described herein. FIGS. 19A-19C illustrate non-limiting examples of yaw, pitch, and roll data which may be collected by gyroscopes of a marking device. The y-axis of each graph represents degrees and the x-axis represents time. The analysis of such data may include any of those types previously described with respect to other motion data, including comparing the values to expected or prescribed values, analyzing the magnitude, data segments, and trends, and determining and analyzing patterns or signatures, among others.

While FIG. 18 illustrates a non-limiting example of a marking device including three gyroscopes, it should be appreciated that a different number, including more than three, may be used in other embodiments. Thus, the illustrated embodiment with three gyroscopes is merely an example and the aspects described herein relating to a marking device including gyroscopes are not limited to having three, but may have more or fewer.

Figure 20:
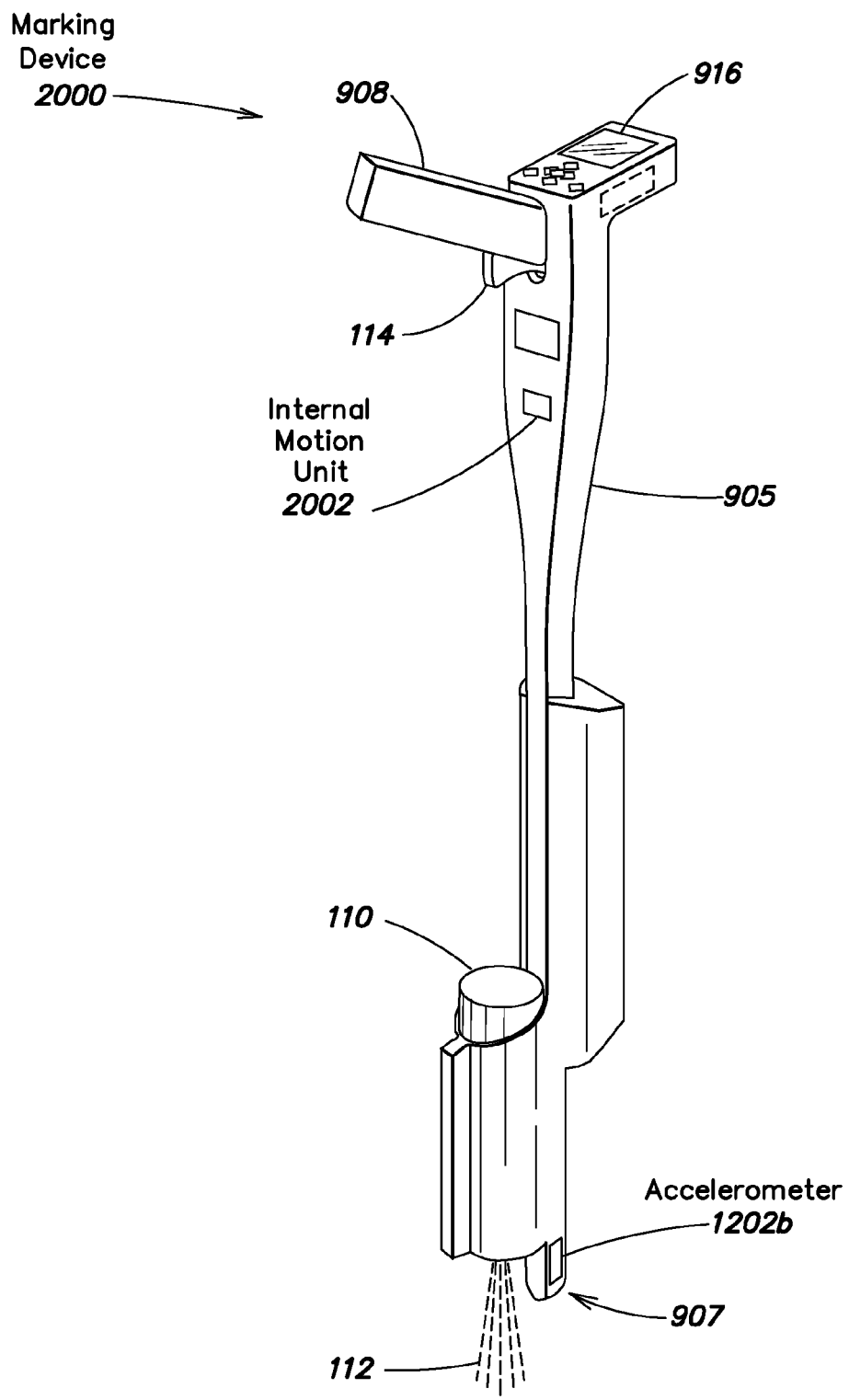
FIG. 20 illustrates a marking device including an inertial motion unit, according to a non-limiting embodiment of the present invention.

As mentioned previously, an inertial motion unit is another type of motion detector which may be utilized according to aspects of the present invention to detect motion of the marking device. An inertial motion unit includes multiple accelerometers and multiple gyroscopes and may provide data relating to velocity, orientation and gravitational forces. Such information may be used for any of the purposes described above, including assessing quality of marking operations, compliance with standard operating procedures, and for developing and assessing of patterns of motion, among others. In those embodiments in which an IMU is employed, the IMU may be positioned at any suitable location with respect to a marking device to provide the desired data and may be operated in any suitable manner in terms of the timing of data output and the form of data output, including any of those manners of operation described previously herein. FIG. 20 provides a non-limiting example, illustrating a marking device 2000 including an inertial motion unit 2002 mechanically coupled thereto. It should be appreciated that alternative configurations are also possible.

CONCLUSION

As seen from the foregoing, various configurations of marking devices including motion detectors, such as accelerometers, are described in accordance with the various aspects described herein. They may range in complexity, for example from relatively simple (e.g., a marking device having a single accelerometer and a processor, according to the embodiment of FIG. 4) to relatively complex (e.g., a marking device having multiple accelerometers and additional sensors). The different configurations may offer different benefits and different levels of suitability for particular uses, and thus the configuration chosen for any particular situation may be chosen in dependence on the functionality desired. Furthermore, the forms and analysis of acceleration data and related data may be chosen in dependence on the intended use of the data. Thus, it should be appreciated that the multitude of examples described herein are illustrative in nature and that various alternatives are possible while remaining within the scope of the various aspects described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, some of the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, an intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for assessing use of a marking device to mark a presence or an absence of at least one underground facility with a marking material, the apparatus comprising:
   at least one input/output (I/O) interface;
   at least one memory storing processor-executable instructions; and
   a processor coupled to the memory and the at least one I/O interface, wherein upon execution of the processor-executable instructions by the processor, the processor:
   A) receives, via the at least one I/O interface, acceleration information representative of acceleration of the marking device during the use of the marking device, wherein the acceleration information includes a plurality of data segments;
   B) analyzes the acceleration information to determine at least one of:
      (i) a number of distinct acceleration data segments associated with formation of a marking pattern, wherein the marking pattern comprises at least one of a discontinuous pattern, an alphanumeric character, and a symbol;
      (ii) a duration of acceleration data segments associated with formation of the marking pattern; and
      (iii) a periodicity of acceleration data segments associated with formation of the marking pattern; and
   C) stores in the at least one memory, and/or transmits via the at least one I/O interface, at least one indication relating to an assessment of use of the marking device based at least in part on B).

2. The apparatus of claim 1, wherein in B), the processor analyzes the acceleration information to determine (i) the number of distinct acceleration data segments associated with formation of the marking pattern.

3. The apparatus of claim 1, wherein in B), the processor analyzes the acceleration information to determine (ii) the duration of acceleration data segments associated with formation of the marking pattern.

4. The apparatus of claim 1, wherein in B), the processor analyzes the acceleration information to determine (iii) the periodicity of acceleration data segments associated with formation of the marking pattern.

5. The apparatus of claim 1, wherein in B), the processor further analyzes the acceleration information to determine whether one or more acceleration values fall outside of predetermined tolerances for use of the marking device.

6. The apparatus of claim 1, wherein in B), the processor further analyzes the acceleration information to determine a trend of values constituting the acceleration information.

7. The apparatus of claim 1, wherein the processor further:
   D) determines, based at least in part on B), whether the use of the marking device is characteristic of a marking technician using the marking device.

8. The apparatus of claim 7, wherein in D), the processor: determines whether the use of the marking device is unique to the marking technician using the marking device.

9. A system comprising:
   the apparatus of claim 1; and
   the marking device, wherein the marking device is communicatively coupled to the apparatus via the at least one I/O interface, and wherein the marking device comprises:
a hand-held body;
an actuator mechanically coupled to the hand-held body and configured to actuate a marking material dispenser to dispense the marking material to mark the presence or the absence of the at least one underground facility; and
a motion detector mechanically coupled to the hand-held body and configured to sense movement of the marking device, wherein the motion detector provides at least some of the acceleration information received in A).

10. The system of claim 9, wherein the apparatus is mechanically coupled to the marking device.

11. The system of claim 9, wherein the motion detector is a gyroscope mechanically coupled to the hand-held body and configured to sense rotational motion of the marking device.

12. The system of claim 11, wherein the rotational motion of the marking device is yaw of the marking device.

13. The system of claim 11, wherein the rotational motion of the marking device is pitch of the marking device.

14. The system of claim 11, wherein the rotational motion of the marking device is roll of the marking device.

15. The system of claim 9, wherein the motion detector is an inertial motion unit.

16. The system of claim 9, wherein the motion detector is an accelerometer mechanically coupled to the hand-held body and configured to sense acceleration.

17. The system of claim 16, further comprising the marking material dispenser, and wherein the accelerometer is configured to sense acceleration indicative of acceleration of the marking material dispenser.

18. The system of claim 16, wherein the accelerometer is a three-axis accelerometer.

19. The system of claim 16, wherein the hand-held body includes an elongated portion having a first end configured to be disposed proximate ground when the marking device is in use and wherein the accelerometer is disposed proximate the first end.

20. The system of claim 19, wherein the accelerometer is a first accelerometer, and wherein the marking device further comprises a second accelerometer.

21. The system of claim 20, wherein the elongated portion comprises a second end configured to be disposed distal the ground when the marking device is in use, and wherein the second accelerometer is disposed proximate the second end.

22. The system of claim 21, wherein the first accelerometer and the second accelerometer are configured to operate in combination as an inclinometer to sense a degree of inclination of the marking device.

23. The system of claim 20, wherein each of the first and second accelerometers is a three-axis accelerometer.

24. The system of claim 16, wherein the acceleration information received in A) includes acceleration data provided by the accelerometer, and wherein the processor stores in the at least one memory the acceleration data provided by the accelerometer.

25. The system of claim 24, wherein the processor further:
D) polls the accelerometer upon actuation of the actuator; and
E) stores the acceleration data in the at least one memory in response to D).

26. The system of claim 24, wherein the processor stores the acceleration data continuously in the at least one memory as it is provided by the accelerometer.

27. The system of claim 24, wherein the processor stores the acceleration data periodically in the at least one memory.

28. The system of claim 24, wherein actuation of the actuator sets a flag field of a data packet including the acceleration data, and wherein the processor stores in the at least one memory data packets in which the flag field is set.

29. The system of claim 16, wherein the accelerometer is a first accelerometer, and wherein the marking device further comprises a second accelerometer mechanically coupled to the handheld body.

30. The system of claim 16, further comprising a location tracking system mechanically coupled to the hand-held body and configured to determine a location of the hand-held body.

31. The system of claim 16, wherein the accelerometer forms part of an electronic device mechanically coupled to the hand-held body.

32. The system of claim 31, wherein the electronic device comprises a cellular telephone.

33. The system of claim 31, wherein the electronic device comprises a personal digital assistant.

34. The system of claim 16, wherein the processor is configured to form and output data packets comprising the acceleration data.

35. The system of claim 34, wherein each of at least some of the data packets includes a flag field set by actuation of the actuator.

36. The system of claim 34, wherein the data packets further comprise timing information indicative of a time at which the acceleration data was collected.

37. The system of claim 36, wherein the processor is configured to, upon receipt of the acceleration data, compare the acceleration data to at least one reference value or range of values.

38. The system of claim 37, further comprising at least one indicator coupled to the processor and configured to generate an alert based at least in part on a result of the comparison of the acceleration data to the at least one reference value or range of values.

39. In a computer comprising at least one hardware processor, at least one tangible storage medium, and at least one input/output (I/O) interface, a method for assessing use of a marking device to mark a presence or an absence of at least one underground facility with a marking material, the method comprising:
A) receiving, via the at least one I/O interface, acceleration information representative of acceleration of the marking device during the use of the marking device, wherein the acceleration information includes a plurality of data segments;
B) analyzing, via at least one hardware processor, the acceleration information to determine at least one of:
(i) a number of distinct acceleration data segments associated with formation of a marking pattern, wherein the marking pattern comprises at least one of a discontinuous pattern, an alphanumeric character, and a symbol;
(ii) a duration of acceleration data segments associated with formation of the marking pattern; and
(iii) a periodicity of acceleration data segments associated with formation of the marking pattern; and
C) storing in the at least one memory, and/or transmitting via the at least one I/O interface, at least one indication relating to an assessment of use of the marking device based at least in part on B).

40. The method of claim 39, wherein B) comprises:
analyzing the acceleration information to determine (i) the number of distinct acceleration data segments associated with formation of the marking pattern.

41. The method of claim 39, wherein B) comprises:
analyzing the acceleration information to determine (ii) the duration of acceleration data segments associated with formation of the marking pattern.

42. The method of claim 39, wherein B) comprises:
analyzing the acceleration information to determine (iii) the periodicity of acceleration data segments associated with formation of the marking pattern.

43. The method of claim 39, wherein B) further comprises:
analyzing the acceleration information to determine whether one or more acceleration values fall outside of predetermined tolerances for use of the marking device.

44. The method of claim 39, wherein B) further comprises:
analyzing the acceleration information to determine a trend of values constituting the acceleration information.

45. The method of claim 39, further comprising:
D) determining, based at least in part on B), whether the use of the marking device is characteristic of a marking technician using the marking device.

46. The method of claim 45, wherein D) comprises:
determining whether the use of the marking device is unique to the marking technician using the marking device.

47. At least one computer-readable non-transitory storage medium encoded with instructions that, when executed by a processor in a computer comprising at least one input/output (I/O) interface, perform a method for assessing use of a marking device to mark a presence or an absence of at least one underground facility with a marking material, the method comprising:
 A) receiving, via the at least one I/O interface, acceleration information representative of acceleration of the marking device during the use of the marking device, wherein the acceleration information includes a plurality of data segments; and
 B) analyzing the acceleration information to determine at least one of:
  (i) a number of distinct acceleration data segments associated with formation of a marking pattern, wherein the marking pattern comprises at least one of a discontinuous pattern, an alphanumeric character, and a symbol;
  (ii) a duration of acceleration data segments associated with formation of the marking pattern; and
  (iii) a periodicity of acceleration data segments associated with formation of the marking pattern.

48. The computer readable storage medium of claim 47, wherein B) comprises:
analyzing the acceleration information to determine (i) the number of distinct acceleration data segments associated with formation of the marking pattern.

49. The computer readable storage medium of claim 47, wherein B) comprises:
analyzing the acceleration information to determine (ii) the duration of acceleration data segments associated with formation of the marking pattern.

50. The computer readable storage medium of claim 47, wherein B) comprises:
analyzing the acceleration information to determine (iii) the periodicity of acceleration data segments associated with formation of the marking pattern.

51. The computer readable storage medium of claim 47, wherein B) further comprises:
analyzing the acceleration information to determine whether one or more acceleration values fall outside of predetermined tolerances for use of the marking device.

52. The computer readable storage medium of claim 47, wherein B) further comprises:
analyzing the acceleration information to determine a trend of values constituting the acceleration information.

53. The computer readable storage medium of claim 47, further comprising:
D) determining, based at least in part on B), whether the use of the marking device is characteristic of a marking technician using the marking device.

54. The computer readable storage medium of claim 53, wherein D) comprises:
determining whether the use of the marking device is unique to the marking technician using the marking device.

* * * * *